United States Patent
Bui et al.

(10) Patent No.: US 9,997,184 B1
(45) Date of Patent: Jun. 12, 2018

(54) HYBRID SERVO PATTERN CONFIGURATIONS FOR MAGNETIC TAPE

(71) Applicant: International Business Machines Corporation, Armonk, NY (US)

(72) Inventors: Nhan X. Bui, Tucson, AZ (US); Giovanni Cherubini, Rueschlikon (CH); Simeon Furrer, Altdorf (CH); Mark A. Lantz, Adliswil (CH); Kazuhiro Tsuruta, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days. days.

(21) Appl. No.: 15/808,648

(22) Filed: Nov. 9, 2017

(51) Int. Cl.
- G11B 5/09 (2006.01)
- G11B 5/592 (2006.01)
- G11B 5/008 (2006.01)
- G11B 5/48 (2006.01)

(52) U.S. Cl.
CPC .......... G11B 5/5926 (2013.01); G11B 5/0086 (2013.01); G11B 5/4813 (2013.01)

(58) Field of Classification Search
None
See application file for complete search history.

(56) References Cited

U.S. PATENT DOCUMENTS

| | | | |
|---|---|---|---|
| 6,236,525 B1 * | 5/2001 | Cates | G11B 5/584 360/121 |
| 8,941,949 B1 | 1/2015 | Cherubini et al. | |
| 9,058,828 B1 | 1/2015 | Cherubini et al. | |
| 9,053,744 B2 | 6/2015 | Cherubini et al. | |
| 9,251,827 B2 | 2/2016 | Cherubini et al. | |
| 9,318,139 B2 | 4/2016 | Ong et al. | |
| 2005/0168864 A1 * | 8/2005 | Knowles | G11B 5/584 360/77.12 |
| 2007/0041121 A1 * | 2/2007 | Neumann | G11B 5/0083 360/77.12 |
| 2007/0047142 A1 * | 3/2007 | Biskeborn | G11B 5/00826 360/129 |
| 2011/0216434 A1 * | 9/2011 | Bui | G11B 5/584 360/51 |
| 2015/0062740 A1 * | 3/2015 | Cherubini | G11B 20/1204 360/48 |
| 2015/0318006 A1 * | 11/2015 | Cherubini | G11B 5/584 360/71 |

* cited by examiner

*Primary Examiner* — Peter Vincent Agustin
(74) *Attorney, Agent, or Firm* — Zilka-Kotab, P.C.

(57) ABSTRACT

A tape drive-implemented method, according to one embodiment, includes: determining a servo band configuration of servo bands on a magnetic tape, using servo readers on a magnetic tape head to read one or more of the servo bands based on the determined servo band configuration, and using information read from the one or more of the servo bands to position the magnetic tape head relative to the magnetic tape. An array of data transducers is positioned along the magnetic tape head, the array extending perpendicular to a direction of travel of the magnetic tape. Moreover, a group of the servo readers is positioned at each end of the array of data transducers, and a distance between each of the immediately adjacent servo readers in each of the groups of servo readers is less than or equal to one third of a prespecified width of each of the servo bands.

25 Claims, 28 Drawing Sheets

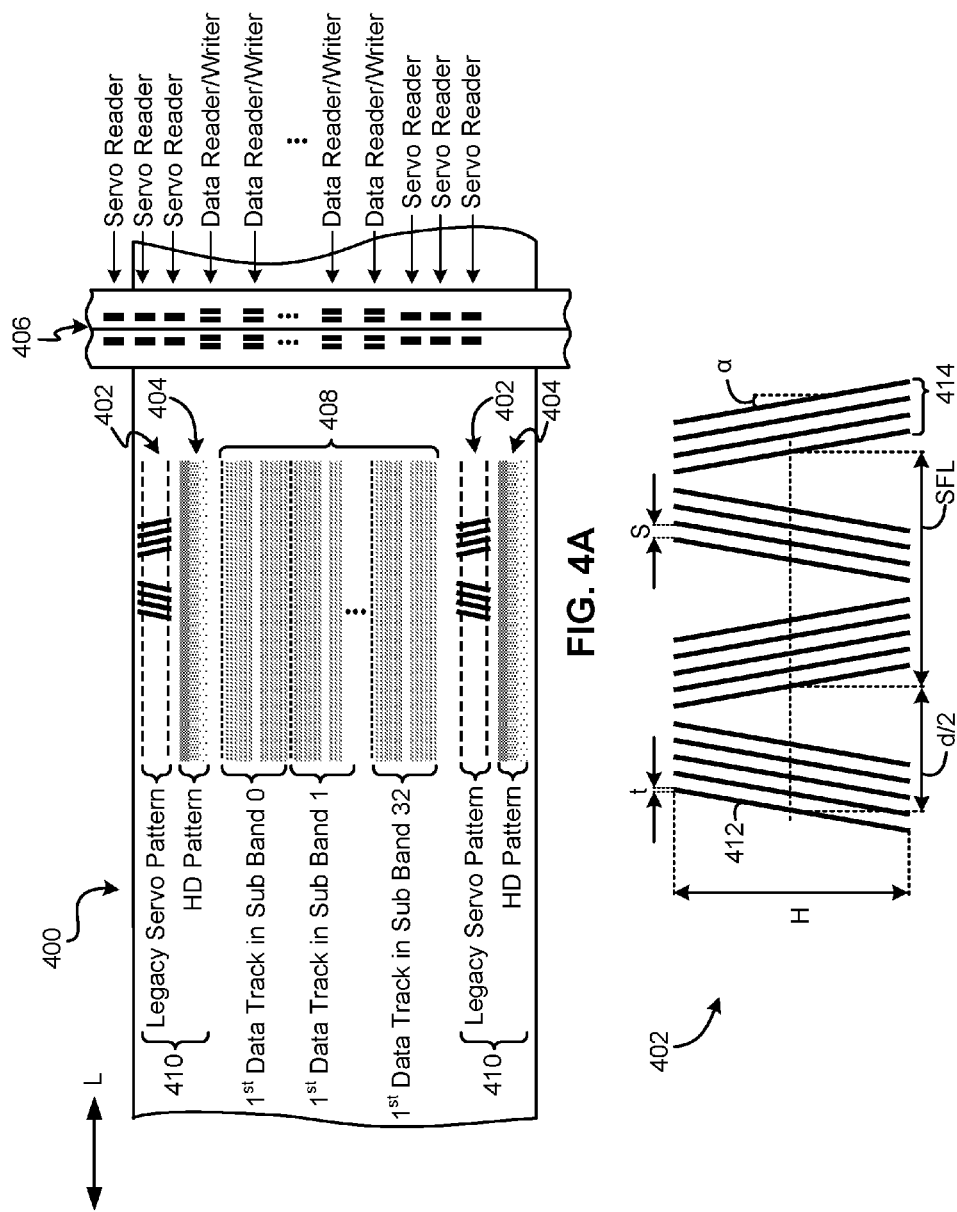

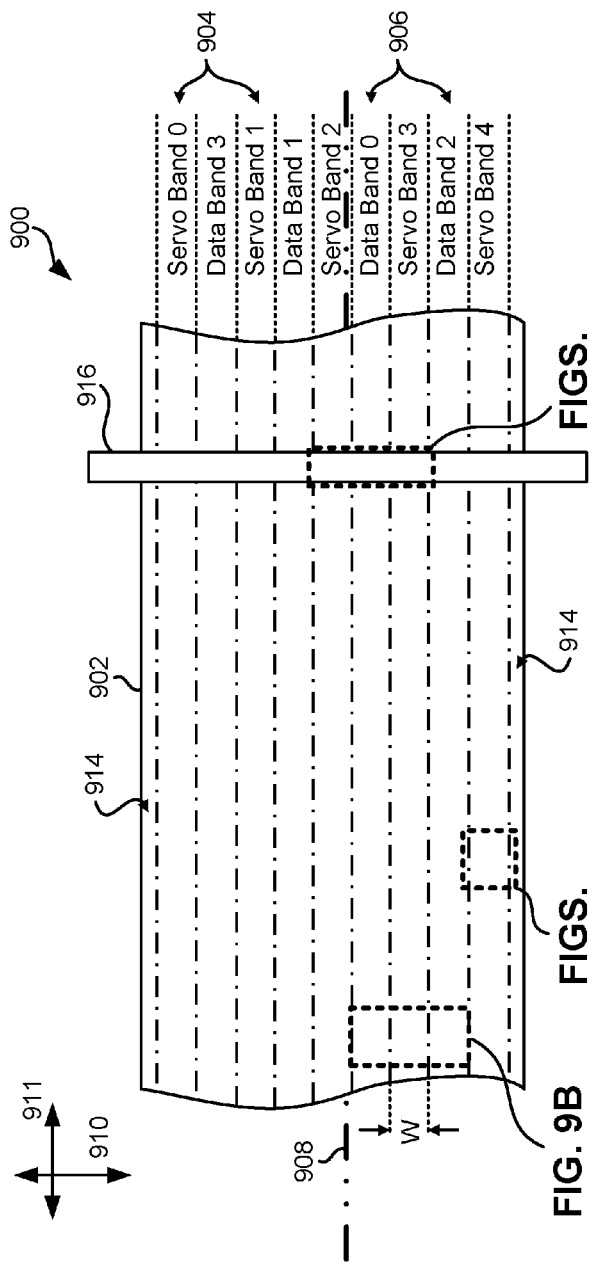
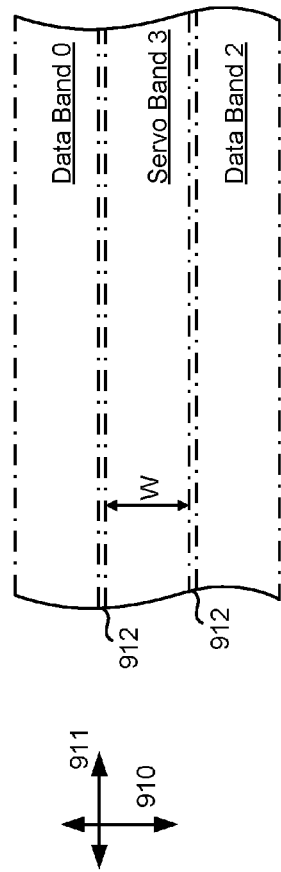

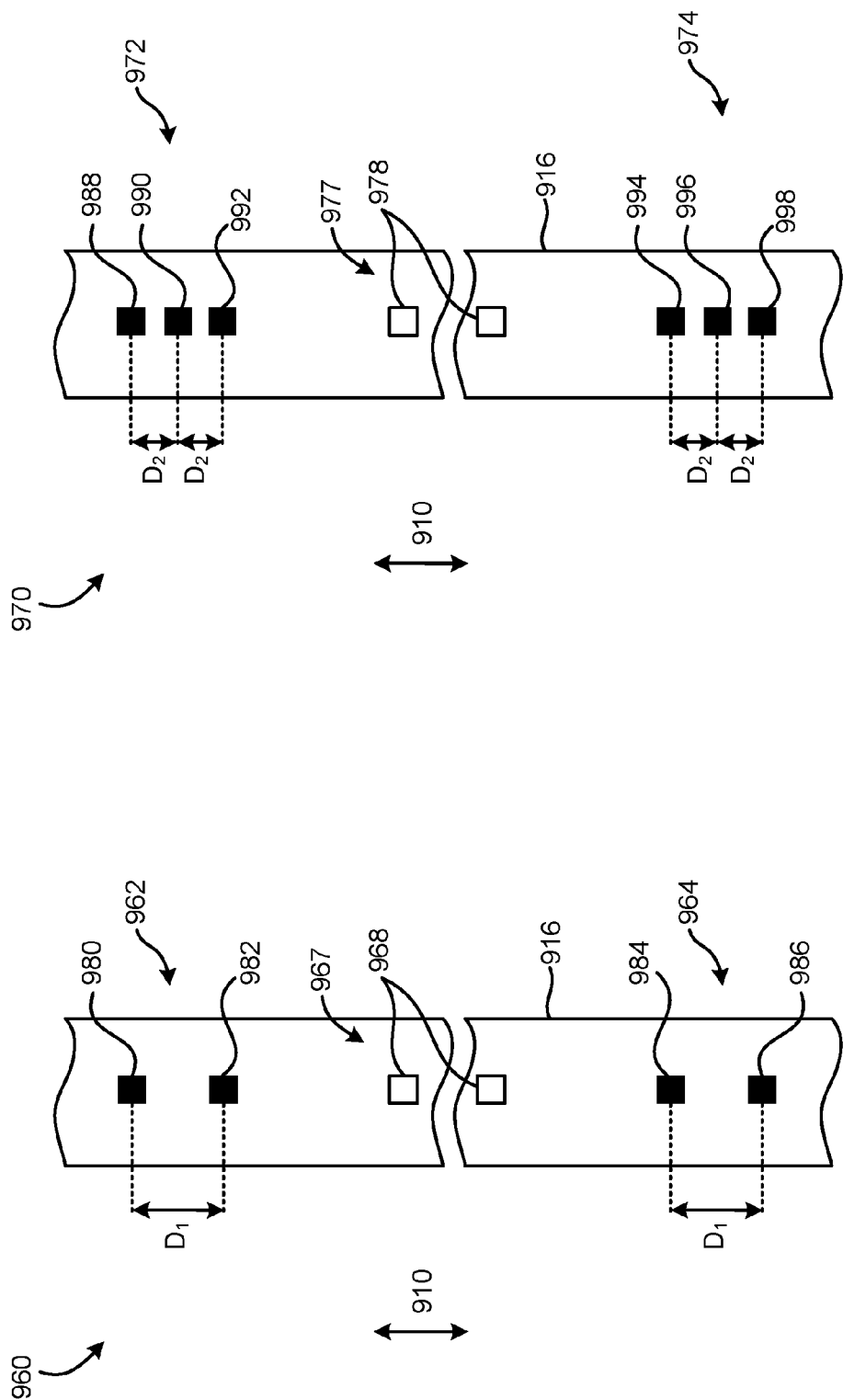

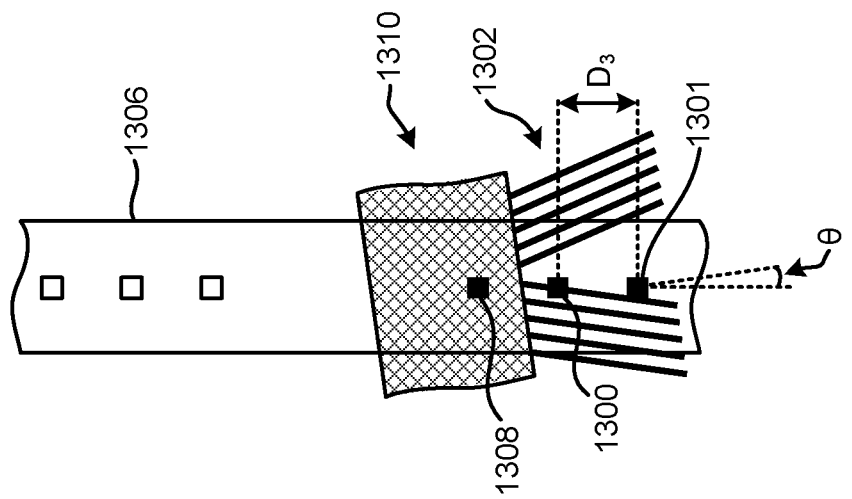
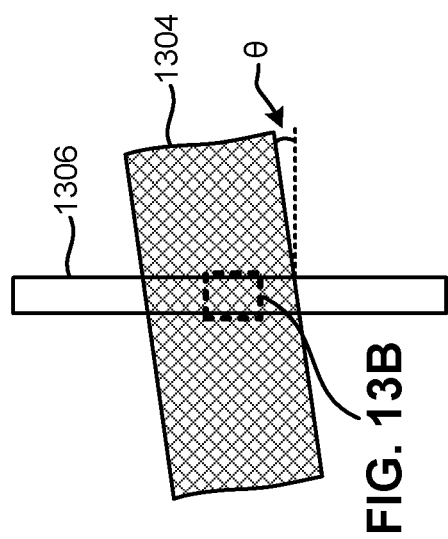
FIG. 13A
FIG. 13B

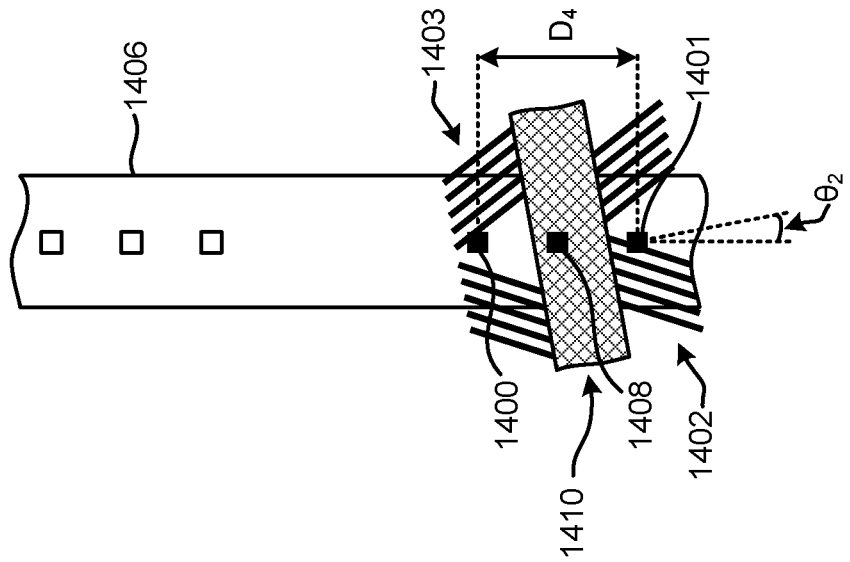
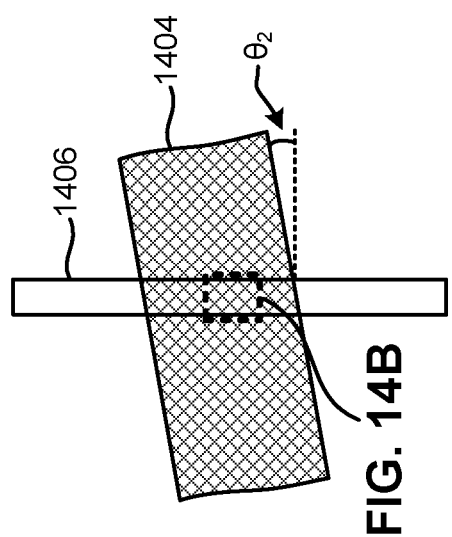
FIG. 14B
FIG. 14A

HYBRID SERVO PATTERN CONFIGURATIONS FOR MAGNETIC TAPE

BACKGROUND

The present invention relates to tape storage systems, and more specifically, to hybrid servo pattern configurations for use with magnetic tape recording systems and products.

Timing-based servo (TBS) is a technology which was developed for linear tape drives in the late 1990s. In TBS systems, recorded servo patterns include transitions with two different azimuthal slopes, thereby forming a chevron-type pattern. These patterned transitions allow for an estimate of the head lateral position to be determined by evaluating the relative timing of pulses generated by a servo reader reading the patterns as they are passed over the servo reader.

In a TBS format, the servo pattern is prerecorded in several bands distributed across the tape. Typically, five or nine servo pattern bands are included on a given tape which runs about parallel to a longitudinal axis of the tape. Data is recorded in the regions of tape located between pairs of the servo bands. In read/write heads of IBM linear tape-open (LTO) and Enterprise tape drives, two servo readers are normally available per head module, from which longitudinal position (LPOS) information as well as a position error signal (PES) may be derived. Effective detection of the TBS patterns is achieved by a synchronous servo channel employing a matched-filter interpolator/correlator, which ensures desirable filtering of the servo reader signal.

Although TBS patterns have historically been able to provide sufficient positioning data while reading from and/or writing to magnetic tape, conventional products have begun to experience setbacks in performance efficiency. Specifically, as track densities continue to increase for tape media and tape drives, accurately controlling the lateral position of a magnetic head and/or skew of the magnetic head with respect to tape by using feedback generated by reading the TBS patterns has become increasingly difficult. In fact, conventional servo based implementations may not be sufficiently accurate to ensure adequate positioning of the data readers and writers that move along data tracks of magnetic tape having a sufficiently high track density. Furthermore, the repetition rate of the head lateral position estimates may be too low to ensure proper track-following operation, as tape velocity varies during use. The repetition rate of the head lateral position estimates may additionally be unable to support future actuators with larger bandwidths. It is also important to monitor tape dimensional stability (TDS), particularly as track density and tape capacity continue to increase.

However, in the past tape skew and TDS measurements have been determined from the information from servo bands on both sides of a head module, or information from servo readers on multiple head modules. In other words, to compute skew and/or TDS, conventional products have needed to obtain valid servo information from more than one servo band and/or more than one head module. This makes such conventional head modules particularly susceptible to degraded performance and/or being rendered completely useless by servo defects, scratches caused by asperities on the surface of the magnetic tape, etc.

Some products have implemented servo bands having a hybrid servo pattern in an attempt to alleviate some of the foregoing shortcomings. Hybrid servo patterns employ a high density (HD) servo pattern in addition to the TBS pattern, thereby providing some additional information. However, products implementing hybrid servo patterns have been unable to achieve functionality while also enabling backward compatibility in a single tape drive. Backward compatibility is highly desirable for removable storage media such as magnetic tape. For instance, backward compatibility allows a given tape drive to support multiple different generations of magnetic tape. Accordingly, backward compatibility allows users to maximize flexibility of tape media resource arrangements available to them.

To achieve backward compatibility among multiple generations of magnetic tape, it is desirable that a number of data bands relative to servo bands maintain a standard ratio while the data capacity of magnetic tapes increase. Moreover, it is desirable that servo readers on a single head module are compatible with various different servo band formats. However, this has served as a significant issue for conventional products thus far. Accordingly, achieving a magnetic tape and/or system which is able to continue to increase data capacity, while also improving data track following performance, as well as maintaining a standard ratio of data bands relative to servo bands is greatly desired.

SUMMARY

A tape drive-implemented method, according to one embodiment, includes: determining a servo band configuration of servo bands on a magnetic tape, using servo readers on a magnetic tape head to read one or more of the servo bands based on the determined servo band configuration, and using information read from the one or more of the servo bands to position the magnetic tape head relative to the magnetic tape. An array of data transducers is positioned along the magnetic tape head, the array extending perpendicular to a direction of travel of the magnetic tape. Moreover, a group of the servo readers is positioned at each end of the array of data transducers, and a distance between each of the immediately adjacent servo readers in each of the groups of servo readers is less than or equal to one third of a prespecified width of each of the servo bands. The distance between each of the servo readers in each of the groups and the prespecified width are both measured in a direction perpendicular to the direction of travel of the magnetic tape.

A product, according to another embodiment, includes: a magnetic tape having a plurality of servo bands, each of the servo bands including a high density servo pattern and at least one timing based servo pattern. A combined width of the high density servo pattern and the at least one timing based servo pattern in a given servo band is less than or equal to two thirds of a prespecified width of each of the servo bands. Moreover, the combined width and the prespecified width are each measured in a direction perpendicular to a longitudinal axis of the magnetic tape.

A product, according to yet another embodiment, includes: a magnetic tape having a plurality of servo bands, each of the servo bands includes a high density servo pattern and two timing based servo patterns. A longitudinal axis of each of the two timing based servo patterns is parallel to a longitudinal axis of the high density servo pattern. Moreover, the two timing based servo patterns are positioned on opposite sides of the high density servo pattern along the direction perpendicular to the longitudinal axis of the magnetic tape. A combined width of the high density servo pattern and one of the two timing based servo patterns in a given servo band is less than or equal to two thirds of a prespecified width of each of the servo bands, the combined width and the prespecified width each being measured in a direction perpendicular to a longitudinal axis of the magnetic tape.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 4A is a partial representational view of a hybrid servo pattern written in a dedicated area of a magnetic tape medium, according to one embodiment.

FIG. 4B is a partial detailed view of a TBS pattern, according to one embodiment.

FIG. 9A is a partial representational view of a magnetic tape and magnetic tape head, according to one embodiment.

FIG. 9B is a partial detailed view of the portion of the magnetic tape of FIG. 9A inside the dashed box labeled FIG. 9B, according to one embodiment.

FIG. 9G is a partial detailed view of a portion of the magnetic tape head of FIG. 9A inside the dashed box labeled FIGS. 9G-9H, according to one approach.

FIG. 9H is a partial detailed view of a portion of the magnetic tape head of FIG. 9A inside the dashed box labeled FIGS. 9G-9H, according to one approach.

FIG. 13A is a simplified view of a magnetic tape and magnetic tape head, according to one embodiment.

FIG. 13B is a partial detailed view of a portion of the magnetic tape head and magnetic tape of FIG. 13A inside the dashed box labeled FIG. 13B, according to one approach.

FIG. 14A is a simplified view of a magnetic tape and magnetic tape head, according to one embodiment.

FIG. 14B is a partial detailed view of a portion of the magnetic tape head and magnetic tape of FIG. 14A inside the dashed box labeled FIG. 14B, according to one approach.

DETAILED DESCRIPTION

Figure 1:
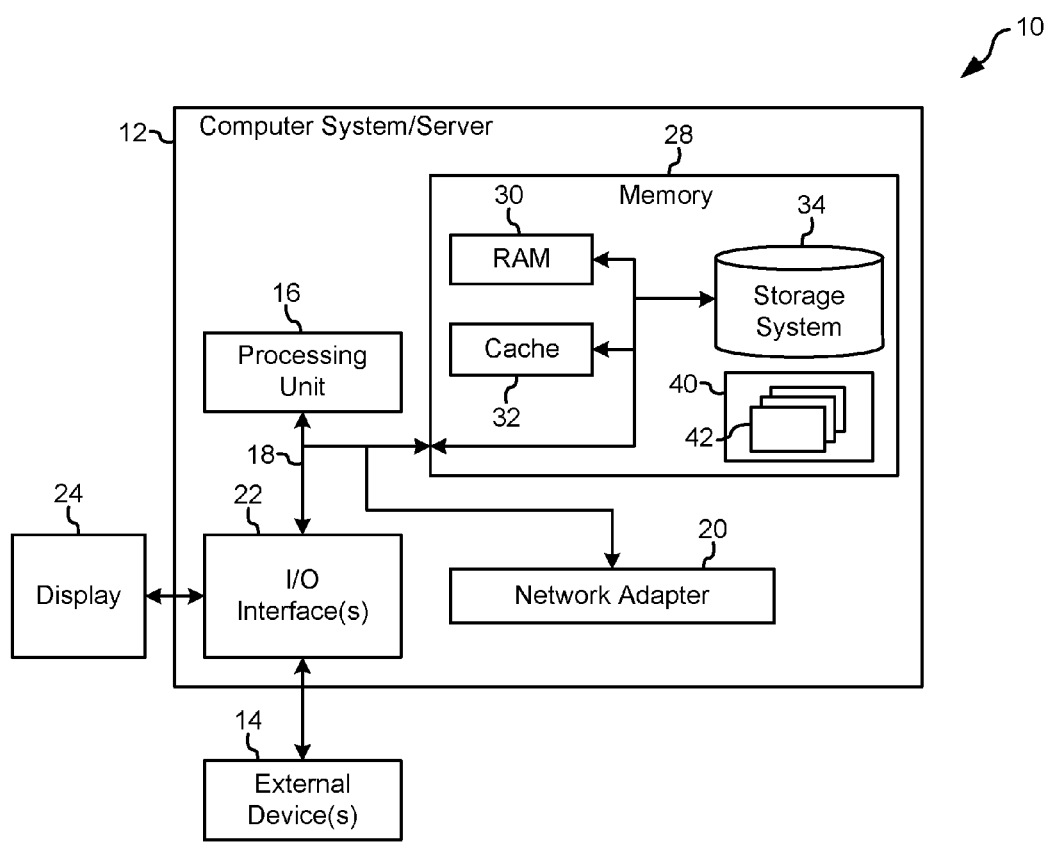
FIG. 1 is a representational view of a network storage system, according to one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of magnetic storage systems, as well as operation and/or component parts thereof for improving both magnetic tape recording systems and magnetic tape products. The number and relative spacing between the servo patterns in the various approaches described herein, as well as the number and relative spacing between servo readers in the various approaches described herein allow for a corresponding magnetic tape head and tape drive to achieve improved performance while also enabling backward compatibility for various styles (e.g., generations) of magnetic tape. As a result, by implementing various ones of the following technical features, the shortcomings experienced in conventional magnetic tape products and conventional tape drives are overcome.

In one general embodiment, a tape drive-implemented method includes: determining a servo band configuration of servo bands on a magnetic tape, using servo readers on a magnetic tape head to read one or more of the servo bands based on the determined servo band configuration, and using information read from the one or more of the servo bands to position the magnetic tape head relative to the magnetic tape. An array of data transducers is positioned along the magnetic tape head, the array extending perpendicular to a direction of travel of the magnetic tape. Moreover, a group of the servo readers is positioned at each end of the array of data transducers, and a distance between each of the immediately adjacent servo readers in each of the groups of servo readers is less than or equal to one third of a prespecified width of each of the servo bands. The distance between each of the servo readers in each of the groups and the prespecified width are both measured in a direction perpendicular to the direction of travel of the magnetic tape.

In another general embodiment, a product includes: a magnetic tape having a plurality of servo bands, each of the servo bands including a high density servo pattern and at least one timing based servo pattern. A combined width of the high density servo pattern and the at least one timing based servo pattern in a given servo band is less than or equal to two thirds of a prespecified width of each of the servo bands. Moreover, the combined width and the prespecified width are each measured in a direction perpendicular to a longitudinal axis of the magnetic tape.

In yet another general embodiment, a product includes: a magnetic tape having a plurality of servo bands, each of the servo bands includes a high density servo pattern and two timing based servo patterns. A longitudinal axis of each of the two timing based servo patterns is parallel to a longitudinal axis of the high density servo pattern. Moreover, the two timing based servo patterns are positioned on opposite sides of the high density servo pattern along the direction perpendicular to the longitudinal axis of the magnetic tape. A combined width of the high density servo pattern and one of the two timing based servo patterns in a given servo band is less than or equal to two thirds of a prespecified width of each of the servo bands, the combined width and the prespecified width each being measured in a direction perpendicular to a longitudinal axis of the magnetic tape.

Referring now to FIG. 1, a schematic of a network storage system 10 is shown according to one embodiment. This network storage system 10 is only one example of a suitable storage system and is not intended to suggest any limitation as to the scope of use or functionality of embodiments of the invention described herein. Regardless, network storage system 10 is capable of being implemented and/or performing any of the functionality set forth herein.

In the network storage system 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in the network storage system 10 is shown in the form of a general-purpose computing device. The components of computer system/server 12 may include, but are not limited to, one or more processors or processing units 16, a system memory 28, and a bus 18 that couples various system components including system memory 28 which is coupled to processor 16.

Bus 18 represents one or more of any of several types of bus structures, including a memory bus or memory controller, a peripheral bus, an accelerated graphics port, a processor or local bus using any of a variety of bus architectures, etc. By way of example, which is in no way intended to limit the invention, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and may include both volatile and non-volatile media, removable and non-removable media.

System memory 28 may include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 may be provided for reading from and writing to a non-removable, non-volatile magnetic media—not shown and typically called a "hard disk," which may be operated in a hard disk drive (HDD). Although not shown, a magnetic disk drive for reading from and writing to a removable, non-volatile magnetic disk (e.g., a "floppy disk"), and an optical disc drive for reading from or writing to a removable, non-volatile optical disc such as a compact disc read-only memory (CD-ROM), digital versatile disc-read only memory (DVD-ROM) or other optical media may be provided. In such instances, each disk drive may be connected to bus 18 by one or more data media interfaces. As will be further depicted and described below, memory 28 may include at least one program product having a set (e.g., at least one) of program modules that are configured to carry out the functions of embodiments described herein.

Program/utility 40, having a set (at least one) of program modules 42, may be stored in memory 28 by way of example, and not limitation, as well as an operating system, one or more application programs, other program modules, program data, etc. Each of the operating system, one or more application programs, other program modules, and program data or some combination thereof, may include an implementation of a networking environment. It should also be noted that program modules 42 may be used to perform the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication may occur via Input/Output (I/O) interfaces 22. Still yet, computer system/server 12 may communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, redundant array of independent disks (RAID) systems, tape drives, data archival storage systems, etc.

Figure 2:
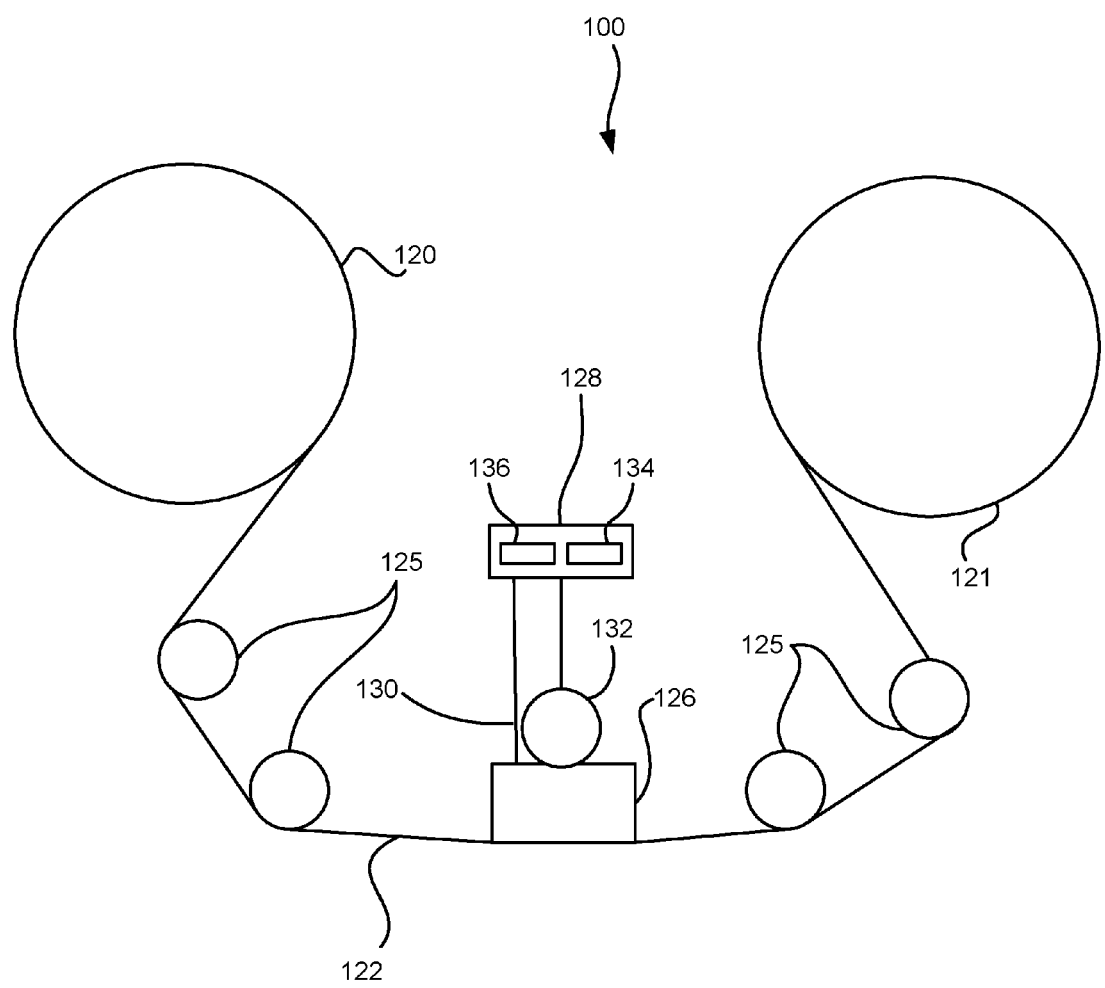
FIG. 2 is a simplified view of a tape drive in a tape-based data storage system, according to one embodiment.

Looking to FIG. 2, a tape supply cartridge 120 and a take-up reel 121 are provided to support a magnetic tape 122. One or more of the reels may form part of a removable cartridge and are not necessarily part of the tape drive 100. A tape drive, e.g., such as that illustrated in FIG. 2, may further include drive motor(s) to drive the tape supply cartridge 120 and the take-up reel 121 to move the magnetic tape 122 over a tape head 126 of any type. Such head may include an array of readers, writers, or both.

Guides 125 guide the magnetic tape 122 across the tape head 126. Such tape head 126 is in turn coupled to a controller 128 via a cable 130. The controller 128, may be or include a processor and/or any logic for controlling any subsystem of the drive 100. For example, the controller 128 may control head functions such as servo following, data writing, data reading, etc. The controller 128 may include at least one servo channel and at least one data channel, each of which include data flow processing logic configured to process and/or store information to be written to and/or read from the magnetic tape 122. The controller 128 may operate under logic known in the art, as well as any logic disclosed herein, and thus may be considered as a processor for any of the descriptions of tape drives included herein according to various embodiments. The controller 128 may be coupled to a memory 136 of any known type, which may store instructions executable by the controller 128. Moreover, the controller 128 may be configured and/or programmable to perform or control some or all of the methodology presented herein. Thus, the controller 128 may be considered to be configured to perform various operations by way of logic programmed into one or more chips, modules, and/or blocks; software, firmware, and/or other instructions being available to one or more processors; etc., and combinations thereof.

The cable 130 may include read/write circuits to transmit data to the head 126 to be recorded on the magnetic tape 122 and to receive data read by the head 126 from the magnetic tape 122. An actuator 132 controls position of the head 126 relative to the magnetic tape 122.

An interface 134 may also be provided for communication between the tape drive 100 and a host (internal or external) to send and receive the data and for controlling the operation of the tape drive 100 and communicating the status of the tape drive 100 to the host, all as will be understood by those of skill in the art.

Figure 3:
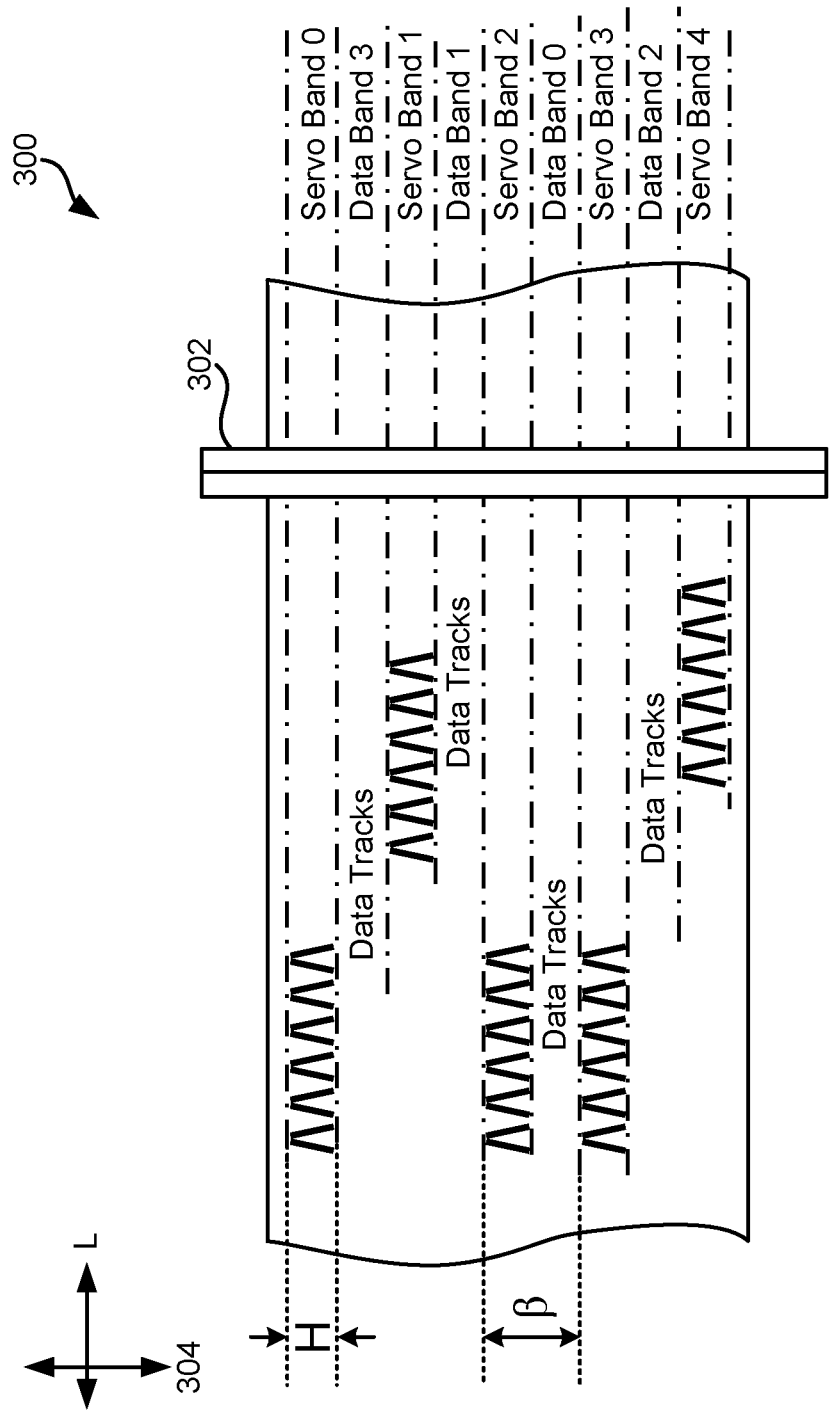
FIG. 3 is a representational view of a magnetic tape layout, according to one embodiment.

Referring momentarily to FIG. 3, an illustrative tape layout is depicted in accordance with one embodiment. As shown, magnetic tape 300 has a tape layout which implements five servo bands Servo Band 0-Servo Band 4, and four data bands Data Band 0-Data Band 3, as specified in the LTO format and IBM Enterprise format. The height H of each of the servo bands is measured in the cross-track direction 304 which is about orthogonal to the length L of the magnetic tape 300. According to an example, the height H of each of the servo bands may be about 186 microns according to the LTO format of generations 1 to 5. Moreover, a pitch β between the servo bands as shown may be about 2859 microns, again according to the LTO format of generations 1 to 5.

An exemplary tape head 302 is also shown as having two modules and as being positioned over a portion of the magnetic tape 300 according to one approach. Read and/or write transducers may be positioned on either module of the tape head 302 according to any of the approaches described herein, and may be used to read data from and/or write data to the data bands. Furthermore, tape head 302 may include servo readers which may be used to read the servo patterns in the servo bands according to any of the approaches described herein. It should also be noted that the dimensions of the various components included in FIG. 3 are presented by way of example only and are in no way intended to be limiting.

Some tape drives may be configured to operate at low tape velocities and/or with nanometer head position settings. These tape drives may use servo formats that target magnetic tape media, 4 or 8 data bands, 32 or 64 data channel operation, allow very low velocity operation, support large-bandwidth actuator operation, and improve parameter estimation to minimize standard deviation of the position error signal (PES), thus enabling track-density scaling for tape cartridge capacities up to 100 TB and beyond.

However, according to some embodiments, magnetic tape may further be augmented with additional features that provide additional functionality. Accordingly, HD servo patterns may be implemented in place of the standard TBS servo patterns, e.g., as seen in FIG. 3. The HD servo patterns may be used to improve track-following performance.

In still further embodiments, a standard TBS servo pattern (e.g., as shown in FIG. 3) may be implemented in combination with one or more HD servo patterns (e.g., see FIG. 4A below). One implementation includes a hybrid servo pattern scheme, in which a standard TBS pattern is retained and additional HD patterns are provided in a dedicated, preferably currently unused area of the magnetic tape media. This type of pattern may be implemented by increasing the number of data channels from 16 to 32, and reducing the width of the TBS pattern from 186 microns to 93 microns, in some approaches.

Figure 5C:
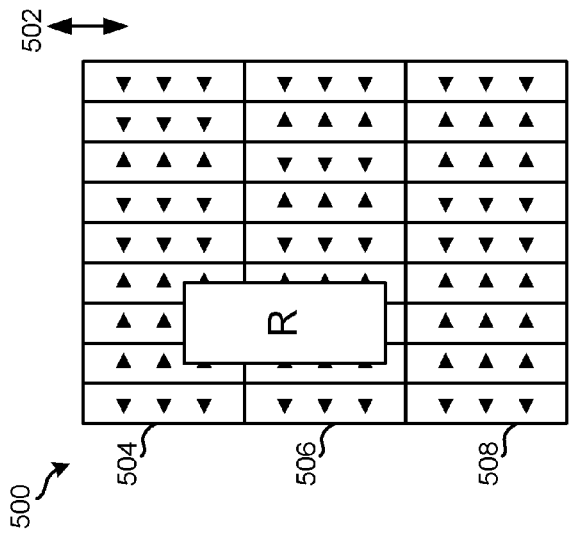
FIG. 5C is a partial detailed view of a HD pattern, according to one embodiment.
Figure 11A:
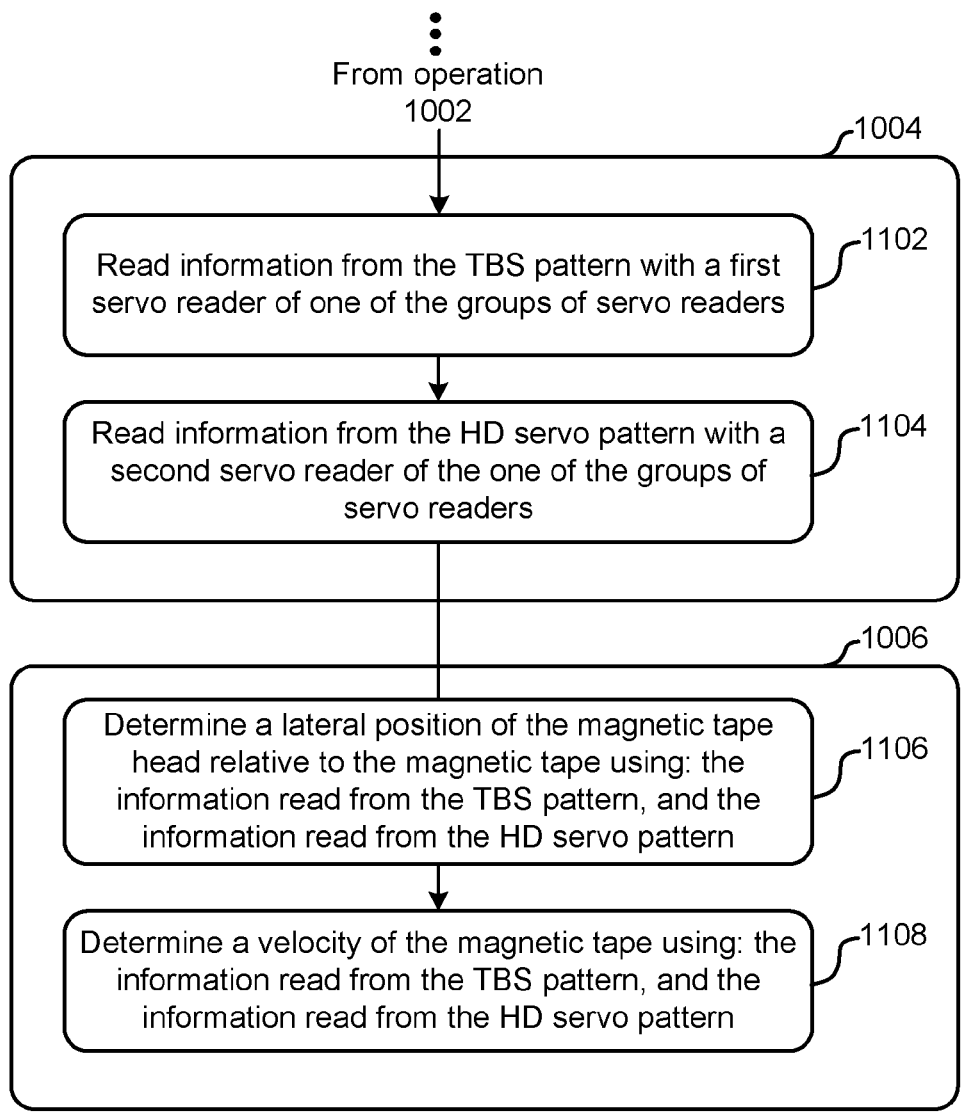
FIG. 11A is a flowchart of sub-processes of the method of FIG. 10, according to one approach.

A hybrid servo pattern 410, which includes a standard TBS pattern 402 written in a servo band, as well as an HD pattern 404 that is written in a HD band (e.g., dedicated area) of the magnetic tape medium 408 is shown in FIG. 4A. Moreover, each HD pattern 404 includes a number of HD tracks, each of the HD tracks having a respective periodic waveform, e.g., as seen in FIGS. 5A, 5C and 11A below. In some approaches, significant features of the original TBS pattern 402 are retained, such as a servo frame structure consisting of four servo bursts containing a number of servo stripes, where the servo stripes of adjacent servo bursts are written with alternating azimuthal angle. Other parameters of legacy servo patterns, such as the servo pattern height and other geometric dimensions, as well as the number of servo stripes per burst, may be modified as desired.

The HD pattern 404 may include periodic waveforms of various frequencies alternately written in the length direction L along a longitudinal axis of the magnetic tape. The standard TBS pattern 402 may be used to provide initial identification of the servo band (e.g., by providing a servo band ID); initial positioning of the head 406 on an appropriate servo location; acquisition of initial servo channel parameters, such as tape velocity, lateral head position, head-to-tape skew, longitudinal position (LPOS), etc.; etc. Moreover, the HD pattern 404 may enable more accurate and more frequent estimates of servo channel parameters, thereby achieving improved head positioning at a much wider range of tape velocities and support for larger bandwidth head actuation. As such, track-density scaling may be enabled for very large cartridge capacities, as well as improved data rate scaling with host computer requirements through the support of a wider velocity range.

The detection of the periodic waveforms forming a HD pattern may be obtained by a detector that implements a complex algorithmic conversion, e.g., such as a Discrete Fourier Transform (DFT), a Fast Fourier Transform (FFT), etc. However, this implementation complexity may reduce the flexibility in trade-offs between the rate of generation of servo reader lateral position estimates and the standard deviation of the estimation error. Accordingly, components (e.g., controllers) with high throughput may desirably be used to process signals derived from a HD pattern in order to reduce the processing time thereof.

In one embodiment, a detector capable of reading a hybrid of TBS and HD patterns may be implemented. The hybrid detector may be configured to obtain estimates of the energy of relevant spectral frequency components in a readback signal from the HD pattern, while also calculating estimates of the lateral position of the head based on these energies, without applying a DFT or a FFT.

Samples provided at the input of the components performing the spectral estimation may be obtained at the proper sampling instants by interpolating the sequence of readback HD servo signal samples from an analog-to-digital (A/D) converter at a fixed clock frequency in one embodiment, or at a variable clock frequency in another embodiment. The time base of the interpolator may be derived from the estimate of the tape velocity provided by the TBS channel operating in parallel with the HD detector, in some embodiments, as will be described in further detail below.

Various trade-offs between the rate of generation of spectral estimates, from which servo reader lateral position estimates are obtained, and the standard deviation of the estimation error are possible. However, a suitable and preferred implementation may be achieved with a significantly reduced complexity compared to DFT-based or FFT-based implementations. Specifically, in one embodiment, only a small set of spectral estimates are computed, compared to the fixed set of equally-spaced spectral components computed by a DFT or FFT. Furthermore, the integration interval may be freely adjusted, while a DFT/FFT-based solution involves the integration interval being multiples of the DFT/FFT size.

Even when the HD servo pattern uses a large number of tone frequencies, the maximum number of spectral estimates that are computed by the proposed detector may correspond to the maximum number of tracks that an HD servo reader reads simultaneously at any time. Also, the proposed detector may be reconfigured to provide spectral estimates corresponding to the tracks currently being read based on the coarse positioning information from the TBS channel.

Referring again to FIG. 4A, which shows a tape layout 400 with a hybrid servo pattern 410 according to one embodiment, in the hybrid servo pattern 410, an HD pattern 404 is written in a space adjacent to a standard TBS pattern 402. According to the present embodiment, quadrature sequences are not included due to the use of the TBS pattern 402, which is converse to products implementing servo functionality in hard-disk drives.

Looking momentarily to FIG. 4B, a partial detailed view of a TBS pattern 402 (e.g., a TBS frame) is illustrated according to an exemplary embodiment. As shown, a plurality of servo stripes 412 together form a servo burst 414, while corresponding pairs of servo bursts 414 form servo sub-frames. In the present embodiment, the servo bursts 414 included in the left servo sub-frame each have five servo stripes 412, while the servo bursts 414 included in the right servo sub-frame each have four servo stripes 412. However, in some approaches each servo sub-frame may include the same number of servo stripes 412. The servo stripes 412 included in a given servo burst 414 are oriented such that they have a same azimuthal slope represented by angle α. A distance d/2 separating the leftmost servo stripes 412 of adjacent servo bursts 414 varies depending on the approach. Moreover, corresponding pairs of servo bursts 414 have opposing azimuthal slopes, thereby forming a chevron-type pattern. The height H and thickness t of the servo stripes 412 may vary depending on the servo writer used to write the TBS pattern 402. The spacing S between each of the servo stripes 412 and/or the sub-frame length SFL between servo bursts 414 having the same azimuthal slope may also vary depending on the desired approach.

Table 1 below provides several exemplary values for various ones of the dimensions identified in FIG. 4B according to two different approaches. Each of the approaches corresponds to a magnetic tape having a different number of data channels, e.g., as would be appreciated by one skilled in the art. Moreover, it should be noted that the various dimensional values in Table 1 below are provided by way of example only and are in no way intended to limit the invention. Thus, according to various other approaches, any desired dimensional value may be implemented.

TABLE 1

| Number of data channels | α (degrees) | H (μm) | d/2 (μm) | SFL (μm) | S (μm) |
| --- | --- | --- | --- | --- | --- |
| 64 | 18 | 46.5 | 29.5 | 59.0 | 2.4 |
| 128 | 24 | 25.0 | 25.5 | 51.0 | 2.4 |

According to an exemplary approach, which is in no way intended to limit the invention, the height H may be about 186 μm, and the angle α may be about 6°, while the thickness t is about 2.1 μm. According to an exemplary approach, which is in no way intended to limit the invention, the spacing S may be about 5 μm, while the sub-frame length SFL is about 100 μm. As described above, patterned transitions such as that shown in FIG. 4B allow for an estimate of the head lateral position to be determined by evaluating the relative timing of pulses generated by a servo reader reading the servo stripes 412 of the servo burst 414 as they are passed over the servo reader.

Referring again to FIG. 4A, the HD pattern 404 may include periodic waveforms written on adjacent tracks. For example, two periodic waveforms, characterized by two different spatial frequencies: low-frequency $f_1$ and high-frequency $f_2$, where $f_2 > f_1$. However, a wider range of lateral head displacement is desired. Accordingly, a different configuration of the HD patterns may be used to avoid ambiguity in determining the lateral displacement.

An HD servo pattern preferably includes periodic waveforms of differing frequencies alternately written in the lateral (cross-track) direction. Accordingly, HD servo patterns may be able to desirably provide more accurate and/or more frequent estimates of servo channel parameters according to various embodiments described herein. Looking to FIGS. 5A-5D, an HD pattern 500 is shown that overcomes the limited range of lateral head displacement associated with an HD pattern having only two periodic waveforms, characterized by two different spatial frequencies. As shown in FIGS. 5A and 5C, at least three frequencies are used for the HD pattern 500 in adjacent tracks, which repeat periodically across the band where the HD pattern is written. In the embodiment of FIGS. 5A and 5C, the servo reader (denoted by the block labelled 'R') spans wider in the cross-track direction 502 than a single track, such that at least two tones are detected under any reading conditions at a given time when the servo reader R is overlapped with the HD pattern 500. Looking specifically to FIG. 5A, the reader R spans across both the bottom portion 508 and middle portion 506 of the HD pattern 500. FIG. 5C illustrates an alternative position for the servo reader R, where the reader R spans across the upper portion 504 and middle portion 506 of the HD pattern 500.

The three portions 508, 506, 504 of the periodic waveforms are characterized by three different frequencies $f_1$, $f_2$, and $f_3$, respectively, where $f_3 > f_2 > f_1$. According to various approaches, each waveform may be characterized as having a number of periods in a range from about 25 to about 200, such as 30 periods, 50 periods, 75 periods, 100 periods, etc., within a predetermined spacing. More preferably, the predetermined spacing may be in a range from about 50 µm to about 150 µm, such as about 60 µm, about 75 µm, about 100 µm, etc., depending on the approach. Moreover, the symbol length may be in a range from about 0.5 µm to about 3.0 µm, e.g., such as about 1.0 µm, about 1.5 µm, about 2.0 µm, etc.

Hence, with continued reference to FIGS. 5A-5D, an edge of one of the portions of the HD pattern 500 may be distinguished from the edge of another of the portions. Looking specifically to FIG. 5A, an edge of the middle portion 506 may be distinguished from an edge of the bottom portion 508 by evaluating the signals read by the servo reader R, which overlaps both portions 506, 508. The graph 510 in FIG. 5B identifies the various frequencies in the readback signal from servo reader R and the energy level corresponding to each of the respective frequencies for the position of the servo reader R shown in FIG. 5A. Energy values may be determined in some approaches by integrating over a given amount of time (or distance along the magnetic tape). As shown in graph 510, in addition to the middle frequency $f_2$, the bottom frequency $f_1$ is present in the readback signal of the servo reader R and may thereby be detected by a spectral analysis. Furthermore, the energy values of the spectral components $f_1$ and $f_2$ represent the relation of the servo reader R overlapping the middle and bottom portions 506, 508. Given that the energy value of the spectral component of frequency $f_1$ is smaller than the energy value of the spectral component of the second frequency $f_2$, it follows that the servo reader R can be determined to be overlapped with the middle portion 506 more than it is overlapped with the bottom portion 508. Moreover, a comparison of the corresponding energies may be used to determine a fine position of the servo reader R with respect to a magnetic tape.

Figure 5D:
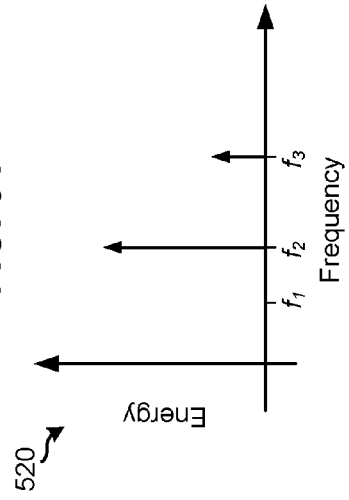
FIG. 5D is a graph plotting readback energy vs. frequency for the reader in FIG. 5C.
Figure 5A:
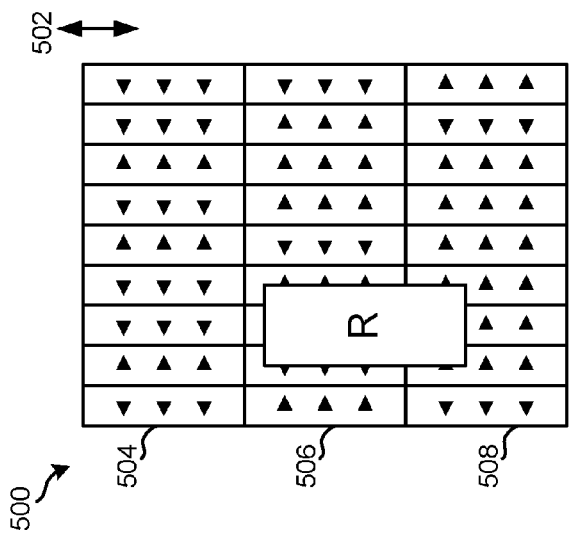
FIG. 5A is a partial detailed view of a HD pattern, according to one embodiment.
Figure 5B:
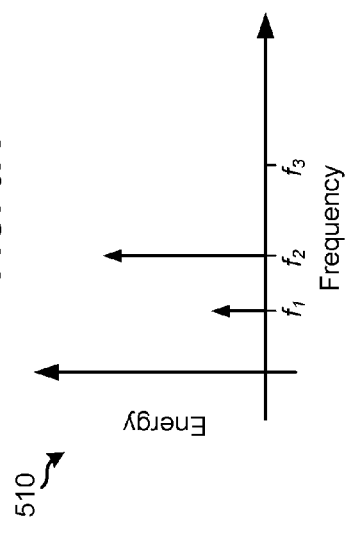
FIG. 5B is a graph plotting readback energy vs. frequency for the reader in FIG. 5A.

Similarly, the graph 520 in FIG. 5D identifies the frequencies in the readback signal from servo reader R positioned as shown in FIG. 5C, as well as the energy level corresponding to each of the respective frequencies. As shown, frequencies $f_2$, and $f_3$ are present in the readback signal of the servo reader R, and may be detected by a spectral analysis. Again, the energies of the spectral components for frequencies $f_2$, and $f_3$ indicate that the servo reader R is positioned above the upper and middle portions 504, 506. Given that the energy of the spectral component of frequency $f_3$ is smaller than the energy of the spectral component of frequency $f_2$, it follows that the servo reader R is overlapped with the middle portion 506 more than it is overlapped with the upper portion 504. Moreover, a comparison of the corresponding energy values may be used to determine a fine position of the servo reader R with respect to a magnetic tape.

Note that the waveform periods of the three frequencies may be integer multiples of a period T, for example T=241.3 nm, which corresponds to the highest spatial frequency, which is proportional to 1/T, when spectral estimation by a DFT/FFT-based detector with a minimum number of spectral bins for given integration interval is adopted.

Figure 6:
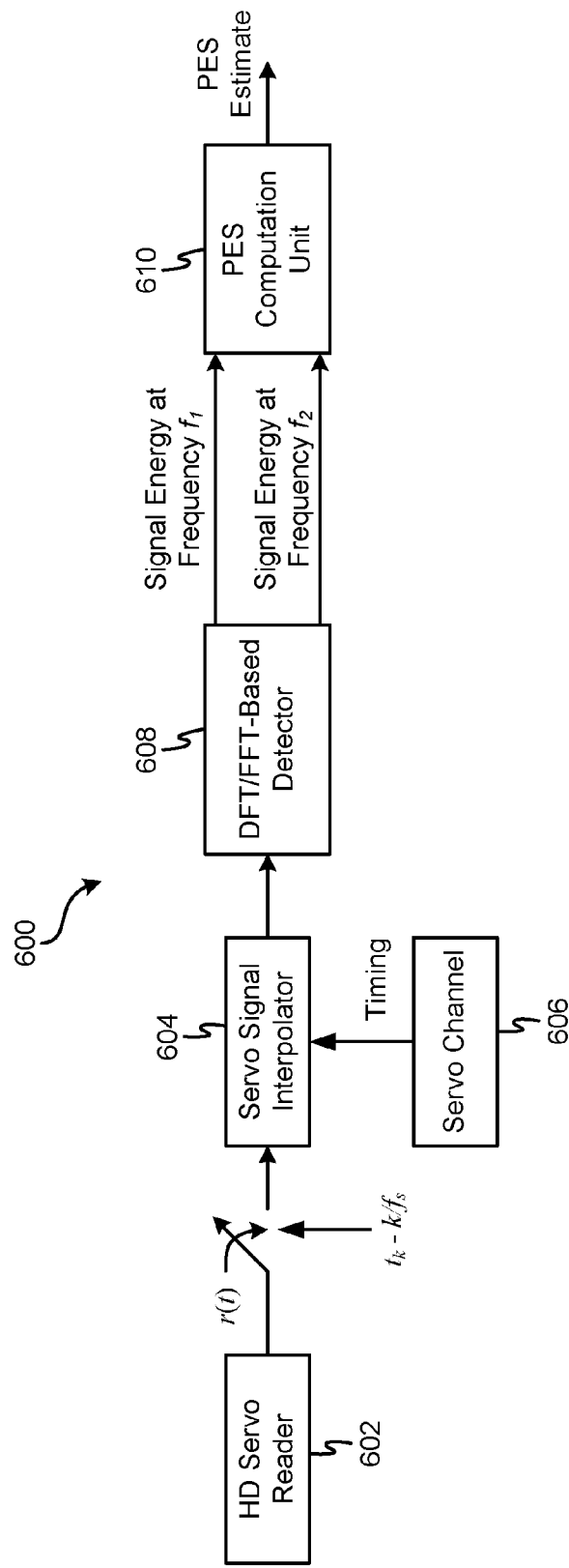
FIG. 6 is a block diagram of a detector for HD patterns, according to the prior art.

FIG. 6 shows a block diagram of a DFT/FFT-based detector 600 configured for the computation of the PES from an HD servo pattern comprising periodic waveforms. The servo signal from the servo reader 602 is interpolated using a servo signal interpolator 604 with the timing information from a synchronous servo channel 606. The interpolated signal samples are then processed by either a DFT-based or a FFT-based (DFT/FFT-based) detector 608 that estimates the signal energy values at frequencies $f_1$ and $f_2$. The DFT/FFT-based detector 608 outputs are input to a PES computation unit 610, which determines a PES estimate by taking the difference of the signal energy values.

Ideally, the two periodic waveforms, whose energies are estimated by the DFT/FFT-based detector 608, are sinusoidal waveforms at frequencies $f_1$ and $f_2$. However, a DFT/FFT-based detector 608 when used for HD patterns has an inherent drawback where the number of spectral components, for which an estimate of the energy is provided, depends on the integration interval for the DFT (or FFT) computation, and may be very large when the integration interval extends over several periods of the fundamental frequency, as is typically the case when a low-noise estimation process is used.

As the number of periodic waveform components forming the readback signal of an HD pattern is usually limited to two or three for a given lateral position, it is advantageous to resort to a low-complexity implementation of the detector, whereby only estimates of the energy of the relevant spectral components at two or three frequencies in the readback signal of an HD pattern are efficiently computed.

Figure 7:
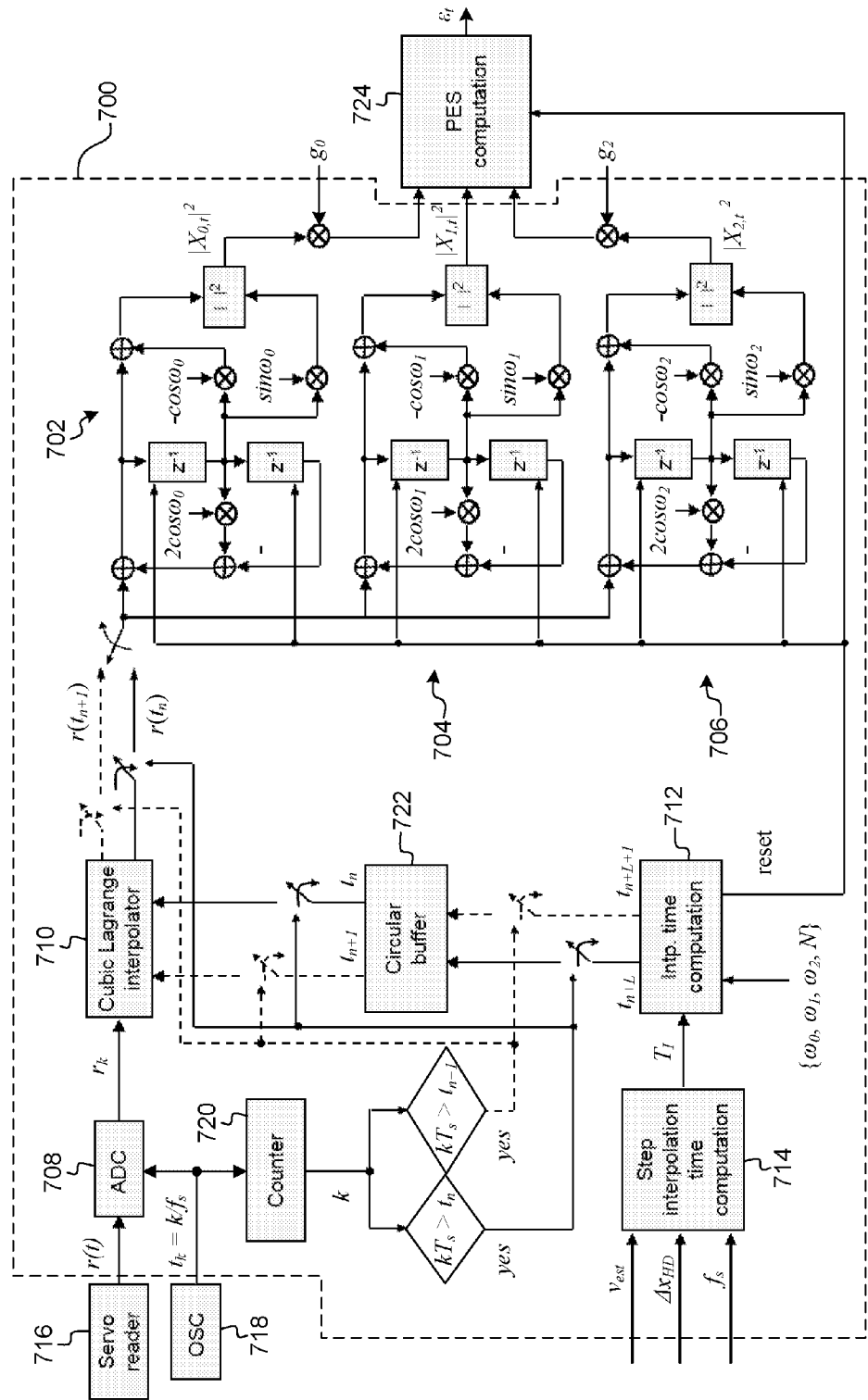
FIG. 7 is a block diagram of a detector for HD patterns, according to one embodiment.

Now referring to FIG. 7, a detector 700 for HD patterns is shown according to one embodiment. The detector 700 is configured to operate with periodic waveforms, which correspond to the components of the readback signal of an HD pattern, that are characterized by three frequencies at any time, as illustrated for example in FIGS. 5A-5B according to one embodiment. With continued reference to FIG. 7, the detector 700 includes three digital filters 702, 704, 706 with low implementation complexity, each digital filter comprising a second-order infinite impulse response (IIR) stage followed by a two-tap finite impulse response (FIR) stage, for the estimation of the energy of the readback HD servo signal at a specific frequency according to the Goertzel algorithm. Other arrangements and components may be used for the three digital filters 702, 704, 706 as would be understood by one of skill in the art upon reading the present descriptions. The waveform periods (in nm) corresponding to the three frequencies may be assumed to be integer multiples of a fundamental period, T.

For an accurate estimation of the energies of the three periodic waveform components in a finite integration interval, the frequencies of the periodic waveform components preferably match the characteristic frequencies of the three digital filters 702, 704, 706, denoted by $\omega_0/2\pi$, $\omega_1/2\pi$, and $\omega_2/2\pi$, respectively. When a match is not possible, it is preferred that the frequencies are within about 0.001% to 1.0% of the frequencies set for the three digital filters 702, 704, 706, and more preferably a difference of less than about 0.1%. This may be achieved by resampling the output sequence of the analog-to-digital converter (ADC) 708 at appropriate time instants, which may be provided by an interpolator 710, with a time base obtained from the tape velocity and a given interpolation distance $\Delta x_{HD}$, as shown in FIG. 7. The frequency $f_s$ of the clock 718, is used as an input to the ADC 708, the counter 720, and the digital circuitry of the detector 700. Moreover the frequency $f_s$ of the clock 718 may be either a fixed frequency or a variable frequency.

In one embodiment, the interpolator 710 may be a cubic Lagrange interpolator to achieve smaller signal distortion than a linear interpolator. Of course, any suitable interpolator may be used, as would be understood by one of skill in the art. The output signal samples of the interpolator 710 are obtained that correspond with HD servo signal samples taken at points on the magnetic tape that are separated by a step interpolation distance equal to $\Delta x_{HD}$, independently of the tape velocity. $\Delta x_{HD}$ is preferably selected such that the condition $T/\Delta x_{HD}=K$ is satisfied independently of the tape velocity, where K is a positive integer number. The time base for the generation of the interpolator output samples may be provided by an interpolation time computation unit 712, which yields the sequence of time instants $\{t_n\}$, at which the resampling of the ADC output sequence takes place. Time instants $\{t_n\}$ may furthermore be provided to circular buffer 722.

The detector 700 illustrated in FIG. 7 may be configured such that a given number of samples is computed by the interpolator 710 within a clock interval $T_s=1/f_s$. However, doing so may set a limit on the maximum tape velocity at which the detector 700 may operate, the maximum tape velocity represented by $2\Delta x_{HD}/T_s$. The maximum tape velocity supported by the detector 700 may be increased by allowing a larger number of samples to be computed by the interpolator 710 within a single clock interval, but doing so also increases computational complexity.

For a fixed tape velocity, the time instants $\{t_n\}$ may be uniformly spaced by $T_1$ seconds, where $T_1$ denotes the time interval that it takes for the magnetic tape to travel over a distance equal to the step interpolation distance $\Delta x_{HD}$. The estimation of the time interval $T_1$ is performed by a step interpolation time computation unit 714, which computes $T_1=\Delta x_{HD}/v_{est}$, i.e., the ratio between $\Delta x_{HD}$ and the estimate of the instantaneous tape velocity $v_{est}$, which may be obtained from the TBS channel in one approach. The TBS channel may operate as a synchronous TBS channel according to one embodiment. The average number of interpolated signal samples generated per ADC clock interval is given by the ratio $T_1/T_s$, where $T_s=1/f_s$ denotes the clock interval. The ADC clock frequency, $f_s$, may be a fixed frequency in one approach, or a variable frequency in another approach.

In one embodiment, the HD detector 700 may be configured to estimate the tape velocity to determine time instants at which to obtain interpolated signal samples to input to the Goertzel algorithm, as filtering elements based on an output of a TBS channel of the tape drive configured to process a TBS pattern written on the servo band of the magnetic tape medium may not be available.

In another embodiment, the HD detector 700 may be configured to compute a head lateral position estimate for coarse positioning of the servo reader based on an output of a TBS channel of the tape drive. Also, the HD detector 700 may be configured to adjust settings for at least one digital filter according to waveform frequency components of the HD servo signal estimated based on the head lateral position estimate. For example, the setting $\omega_i$ of the i-th digital filter may be adjusted based on the coarse position estimate and the known frequency $\omega_i=2\pi f_i$ of the HD patterns located at that estimated (coarse) lateral position. In another example, the settings of the i-th digital filter may be adjusted based on the coarse position estimate and the combination of symbol length, integration interval, etc., of the HD patterns located at that estimated (coarse) lateral position.

The HD detector 700 receives, as inputs, values of the three characteristic frequencies $\{\omega_0, \omega_1, \omega_2\}$, with $\omega_i=2\pi f_i$ from which the coefficients of the digital filters 702, 704, 706 are obtained. These frequencies may be obtained from the knowledge of the servo reader lateral position provided by the TBS channel in one embodiment, as described above. Assuming the number "Q" represents the number of samples over which the estimates of the energies of the periodic waveforms are computed, Q may determine the length of the integration interval, and therefore may also determine the spatial frequency resolution. Assuming the value of Q is even, Q/2 represents the number of frequencies for which energy estimates would be provided by a DFT/FFT-based HD detector that operates over Q samples. Q may be obtained from the tape drive memory in one embodiment. Moreover, Q is typically about 100 or larger.

Multiplication of the three energy estimates by gain factors $g_i$, for $i=0, 1, 2$, is provided to compensate for the different attenuations that the readback HD servo signal may experience at different frequencies, where the normalization $g_1=1$ may be assumed. Hence, a lateral position estimate of the HD servo reader 716, and hence a position error signal from the knowledge of the target head position, may be obtained by a linear combination of the three energy estimates. Note that the maximum number of spectral estimates that are computed at any time is determined by the maximum number of tracks that may be read by the HD servo reader 716, which may equal three in some approaches, and not by the overall number of tones in the HD servo pattern, which may be larger than three. In a case where the number of tones is larger than three, the values of the three characteristic frequencies $\{\omega_0, \omega_1, \omega_2\}$ that are provided to the HD detector 700 may be derived from knowledge of the lateral position estimate obtained from the TBS channel, as mentioned above.

In another embodiment, the HD detector 700 may be implemented without an interpolator 710, but with digital filters configurable to adjust their settings according to the waveform spatial frequency components of the HD servo signal read from the magnetic tape medium and the tape velocity. Adjustment of the digital filters settings may be based on a coarse head lateral position estimate and/or a tape velocity estimate computed based on an output of a TBS channel of the tape drive.

In an alternate embodiment, an HD detector may implement additional digital filters, in excess to the digital filters used to estimate the energies at the frequencies corresponding to the patterns written on the tracks being read simultaneously by the HD servo reader 716. The one or more excess digital filters may be used to simplify reconfiguration of the detector when the target lateral position changes and, therefore, the input values of frequencies $\{\omega_x\}$ vary dynamically.

In a further embodiment, the one or more excess digital filters may be used to distinguish HD patterns characterized by a small number of spectral components/lines from broadband noise and/or data signals. This may be achieved by choosing the characteristic frequency $\omega_i$ of the excess digital filter such that it measures a spectral component at a frequency that is not used by the HD patterns.

The outputs $|X_{i,j}|^2$ from the three digital filters 702, 704, 706 are provided to a PES computation unit 724, which provides a position error estimate ($\epsilon_t$) at given time t.

Other components of the HD detector 700 may operate as would be known to one of skill in the art, and are omitted here for the sake of clarity of the described embodiments.

As described above, in the past tape skew and TDS measurements have been determined from the information from servo bands on both sides of a head module, or information from servo readers on multiple head modules. In other words, to compute skew and/or TDS, conventional products have needed to obtain valid servo information from more than one servo band and/or more than one head module. This makes such conventional head modules particularly susceptible to degraded performance and/or being rendered completely useless by servo defects, scratches caused by asperities on the surface of the magnetic tape, etc.

Although hybrid servo patterns provide some additional information which may be used to improve track following performance, conventional products have been unable to implement such hybrid servo patterns while also achieving backward compatibility. Backward compatibility is highly desirable for removable storage media such as magnetic tape. For instance, backward compatibility allows a given tape drive to support multiple different generations of magnetic tape. Accordingly, backward compatibility allows users to maximize flexibility of tape media resource arrangements available to them.

To achieve backward compatibility among multiple generations of magnetic tape, it is desirable that a number of data bands relative to servo bands maintains a standard ratio while also complying with data transducer configurations employed to achieve further increases in data capacity of the magnetic tapes. Moreover, it is desirable that servo readers on a single head module are compatible with various different servo band formats. However, this has served as a significant issue for conventional products thus far. Accordingly, achieving a magnetic tape product and/or system which is able to continue to increase data capacity, while also improving data track following performance, as well as maintaining a standard ratio of data bands relative to servo bands is greatly desired.

Figure 8A:
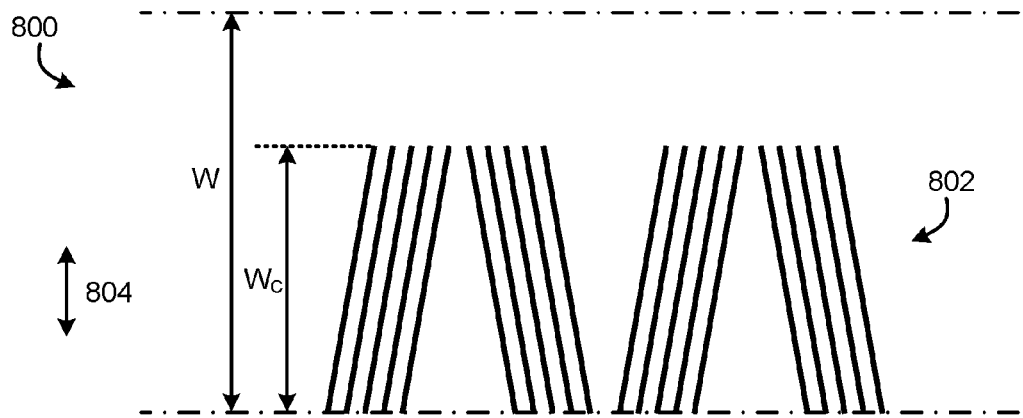
FIG. 8A is a partial representational view of a conventional servo band.
Figure 8B:
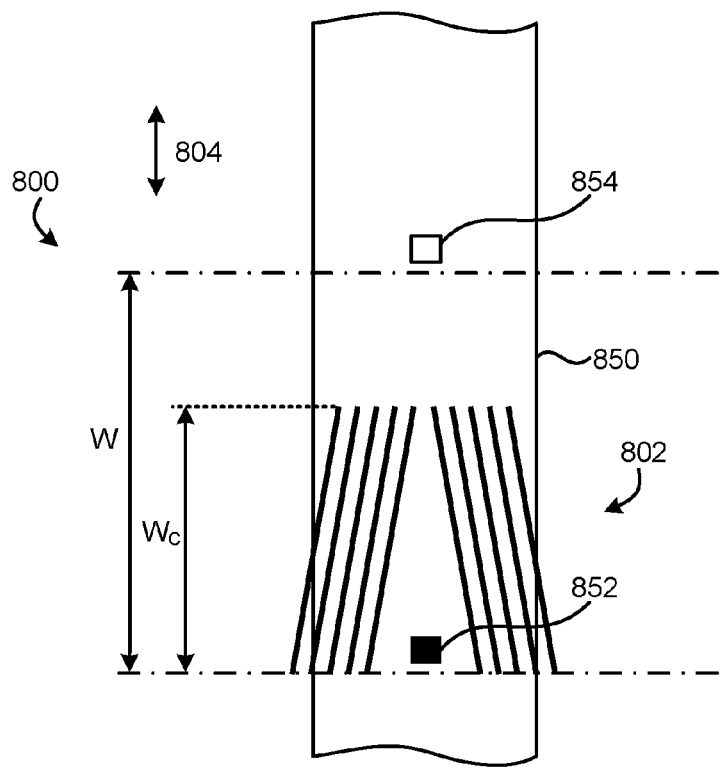
FIG. 8B is a partial representational view of a conventional head module positioned over the conventional servo band of FIG. 8A.

Looking momentarily to FIG. 8A, a partial representational view of a conventional servo band 800 is illustrated. The conventional servo band 800 includes a TBS pattern 802 having a width $W_C$ which extends in the cross-track direction 804. The width $W_C$ of the conventional TBS pattern 802 is about two thirds of a width W of the servo band 800 itself as shown in FIG. 8A. Therefore, a portion (about one third) of the servo band 800 remains unused. Moreover, FIG. 8B illustrates a portion of a conventional head module 850 positioned over the conventional servo band 800. As shown, the module 850 includes a single servo reader 852 which is positioned over the conventional TBS pattern 802. The module 850 also includes 32 data transducers 854 (not all of which are shown) extending along the cross-track direction 804.

As previously mentioned, conventional products implementing conventional servo bands and conventional head modules, e.g., such as those illustrated in FIGS. 8A-8B, determine tape skew and TDS measurements from the information read from servo bands on both sides of a head module, or information read from servo readers on multiple head modules. In other words, to compute skew and/or TDS, conventional products have needed to obtain valid servo information from more than one servo band and/or more than one head module. This makes such conventional head modules particularly susceptible to degraded performance and/or being rendered completely useless by servo defects, scratches caused by asperities on the surface of the magnetic tape, etc. For example, should the single servo reader 852 of FIG. 8B no longer be able to read the conventional TBS pattern 802, the conventional head module 850 is effectively rendered useless.

It should be noted that the embodiments illustrated in FIGS. 8A-8B are presented simply to illustrate a conventional product by way of example, and are no way intended to limit the invention. In sharp contrast to the foregoing conventional products illustrated in FIGS. 8A-8B, various embodiments described and/or suggested herein achieve significant improvements to track following performance, increased data capacity, backward compatibility, etc., as will be described in further detail below.

Looking now to FIG. 9A, a product 900 is illustrated in accordance with one embodiment. As an option, the present product 900 may be implemented in conjunction with features from any other embodiment listed herein, such as those described with reference to the other FIGS., such as FIGS. 1-7. However, such product 900 and others presented herein may be used in various applications and/or in permutations which may or may not be specifically described in the illustrative embodiments listed herein. Further, the product 900 presented herein may be used in any desired environment. Thus FIG. 9A (and the other FIGS.) may be deemed to include any possible permutation.

As shown, product 900 of FIG. 9A includes a magnetic tape 902 having a plurality of servo bands 904 and data bands 906 which run (extend) parallel to each other along the longitudinal axis 908 of the magnetic tape 902. According to the present approach, the magnetic tape 902 includes 5 servo bands 904 and 4 data bands 906, but may include any desired number of servo bands and/or data bands depending on the desired approach.

When produced, the extents of the servo bands 904 and/or data bands 906 (represented in FIG. 9A by the dashed lines running parallel to the longitudinal axis 908 of the magnetic tape 902) may not be defined by anything that is actually formed (e.g., written) along the length of the magnetic tape 902 itself. Rather, the extents of the servo bands 904 and/or data bands 906 may be defined by a format which the magnetic tape 902 corresponds to. For example, a format corresponding to FIG. 9A may specify that the magnetic tape 902 includes the 5 servo bands 904 and 4 data bands 906 depicted. Moreover, the format may include a prespecified width W for each of the 5 servo bands 904, measured in the cross-track direction 910 which is perpendicular to the longitudinal axis 908 of the magnetic tape 902 (along with the direction of travel of the magnetic tape 911). In some approaches, the format may also include a prespecified width (not shown) for each of the 4 data bands 906, preferably measured in the cross-track direction 910. Moreover, it should be noted that the prespecified width W is preferably the same for each of the 5 servo bands 904 on the magnetic tape 902. According to an example, which is in no way intended to limit the invention, the prespecified width W may be about 93 μm. According to another example, the prespecified width W may be about 140 μm.

The prespecified width W of the servo bands 904 effectively defines the outer lateral edges of the servo band itself. Thus, data may be written immediately adjacent the outer extents of the servo bands 904 along the cross-track direction 910 in some approaches. In other approaches, the magnetic tape 902 may implement guard bands which separate the servo bands 904 from the data bands 906 along the cross-track direction 910. Referring momentarily to FIG. 9B, Servo Band 3 is shown as being separated from Data Band 0 and Data Band 2 by guard bands 912 which extend along the length of the magnetic tape 902. Moreover, as previously mentioned, the prespecified width of the servo band 904 preferably does not include the lateral extent of the magnetic tape 902 occupied by the guard bands 912.

Referring again to FIG. 9A, the outermost servo bands 904 may similarly be recessed from the outer lateral extents of the magnetic tape 902 by a lateral offset 914 as shown. The lateral offsets 914 may prevent reduced tape-drive performance caused by the magnetic tape 902 traveling up the flanges of a tape guide (e.g., see 125 of FIG. 2). However, the prespecified width of the servo bands 904 preferably does not include the lateral extent of the magnetic tape 902 occupied by the offsets 914 either.

Figure 15:
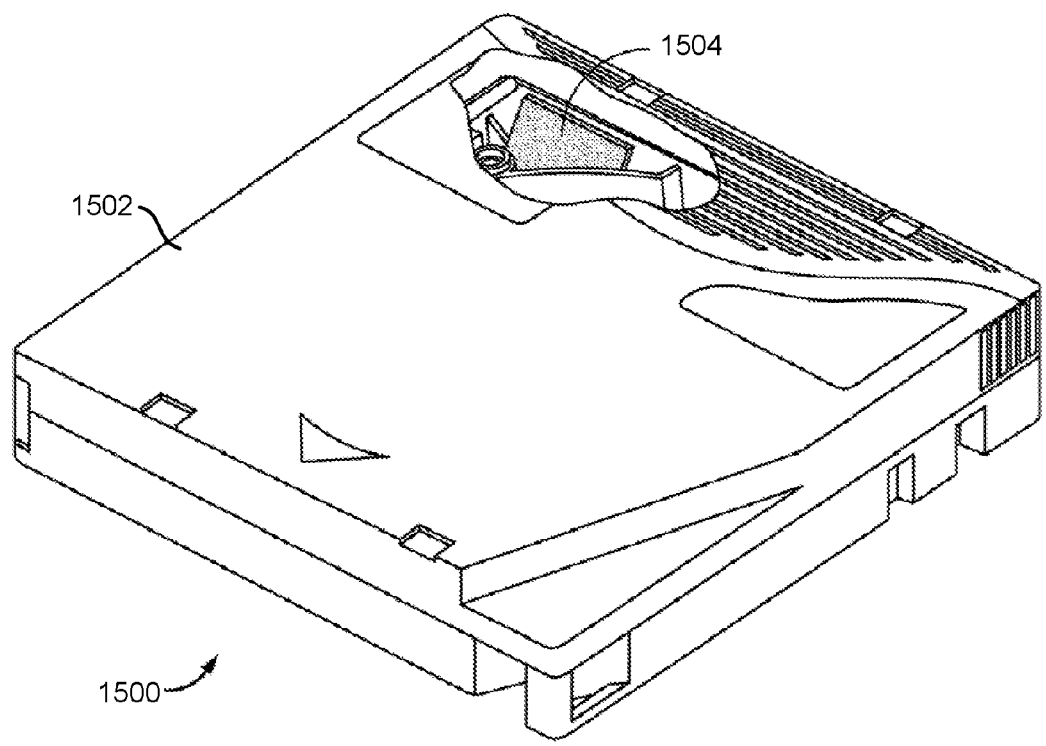
FIG. 15 is a perspective view of a data storage cartridge having a cutaway portion, according to one embodiment.

The format of a magnetic tape may be stored differently in different approaches. In some approaches, the format corresponding to the magnetic tape 902 of FIG. 9A may be written in a header of the magnetic tape itself during production of the magnetic tape 902, whereby the format may be read by a magnetic tape head accessing the magnetic tape 902. In other approaches, the format corresponding to the magnetic tape 902 may be stored in memory coupled to a cartridge which houses the magnetic tape 902. For instance, referring momentarily to FIG. 15, the data storage cartridge 1500 includes a cartridge memory 1504 shown in a cutaway portion of the Figure, which is in no way intended to limit the invention. Further still, in other approaches the format corresponding to a magnetic tape may be stored in a barcode coupled to a magnetic tape cartridge. Therefore, as alluded to above, the prespecified width of the servo bands of a given magnetic tape may be determined by accessing the format corresponding to the magnetic tape from any of the foregoing potential storage locations. Moreover, format information may generally be used to look up specific formatting dimensions which correspond to the given type (e.g., generation, style, etc.) of magnetic tape.

Although the lateral extents of the servo bands 904 and/or data bands 906 may not actually be formed on the magnetic tape 902, the magnetic tape 902 preferably does have servo patterns (not shown in FIG. 9A) formed in the servo bands 904 along the length of the magnetic tape 902. The servo patterns may be written by a servo writer and may have different forms, thereby resulting in the servo bands having different configurations depending on the approach, e.g., as will soon become apparent.

Figure 9C:
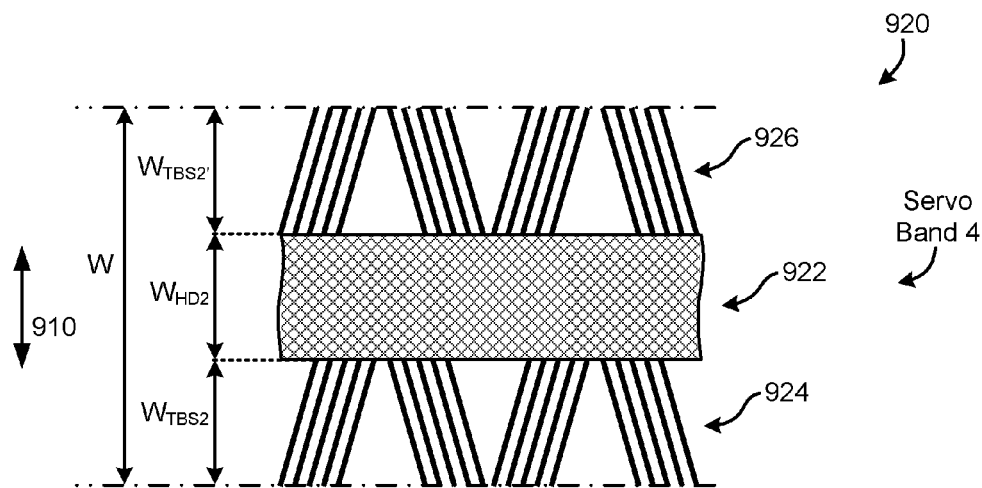
FIG. 9C is a partial detailed view of a data band of the magnetic tape of FIG. 9A inside the dashed box labeled FIGS. 9C-9F, according to one approach.

Looking now to FIGS. 9C-9F, several different servo band configurations 920, 930, 940, 950 are illustrated in accordance with different approaches of the product illustrated in FIG. 9A. It should be noted that any of the different servo band configurations 920, 930, 940, 950 illustrated in FIGS. 9C-9F may be implemented in the servo bands 904 of the magnetic tape 902 in FIG. 9A. Further, the servo band configurations 920, 930, 940, 950 illustrated in FIGS. 9C-9F may be used in any desired environment.

Each of the servo band configurations 920, 930, 940, 950 depicted in FIGS. 9C-9F include a HD servo pattern and at least one TBS servo pattern. Two of the servo band configurations 920, 940 include a second TBS pattern, which is in no way intended to limit the invention. Moreover, a combined width of the HD servo pattern and one of the at least one TBS servo pattern in a given servo band is preferably less than or equal to two thirds of a prespecified width of the given servo band, as will be described in further detail below.

Referring specifically to FIG. 9C, the servo band configuration 920 is of a second type and includes a HD servo pattern 922 along with a first TBS servo pattern 924 and a second TBS servo pattern 926. As shown, the HD servo pattern 922 is sandwiched between the first and second TBS servo patterns 924, 926 along the cross-track direction 910, such that the two TBS patterns 924, 926 are positioned on opposite sides of the HD servo pattern 922 in the cross-track direction 910. Moreover, a longitudinal axis of each of the two TBS patterns 924, 926 is parallel to a longitudinal axis of the HD servo pattern 922.

A width $W_{HD2}$ of the HD servo pattern 922 (measured in the cross-track direction 910) may be less than or equal to one third of the prespecified width W of the given servo band Servo Band 4. Moreover, a width $W_{TBS2}$ of the first TBS servo pattern 924 and a width $W_{TBS2'}$ of the second TBS servo pattern 926 (both measured in the cross-track direction 910) are each less than or equal to one third of the prespecified width W of the given servo band Servo Band 4. Accordingly, a combined width of the HD servo pattern 922 and one of the TBS servo patterns 924, 926 may be less than or equal to two thirds of the prespecified width W of the servo band. The upper TBS pattern 926 may be located in a region of the servo band that otherwise is reserved as an unused region. Therefore, the servo band configuration 920 may extend fully across the prespecified width W of the servo band. For approaches in which the magnetic tape does not include a guard band, one or both of the TBS patterns 924, 926 may abut (e.g., be immediately adjacent) a location where a first data track may be written in the adjacent data band. However, for approaches in which a data band is present, one or both of the TBS patterns 924, 926 may still be separated from the location where a first data track may be written by a guard band, e.g., as would be appreciated by one skilled in the art after reading the present description.

Figure 9D:
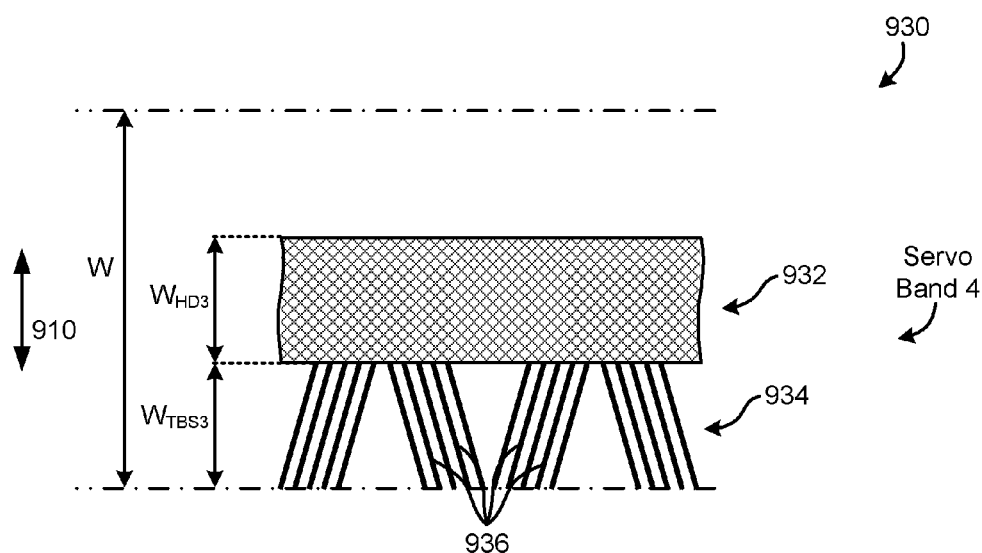
FIG. 9D is a partial detailed view of a data band of the magnetic tape of FIG. 9A inside the dashed box labeled FIGS. 9C-9F, according to one approach.

Now looking to FIG. 9D, the servo band configuration 930 is of a third type and includes a HD servo pattern 932 along with a TBS servo pattern 934. As shown, the HD servo pattern 932 is positioned immediately adjacent a side of the TBS servo pattern 934 on which the ends of the servo bursts 936 are closest together. However, in other approaches the HD servo pattern 932 may be positioned on the opposite side of the TBS servo pattern 934 (on which the ends of the servo bursts 936 are farthest apart). Moreover, a longitudinal axis of the TBS pattern 934 is parallel to a longitudinal axis of the HD servo pattern 932.

A width $W_{HD3}$ of the HD servo pattern 932 (measured in the cross-track direction 910) may be less than or equal to one third of the prespecified width W of the given servo band Servo Band 4. Moreover, a width $W_{TBS3}$ of the TBS servo pattern 934 is also less than or equal to one third of the prespecified width W of the given servo band Servo Band 4. Accordingly, a combined width of the HD servo pattern 932 and the TBS servo pattern 934 may be less than or equal to two thirds of the prespecified width W of the servo band.

Figure 9E:
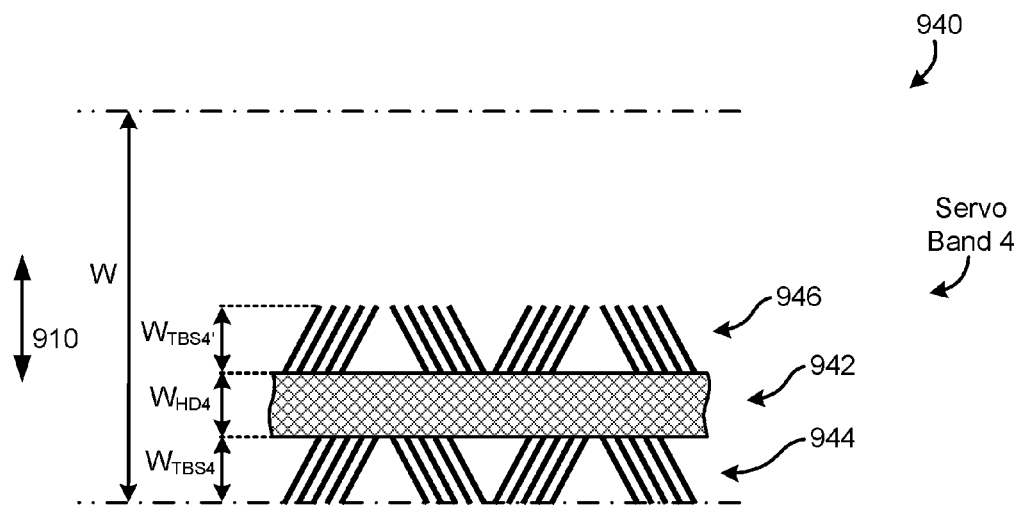
FIG. 9E is a partial detailed view of a data band of the magnetic tape of FIG. 9A inside the dashed box labeled FIGS. 9C-9F, according to one approach.

Referring specifically to FIG. 9E, the servo band configuration 940 is of a fourth type and includes a HD servo pattern 942 along with a first TBS servo pattern 944 and a second TBS servo pattern 946. As shown, the HD servo pattern 942 is sandwiched between the first and second TBS servo patterns 944, 946 along the cross-track direction 910, such that the two TBS patterns 944, 946 are positioned on opposite sides of the HD servo pattern 942 in the cross-track direction 910. Moreover, a longitudinal axis of each of the two TBS patterns 944, 946 is parallel to a longitudinal axis of the HD servo pattern 942.

A width $W_{HD3}$ of the HD servo pattern 932 (measured in the cross-track direction 910) may be less than or equal to one third of the prespecified width W of the given servo band Servo Band 4. Moreover, a width $W_{TBS3}$ of the TBS servo pattern 934 may also be less than or equal to one third of the prespecified width W of the given servo band Servo Band 4. Preferably, the width $W_{HD3}$ of the HD servo pattern 932 and the width $W_{TBS3}$ of the TBS servo pattern 934 are each less than or equal to one sixth of the prespecified width W of the given servo band Servo Band 4. Accordingly, a combined width of the HD servo pattern 932 and the TBS servo pattern 934 may be less than or equal to two thirds, preferably the width of the servo patterns 932 and 934 are each less than or equal to one third, of the prespecified width W of the servo band.

A width $W_{HD4}$ of the HD servo pattern 942 (measured in the cross-track direction 910) may be less than or equal to one third of the prespecified width W of the given servo band Servo Band 4. Moreover, a width $W_{TBS4}$ of the first TBS servo pattern 944 and a width $W_{TBS4'}$ of the second TBS servo pattern 946 (both measured in the cross-track direction 910) may each be less than or equal to one third of the prespecified width W of the given servo band Servo Band 4. However, it is preferred that the width $W_{HD4}$ of the HD servo pattern 942 and the width $W_{TBS4}$, $W_{TBS4'}$ of each respective one of the TBS servo patterns 944, 946 are each less than or equal to one sixth of the prespecified width W of the given servo band Servo Band 4. Accordingly, a combined width of the HD servo pattern 942 and one of the TBS servo patterns 944, 946 may be less than or equal to two thirds, preferably less than or equal to one third, of the prespecified width W of the servo band.

Figure 9F:
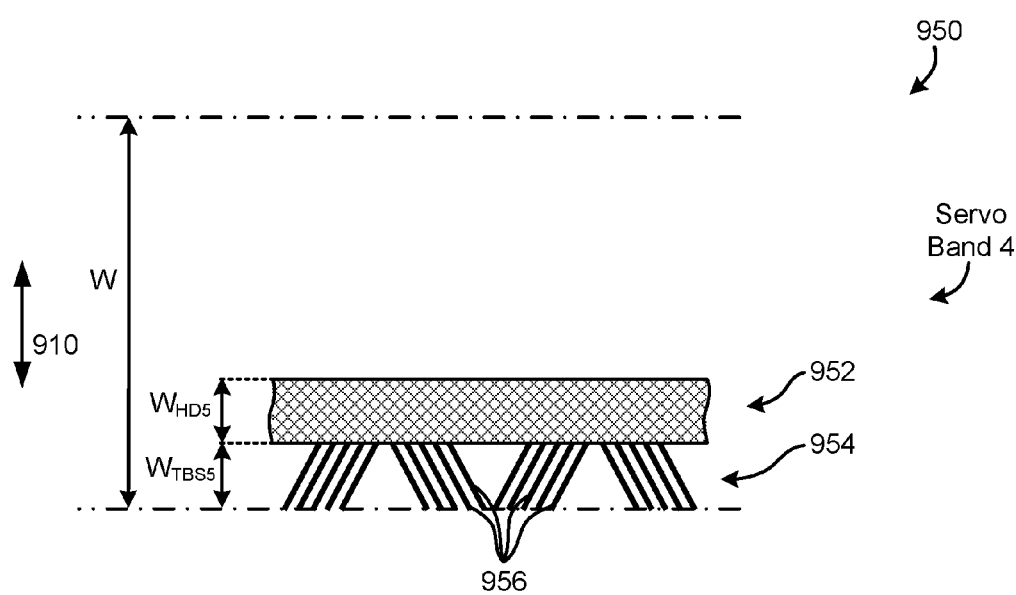
FIG. 9F is a partial detailed view of a data band of the magnetic tape of FIG. 9A inside the dashed box labeled FIGS. 9C-9F, according to one approach.

Now looking to FIG. 9F, the servo band configuration 950 is of a fifth type and includes a HD servo pattern 952 along with a TBS servo pattern 954. As shown, the HD servo pattern 952 is positioned immediately adjacent a side of the TBS servo pattern 954 on which the ends of the servo bursts 956 are closest together. However, in other approaches the HD servo pattern 952 may be positioned on the opposite side of the TBS servo pattern 954 (on which the ends of the servo bursts 956 are farthest apart). Moreover, a longitudinal axis of the two TBS pattern 954 is parallel to a longitudinal axis of the HD servo pattern 952.

A width $W_{HD5}$ of the HD servo pattern 952 (measured in the cross-track direction 910) may be less than or equal to one third of the prespecified width W of the given servo band Servo Band 4. Moreover, a width $W_{TBS5}$ of the TBS servo pattern 954 is also less than or equal to one third of the prespecified width W of the given servo band Servo Band 4. Preferably, the width $W_{HD5}$ of the HD servo pattern 952 and the width $W_{TBS5}$ of the TBS servo pattern 954 are each less than or equal to one sixth of the prespecified width W of the given servo band Servo Band 4. Accordingly, a combined width of the HD servo pattern 952 and the TBS servo pattern 954 may be less than or equal to two thirds, preferably less than or equal to one third, of the prespecified width W of the servo band.

It should be noted that, while the various servo band configurations illustrated in the different approaches of FIGS. 9C-9F illustrate the corresponding servo patterns shifted to, and abutting one side of the servo band, the servo patterns may have any desired placement within the servo band. For example, in some approaches the servo bands may be shifted towards and abutting the opposite side of the servo band along the cross-track direction. In other approaches, the servo patterns may be centered in the servo band along the cross-direction.

Referring back to FIG. 9A, a magnetic tape head 916 is shown as being positioned over the magnetic tape 902. The magnetic tape head 916 may be part of a tape drive configured to read servo patterns written in the servo bands 904, write data to the data bands 906, read data written to the data bands 906, etc., e.g., such as tape drive 100 of FIG. 2 described above. It follows that the magnetic tape head 916 may have data transducers (not shown) and/or servo readers oriented in different configurations, e.g., depending on the servo band configuration of the magnetic tape 902, as will soon become apparent.

Looking now to FIGS. 9G-9H, two different servo reader configurations 960, 970 are illustrated in accordance with different approaches of the magnetic tape head 916 illustrated in FIG. 9A. It should be noted that any of the different servo reader configurations 960, 970 illustrated in FIGS. 9G-9H may be implemented in the magnetic tape head 916 in FIG. 9A. Further, the servo reader configurations 960, 970 illustrated in FIGS. 9G-9H may be used in any desired environment.

Each of the servo reader configurations 960, 970 depicted in FIGS. 9G-9H includes a group of servo readers (e.g., at least two) positioned at each opposite end of an array of data transducers. The array of data transducers is positioned along the magnetic tape head, such that the array of data transducers extends in the cross-track direction 910 which is perpendicular to a direction of travel of the magnetic tape 911. Moreover, a distance between each of the immediately adjacent servo readers in each of the groups of servo readers is preferably less than or equal to one third of the prespecified width W of each of the servo bands, as will be described in further detail below.

Referring specifically now to FIG. 9G, the servo reader configuration 960 has groups 962, 964 of servo readers, each of which includes two individual servo readers 980, 982 and 984, 986 respectively. As shown, each of the groups of servo readers 962, 964 is positioned at an opposite end of the array 967 of data transducers 968 along the cross-track direction 910. Moreover, a longitudinal axis of each of the groups 962, 964 of servo readers is parallel to the longitudinal axis of the array 967 of data transducers 968. The array 967 of data transducers 968 may include data readers and/or data writers. Moreover, depending on the desired approach, the array 967 of data transducers 968 may include 32 individual data transducers, 64 individual data transducers, 128 individual data transducers, etc., or any other desired number of individual data transducers. Moreover, one or more of the servo readers may have a height (measured along the longitudinal axis of the magnetic tape head) that is about 1.75 µm, but could be higher or lower depending on the desired approach.

A distance $D_1$ (measured in the cross-track direction 910) between each of the immediately adjacent servo readers 980, 982 and 984, 986 in each of the groups 962, 964 respectively, may be less than or equal to one third of a prespecified width W of the given servo band. A magnetic tape head having immediately adjacent servo readers which are separated by a distance $D_1$ which is less than or equal to one third of a prespecified width W of the given servo band is highly desirable as the servo readers are thereby able to read servo patterns with added granularity and achieve improved track following efficiency for various different types (e.g., generations) of magnetic tape. For example, referring momentarily to FIGS. 11A-11C, a magnetic tape head having two servo readers which are separated by a distance $D_1$ which is less than or equal to one third of a prespecified width W of the given servo band is positionable relative to a magnetic tape such that both servo readers are able to read servo information from one or more servo patterns in the given servo band simultaneously. Accordingly, some of the servo readers coupled to the magnetic tape head may be redundant, thereby improving resilience against degraded performance caused by servo reader error. For example, the servo readers in a first of the groups 962, 964 may be used to read servo information from the servo patterns in a corresponding servo band, while the other one of the groups 962, 964 may remain inactive in a backup capacity, simultaneously read servo information from servo patterns corresponding to another of the servo bands (e.g., to compare with the servo information read by the first of the groups 962, 964), etc.

Looking now to FIG. 9H, the servo reader configuration 970 has groups 972, 974 of servo readers, each of which includes three individual servo readers 988, 990, 992 and 994, 996, 998 respectively. As shown, each of the groups of servo readers 962, 964 is positioned at an opposite end of the array 977 of data transducers 978 along the cross-track direction 910. Moreover, a longitudinal axis of each of the groups 972, 974 of servo readers is parallel to the longitudinal axis of the array 977 of data transducers 978. The array 977 of data transducers 978 may include data readers and/or data writers. Moreover, depending on the desired approach, the array 977 of data transducers 978 may include 32 individual data transducers, 64 individual data transducers, 128 individual data transducers, etc., or any other desired number of individual data transducers. Moreover, one or more of the servo readers may have a height (measured along the longitudinal axis of the magnetic tape head) that is about 1.75 μm, but could be higher or lower depending on the desired approach.

A distance $D_2$ (measured in the cross-track direction 910) between the center of each of the immediately adjacent servo readers 988, 990, 992 and 994, 996, 998 in each of the respective groups 972, 974 may be less than or equal to one third, preferably less than or equal to one sixth, of a prespecified width W of the given servo band. A magnetic tape head having immediately adjacent servo readers which are separated by a distance $D_2$ which is less than or equal to one sixth of a prespecified width W of the given servo band is highly desirable as the servo readers are thereby able to read servo patterns with added granularity and achieve improved track following efficiency for various different types (e.g., generations) of magnetic tape. For example, referring momentarily to FIGS. 12A-12C, a magnetic tape head having three servo readers which are separated by a distance $D_2$ which is less than or equal to one sixth of a prespecified width W of the given servo band is positionable relative to a magnetic tape such that all three servo readers are able to read servo information from one or more servo patterns in the given servo band simultaneously. Accordingly, some of the servo readers coupled to the magnetic tape head may be redundant, thereby improving resilience against degraded performance caused by servo reader error. For example, the servo readers in a first of the groups 972, 974 may be used to read servo information from the servo patterns in a corresponding servo band, while the other one of the groups 972, 974 may remain inactive in a backup capacity, simultaneously read servo information from servo patterns corresponding to another of the servo bands (e.g., to compare with the servo information read by the first of the groups 972, 974), etc.

It follows that a magnetic tape may have a hybrid servo band configuration which includes servo patterns which each have a width which is less than or equal to one third of a prespecified width of the given servo band. Moreover, a magnetic tape head may have two groups of servo readers, each group having at least two individual servo readers. Each of the immediately adjacent servo readers in a group are separated by a distance which is less than or equal to one third of a prespecified width of the given servo band, thereby allowing the magnetic tape head to be positionable relative to a magnetic tape such that two or more of the servo readers in a single group are able to read servo information from one or more servo patterns in the given servo band simultaneously. The number and relative spacing between the servo patterns in the various approaches described above in FIGS. 9C-9F, as well as the number and relative spacing between servo readers in the various approaches described above in FIGS. 9G-9H allow for a corresponding magnetic tape head and tape drive to achieve improved performance while also enabling backward compatibility for various styles (e.g., generations) of magnetic tape. As a result, by implementing the foregoing approaches, the shortcomings experienced in conventional products are overcome. Accordingly, referring now to FIG. 10, a flowchart of a tape-drive implemented method 1000 is shown according to one embodiment. The method 1000 may be performed in accordance with the present invention in any of the environments depicted in FIGS. 1-7 and 9A-9H, among others, in various embodiments. Of course, more or less operations than those specifically described in FIG. 10 may be included in method 1000, as would be understood by one of skill in the art upon reading the present descriptions.

Each of the steps of the method 1000 may be performed by any suitable component of the operating environment. For example, in various embodiments, the method 1000 may be partially or entirely performed by a controller, a processor, etc., or some other device having one or more processors therein. The processor, e.g., processing circuit(s), chip(s), and/or module(s) implemented in hardware and/or software, and preferably having at least one hardware component may be utilized in any device to perform one or more steps of the method 1000. Illustrative processors include, but are not limited to, a central processing unit (CPU), an application specific integrated circuit (ASIC), a field programmable gate array (FPGA), etc., combinations thereof, or any other suitable computing device known in the art. According to one illustrative approach, logic may be integrated with and/or executable by controller 128 of tape drive 100 of FIG. 2, the logic being configured to perform and one or more of the processes described below in correspondence with method 1000.

Figure 10:
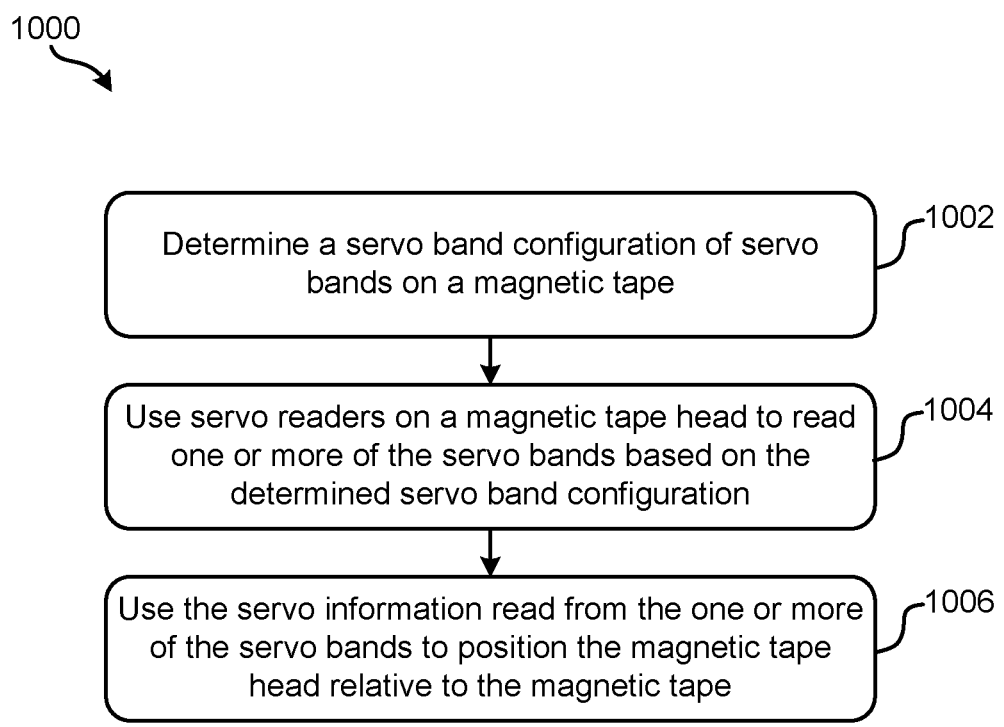
FIG. 10 is a flowchart of a method, according to one embodiment.

As shown in FIG. 10, operation 1002 of method 1000 includes determining a servo band configuration of servo bands on a magnetic tape. A configuration of the servo bands on a magnetic tape may be determined in a number of different ways. In preferred approaches, the servo band configuration may be determined from a format associated with the magnetic tape. As previously mentioned, the format of a magnetic tape may be written in a header of the magnetic tape itself, stored in memory located in a tape cartridge along with the magnetic tape, be encoded in a barcode coupled to a tape cartridge in which the magnetic tape is stored, etc. The format of the magnetic tape may include the servo band configuration itself. However, the format of the magnetic tape may be further used to determine the actual servo band configuration, e.g., by look up the servo band configuration from a lookup table.

In other approaches, the servo band configuration on a magnetic tape may be determined by sweeping a servo reader over an anticipated location of a servo band (e.g., near an outer lateral edge of the magnetic tape) and reading the servo patterns. Moreover, the servo information gathered from the signals read may be used to determine the servo band configuration of the servo bands on the magnetic tape. In still other approaches, the servo band configuration of servo bands on a magnetic tape may be determined by visually inspecting the servo bands on the magnetic tape, or any other process which would be apparent to one skilled in the art after reading the present description.

Furthermore, operation 1004 includes using servo readers on a magnetic tape head to read one or more of the servo bands based on the determined servo band configuration. Again, depending on the servo band configuration and/or the arrangement of servo readers included on the magnetic tape head, reading one or more of the servo bands may include a number of different sub-processes (e.g., as will be described in further detail below with reference to FIGS. 11A-12C).

With continued reference to method 1000, operation 1006 includes using the servo information read from the one or more of the servo bands to position the magnetic tape head relative to the magnetic tape. The servo information read from the one or more servo bands may be used to determine positioning information of the magnetic tape head relative to the magnetic tape. As a magnetic tape is passed over a magnetic tape head, the relative position of the magnetic tape head with respect to the magnetic tape orientation changes constantly. For example, tape skew, lateral tape motion, TDS, etc., vary while reading from and/or writing to magnetic tape. Moreover, the velocity at which the magnetic tape is passed over the magnetic tape head varies as well. Accordingly, the servo information read from one or more of the servo bands may be used to determine tape skew, lateral tape motion, TDS, tape velocity, etc., which may in turn be used to improve performance by maintaining a desired position of the magnetic tape head relative to the magnetic tape with significantly improved efficiency compared to conventional products, e.g., as will be described in further detail below.

Depending on the servo band configuration determined in operation 1002, and/or the arrangement (e.g., number) of servo readers included on the magnetic tape head, the operations included in method 1000 may include various sub-processes given the particular approach, e.g., servo reader configuration corresponding to the magnetic tape head. Accordingly, FIGS. 11A-11C below are illustrated in accordance with approaches in which the magnetic tape head has two groups of servo readers, each group having two individual servo readers. One of the groups of servo readers is positioned at each end of an array of data transducers positioned along the magnetic tape head in the cross-track direction. Moreover, each of the servo readers in a group are separated by a distance $D_1$ which is less than or equal to one third of a prespecified width W of the given servo band, thereby allowing the magnetic tape head to be positionable relative to a magnetic tape such that both servo readers are able to read servo information from one or more servo patterns in the given servo band simultaneously. Similarly, FIGS. 12A-12C below are illustrated in accordance with approaches in which the magnetic tape head has two groups of servo readers, each group having three individual servo readers. One of the groups of servo readers is positioned at each end of an array of data transducers positioned along the magnetic tape head in the cross-track direction. Moreover, each of the immediately adjacent servo readers in a group are separated by a distance $D_2$ which is less than or equal to one sixth of a prespecified width W of the given servo band, thereby allowing the magnetic tape head to be positionable relative to a magnetic tape such that all three servo readers are able to read servo information from one or more servo patterns in the given servo band simultaneously.

Figure 11B:
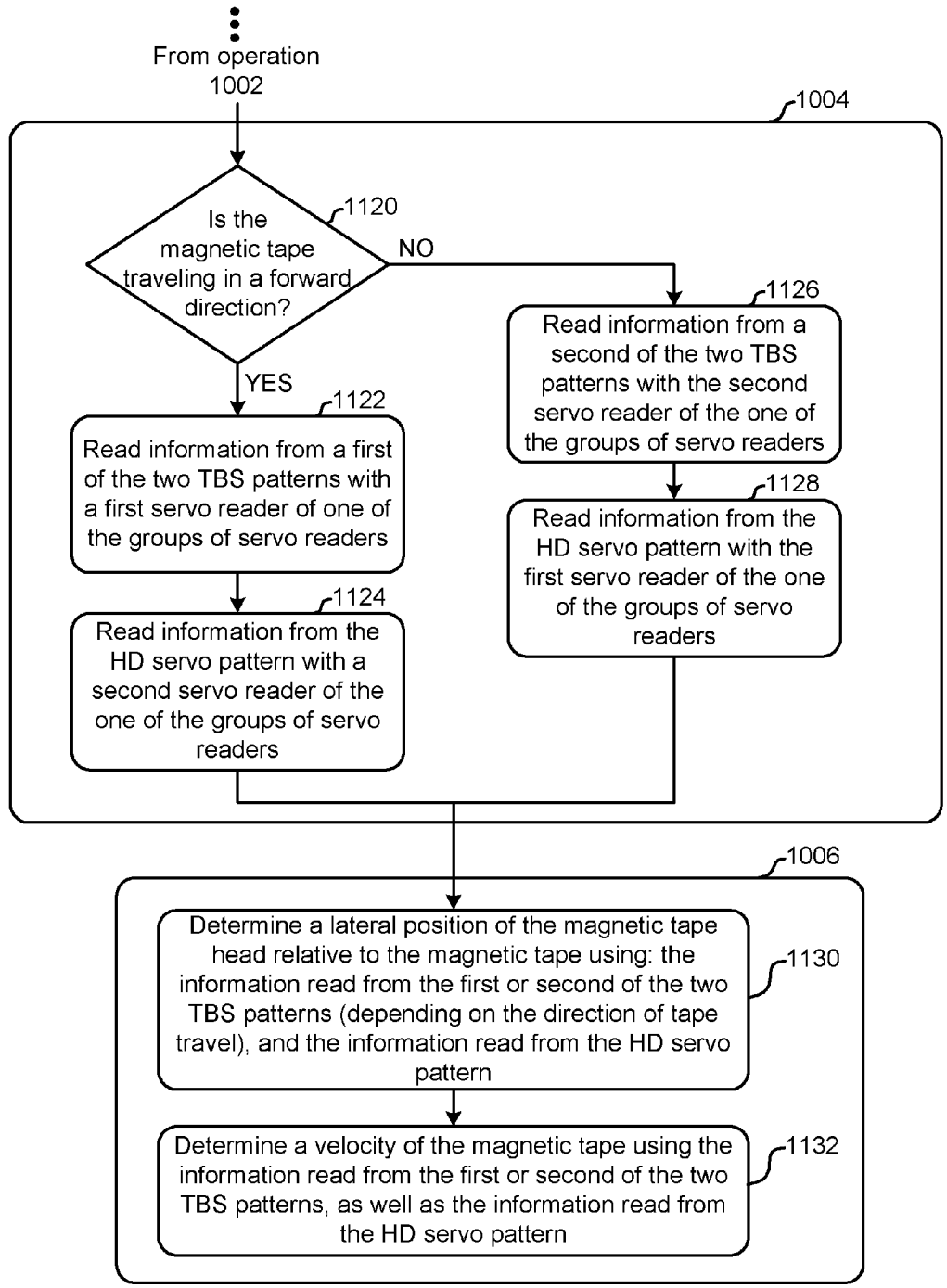
FIG. 11B is a flowchart of sub-processes of the method of FIG. 10, according to one approach.
Figure 11C:
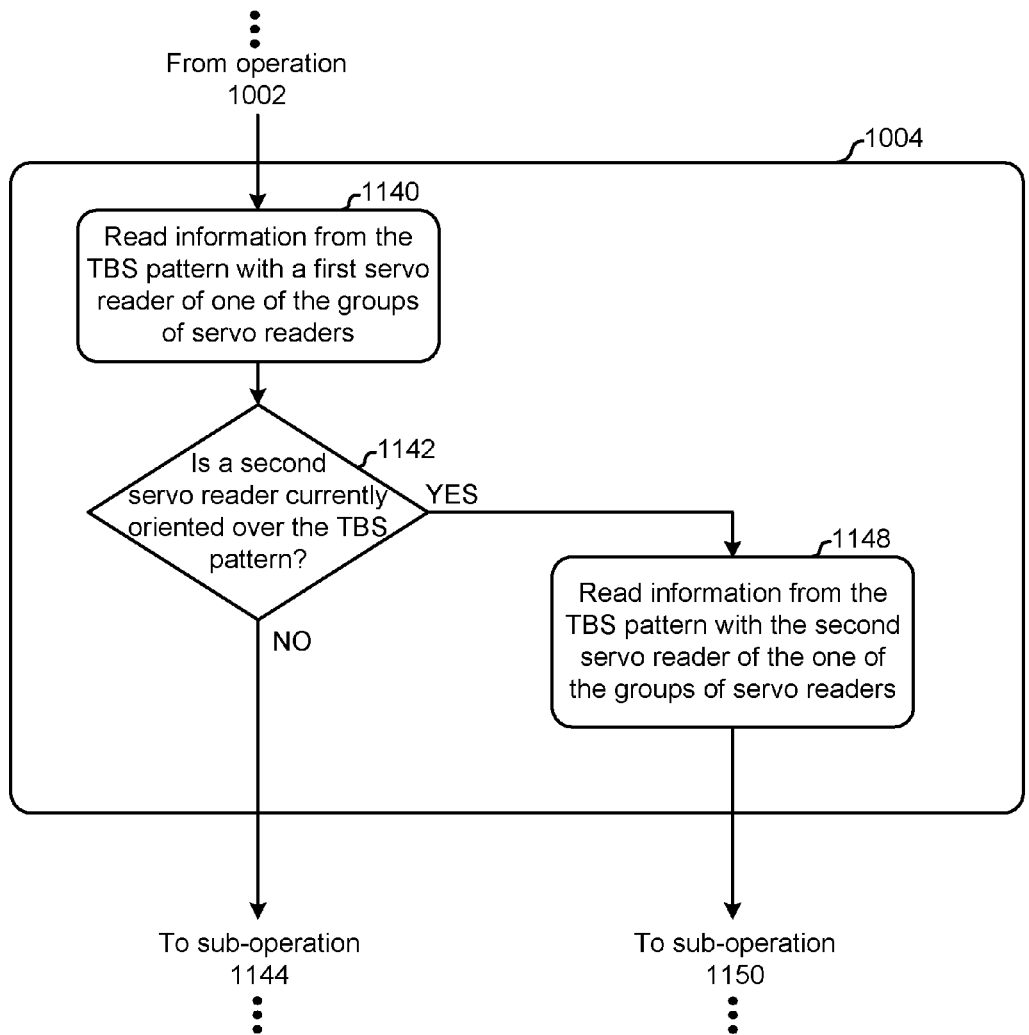
FIG. 11C is a flowchart of sub-processes of the method of FIG. 10, according to one approach.
Figure 11C:
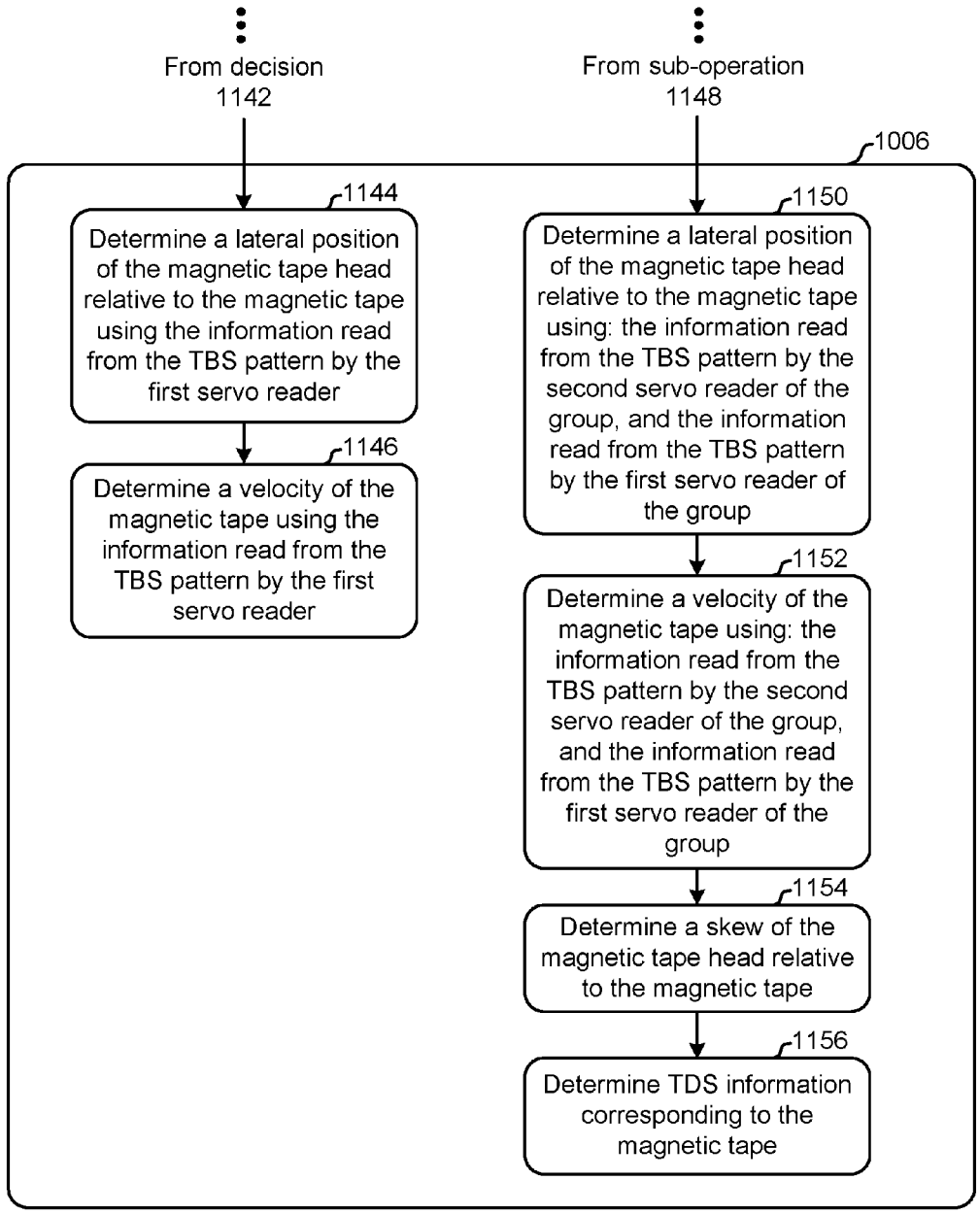

Looking to FIGS. 11A-11C, exemplary sub-processes of reading servo information and using the servo information to position the magnetic tape head are illustrated in accordance with one approach in which the magnetic tape head includes two groups of servo readers, each group including two individual servo readers (e.g., see FIG. 9G). Any one or more of sub-processes may be used to perform operations 1004 and/or 1006 of FIG. 10. Accordingly, each of the sub-processes included in FIGS. 11A-11C are shown as being a part of operations 1004 and 1006, respectively. However, it should be noted that the sub-processes of FIGS. 11A-11C are illustrated in accordance with one approach which is in no way intended to limit the invention.

Referring specifically to FIG. 11A, the sub-processes illustrated in FIG. 11A may be performed in response to determining in operation 1002 that each of the servo bands on a magnetic tape has a configuration similar to that of the servo band configuration 930 depicted in FIG. 9D above. In other words, the sub-processes illustrated in FIG. 11A may be performed in response to determining in operation 1002 that each of the servo bands on a magnetic tape has a configuration of a third type. Although in no way intended to limit the invention, a "configuration of a third type" is intended to correspond to a servo band configuration which includes a HD servo pattern and a TBS pattern, the HD servo pattern and the TBS pattern each having a width that is one third of the prespecified width of the given servo band. For example, referring back to FIG. 9D momentarily, the servo band configuration 930 illustrated therein is of a third type.

With continued reference to FIG. 11A, sub-operation 1102 includes reading information from the TBS pattern with a first servo reader of one of the groups of servo readers, while sub-operation 1104 includes reading information from the HD servo pattern with a second servo reader of the one of the groups of servo readers. Again, the magnetic tape head in the present approach includes two groups of servo readers, each group including two individual servo readers. Thus information may be read from the TBS and HD patterns with the servo readers in either (or both) of the groups of servo readers simultaneously. Moreover, depending on the orientation of the HD servo pattern with respect to the TBS pattern, the "first servo reader" may be the servo reader in a group that is closer to a specified first end of the magnetic tape head along its longitudinal axis, while the "second servo reader" may be the servo reader in a group that is farther from the specified first end of the magnetic tape head, or vice versa.

It should be noted that each of the servo readers in a group of servo readers on a given magnetic tape head according to any of the approaches described herein may be able to read HD servo patterns as well as TBS servo patterns in the sense that each of the servo readers may be able to generate a readback signal which corresponds to the respective servo pattern when passed thereover while operational (e.g., powered on). However, depending on which type of servo pattern a particular readback signal corresponds to (e.g., TBS or HD), circuitry electrically coupled to the magnetic tape head which the servo readers correspond to may route the readback signal to a combination of components (e.g., a circuit) which is able to decode the readback signal and produce readback information based on the type of servo pattern the readback signal originated from, e.g., refer back to FIGS. 6 and 7 above.

Moreover, the servo information derived from the servo patterns of a servo band may be further used by the magnetic tape head and/or various other components. For instance, sub-operation 1106 includes determining (e.g., decoding, calculating, etc.) a lateral position of the magnetic tape head relative to the magnetic tape using the information read from the TBS pattern, as well as the information read from the HD servo pattern. Moreover, sub-operation 1108 includes determining (e.g., decoding, calculating, etc.) a velocity of the magnetic tape using the information read from the TBS pattern, as well as the information read from the HD servo pattern. The lateral position of the magnetic tape head and/or the velocity of the magnetic tape may be determined using any process which would be apparent to one skilled in the art after reading the present description.

The lateral position of the magnetic tape head relative to the magnetic tape may be used to reposition the magnetic tape head such that the data transducers on the magnetic tape head are desirably positioned over the data tracks of the corresponding data band. Moreover, the velocity of tape may be used to determine how fast or slow the data tracks should be written to the magnetic tape in some approaches. Accordingly, the lateral position of the magnetic tape head relative to the magnetic tape and the velocity of the magnetic tape may be used to desirably position the magnetic tape head relative to the magnetic tape.

Implementing the various processes described in FIG. 11A desirably results in the ability to determine track following information while also enabling backward compatibility which is highly desirable for removable storage media such as magnetic tape as described herein. According to an illustrative example, which is in no way intended to limit the invention, various ones of the processes included in FIG. 11A may be implemented in order to read a servo pattern such as that illustrated in FIG. 8A above. In sharp contrast, conventional products have relied on different tape drives for reading and/or writing to magnetic tapes having different forms which results in decreased data processing efficiency, decreased system resource utilization efficiency, etc.

Now looking to FIG. 11B, the sub-processes illustrated in FIG. 11B may be performed in response to determining in operation 1002 that each of the servo bands on a magnetic tape has a configuration similar to that of the servo band configuration 920 depicted in FIG. 9C above. In other words, the sub-processes illustrated in FIG. 11B may be performed in response to determining in operation 1002 that each of the servo bands on a magnetic tape has a configuration of a second type. Although in no way intended to limit the invention, a "configuration of a second type" is intended to correspond to a servo band configuration which includes two TBS patterns and a HD servo pattern sandwiched between the two TBS patterns. Moreover, each of the TBS patterns and the HD servo pattern each have a width that is one third of the prespecified width of the given servo band. For example, referring back to FIG. 9C momentarily, the servo band configuration 920 illustrated therein is of a second type.

With continued reference to FIG. 11B, decision 1120 includes determining whether the magnetic tape is traveling in a forward direction. According to the present description, "in a forward direction" is intended to represent the instance where the magnetic tape is being transitioned from supply reel (e.g., in a tape cartridge) to take-up reel (e.g., in a tape drive). For instance, referring momentarily back to FIG. 2, it may be determined that the magnetic tape 122 is traveling in a forward direction while being transitioned from supply cartridge 120 to take-up reel 121. In other words, a tape may be traveling in a forward direction when the magnetic tape is being passed over a magnetic head from the beginning of tape and traveling towards the end of tape. Similarly, it may be determined that the magnetic tape 122 is not traveling in a forward direction (but rather a backward direction) while being transitioned from take-up reel 121 to supply cartridge 120. However, it should be noted that in other embodiments, "in a forward direction" may represent instance where the magnetic tape is being transitioned from take-up reel to supply reel.

Referring back to FIG. 11B, the flowchart is shown as proceeding to sub-operation 1122 in response to determining that the magnetic tape is traveling in the forward direction. There, sub-operation 1122 includes reading information from a first of the two TBS patterns (e.g., see 924 of FIG. 9C) with a first servo reader of one of the groups of servo readers (e.g., see 986 of FIG. 9G). Moreover, sub-operation 1124 includes reading information from the HD servo pattern (e.g., see 922 of FIG. 9C) with a second servo reader of the one of the groups of servo readers (e.g., see 984 of FIG. 9G). The flowchart also proceeds to sub-operation 1126 in response to determining that the magnetic tape is not traveling in the forward direction. There, sub-operation 1126 includes reading information from a second of the two TBS patterns (e.g., see 926 of FIG. 9C) with the second servo reader of the one of the groups of servo readers. Furthermore, sub-operation 1128 includes reading information from the HD servo pattern (e.g., see 922 of FIG. 9C) with the first servo reader of the one of the groups of servo readers.

It follows that servo information may preferably be read from a certain servo pattern with a certain servo reader depending on the direction in which the magnetic tape is traveling. For instance, referring momentarily back to FIGS. 9C and 9G, according to an in-use example, which is in no way intended to limit the invention, while the magnetic tape is traveling in a forward direction, a first (e.g., lower) one of the servo readers 986 in the first (e.g., lower) group of servo readers 964 may be used to read the first (e.g., lower) TBS servo pattern 924 while the second (e.g., upper) one of the servo readers 984 in the first (e.g., lower) group of servo readers 964 is used to read the HD servo pattern 922. However, when the magnetic tape is traveling in a direction opposite from the forward direction, the second (e.g., upper) servo reader 984 in the first (e.g., lower) group of servo readers 964 may be used to read the second (e.g., upper) TBS pattern 926 while the first (e.g., lower) servo reader 986 in the first (e.g., lower) group of servo readers 964 is used to read the HD servo pattern 922. Again, this in-use example is presented for exemplary purposes only, and is in no way intended to limit the invention. Moreover, the terms "upper" and "lower" are relative terms which are in used to merely represent a relative positioning of the servo patterns and/or servo readers relative to each other according to the in-use example. Thus, depending on the orientation of the magnetic tape head, the magnetic tape, the servo readers, servo patterns, etc., the servo readers and/or servo patterns may correspond differently.

Referring again to FIG. 11B, the flowchart proceeds to sub-operations 1130 which includes determining (e.g., decoding) a lateral position of the magnetic tape head relative to the magnetic tape using the information read from the first or second of the two TBS patterns (depending on the direction of tape travel), as well as the information read from the HD servo pattern. Furthermore, sub-operation 1132 includes determining (e.g., decoding) a velocity of the magnetic tape using the information read from the first or second of the two TBS patterns, as well as the information read from the HD servo pattern. Again, the magnetic tape head in the present approach includes two groups of servo readers, each group including two individual servo readers. Thus information may be read from the TBS and HD patterns with the servo readers in either (or both) of the groups of servo readers. Moreover, the lateral position of the magnetic tape head and/or the velocity of the magnetic tape may be determined using any process which would be apparent to one skilled in the art after reading the present description.

Implementing the various processes described in FIG. 11B desirably results in the ability to determine track following information while also enabling backward compatibility which is highly desirable for removable storage media such as magnetic tape as described herein. In sharp contrast, conventional products have relied on different tape drives for reading and/or writing to magnetic tapes having different forms which results in decreased data processing efficiency, decreased system resource utilization efficiency, etc.

Moving to FIG. 11C, the sub-processes illustrated in FIG. 11C may be performed in response to determining in operation 1002 that each of the servo bands on a magnetic tape have a configuration similar to that of the TBS pattern 802 of FIGS. 8A-8B above. In other words, sub-processes illustrated in FIG. 11C may be performed in response to determining in operation 1002 that each of the servo bands on a magnetic tape have a configuration of a first type. Although in no way intended to limit the invention, a "configuration of a first type" is intended to correspond to a servo band configuration which includes a single TBS pattern having a width that is two third of the prespecified width of the given servo band. For example, referring back to FIGS. 8A-8B momentarily, the TBS pattern 802 illustrated therein is of a first type.

With continued reference to FIG. 11C, sub-operation 1140 includes reading information from the TBS pattern with a first servo reader of one of the groups of servo readers. Moreover, decision 1142 includes determining whether a second servo reader of the one of the groups of servo readers is currently oriented over the TBS pattern. In other words, decision 1142 determines whether both of the servo readers in one of the groups are oriented over the TBS pattern in a servo band.

The flowchart proceeds to sub-operation 1144 in response to determining that the second servo reader of the one of the groups of servo readers is not currently oriented over the TBS pattern. There, sub-operation 1144 includes determining (e.g., decoding) a lateral position of the magnetic tape head relative to the magnetic tape using the information read from the TBS pattern by the first servo reader. Moreover, sub-operation 1146 includes determining (e.g., decoding) a velocity of the magnetic tape using the information read from the TBS pattern by the first servo reader. The lateral position of the magnetic tape head and/or the velocity of the magnetic tape may be determined using any process which would be apparent to one skilled in the art after reading the present description.

Returning to decision 1142, the flowchart may proceed to sub-operation 1148 in response to determining that the second servo reader of the one of the groups of servo readers is currently oriented over the TBS pattern. There sub-operation 1148 includes reading information from the TBS pattern with the second servo reader of the one of the groups of servo readers.

The flowchart of FIG. 11C further proceeds to sub-operation 1150 which includes determining (e.g., decoding) a lateral position of the magnetic tape head relative to the magnetic tape using the information read from the TBS pattern by the second servo reader of the one of the groups of servo readers, in addition to using the information read from the TBS pattern by the first servo reader of the one of the groups of servo readers. Moreover, sub-operation 1152 includes determining (e.g., decoding) a velocity of the magnetic tape using the information read from the TBS pattern by the second servo reader of the one of the groups of servo readers, as well as the information read from the TBS pattern by the first servo reader of the one of the groups of servo readers. The lateral position of the magnetic tape head and/or the velocity of the magnetic tape may be determined in sub-operations 1150, 1152 using any process which would be apparent to one skilled in the art after reading the present description. It should also be noted that although a single lateral position is determined in sub-operation 1150 using the information read from the TBS pattern by the second servo reader as well as from the TBS pattern by the first servo reader, in other approaches a lateral position may be determined from the information read from the TBS pattern by the second servo reader while another lateral position may be determined from the information read from the TBS pattern by the first servo reader, e.g., which may be averaged together. Similarly, although a single tape velocity is determined in sub-operation 1152 using the information read from the TBS pattern by the second servo reader as well as from the TBS pattern by the first servo reader, in other approaches a tape velocity may be determined from the information read from the TBS pattern by the second servo reader while another tape velocity may be determined from the information read from the TBS pattern by the first servo reader, e.g., which may be averaged together.

Further still, sub-operation 1154 includes determining (e.g., compute) a skew of the magnetic tape head relative to the magnetic tape, and sub-operation 1156 includes determining (e.g., compute) TDS information corresponding to the magnetic tape. As previously mentioned, according to an exemplary approach, the skew of the magnetic tape head may be determined using the servo information read by the servo readers in a same group. Accordingly, when two or more servo readers are able to read the same TBS pattern at one end of the magnetic tape head, the skew between the relative orientation of the magnetic tape head and magnetic tape may be determined, e.g., as described below with reference to FIGS. 13A-13D. For instance, Equation 1 and/or Equation 2 may be used to determine the skew of the magnetic tape head. This resulting ability is highly desirable, as single servo band detection with multiple servo readers on a single magnetic tape head allows skew and/or TDS measurements to be determined even while other servo band information is invalid or unobtainable. Furthermore, this improved functionality is achieved while also enabling backward compatibility which is highly desirable for removable storage media such as magnetic tape as described herein. In sharp contrast, conventional products have determined tape skew and TDS measurements from information gathered from servo bands on both sides of a head module, or information from servo readers on multiple head modules. In other words, to compute skew and/or TDS, conventional products have needed to obtain valid servo information from more than one servo band and/or more than one head module. This makes such conventional head modules particularly susceptible to degraded performance and/or being rendered completely useless by servo defects, scratches caused by asperities on the surface of the magnetic tape, etc.

As a result, implementing a magnetic tape head which is able to perform one or more of the various processes described in FIGS. 10-11C desirably improves tape drive performance, reduces readback error, etc.

According to some approaches, skew may be determined by using any of the processes described below with reference to FIGS. 13A-13D. As mentioned earlier, Equation 1 and/or Equation 2 may be used to determine the skew of the magnetic tape head. However, referring again to FIG. 11C, the skew of the magnetic tape head and/or the TDS information corresponding to the magnetic tape may be determined in sub-operations 1154, 1156 using any process which would be apparent to one skilled in the art after reading the present description.

The skew of the magnetic tape head relative to the magnetic tape may be used to reposition (e.g., rotate) the magnetic tape head such that the data transducers on the magnetic tape head are desirably positioned relative to the data tracks of the corresponding data band. Moreover, the TDS information corresponding to the magnetic tape may be used to reposition (e.g., laterally adjust) the magnetic tape head relative to the magnetic tape in some approaches. Accordingly, the skew of the magnetic tape head relative to the magnetic tape and the TDS information corresponding to the magnetic tape may be used to desirably position the magnetic tape head relative to the magnetic tape.

Figure 12A:
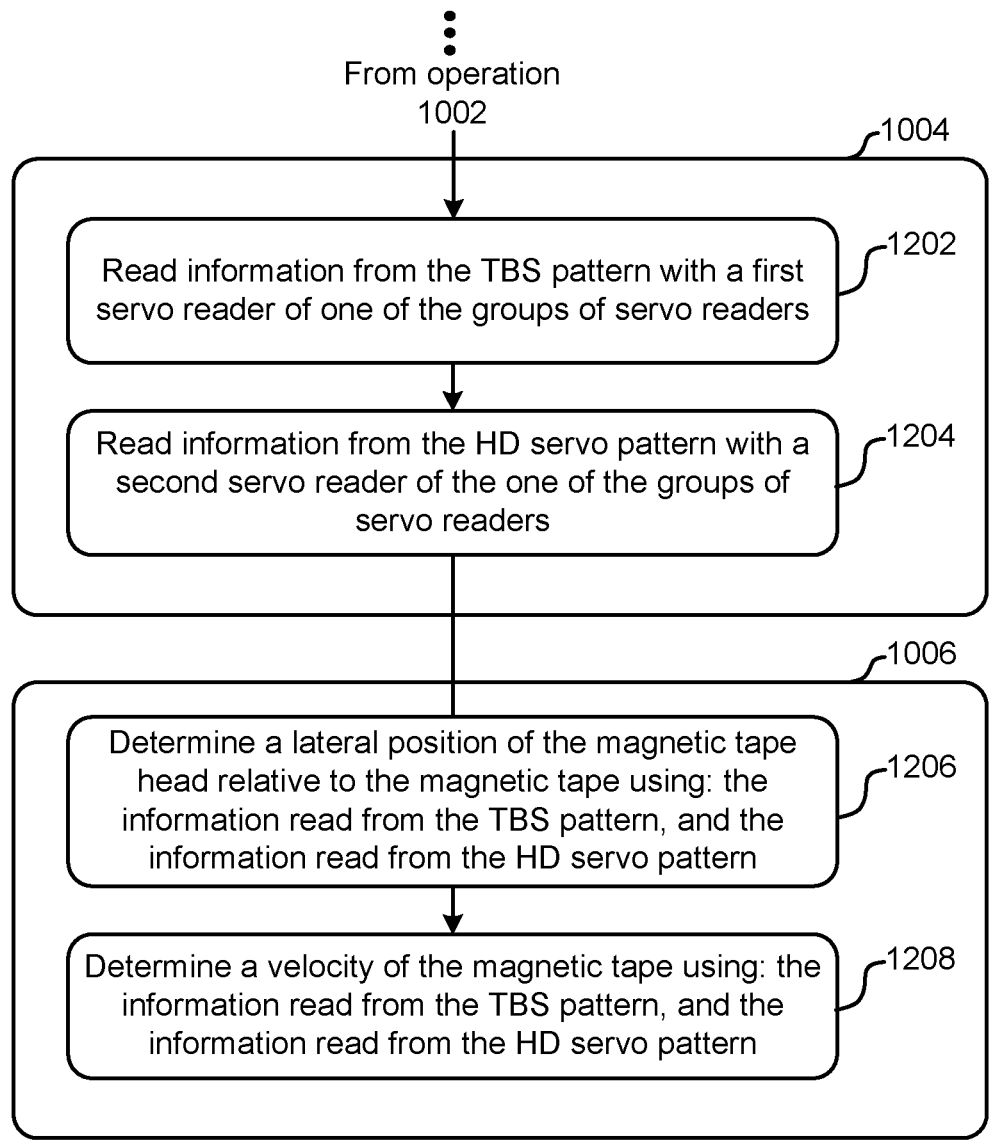
FIG. 12A is a flowchart of sub-processes of the method of FIG. 10, according to one approach.
Figure 12B:
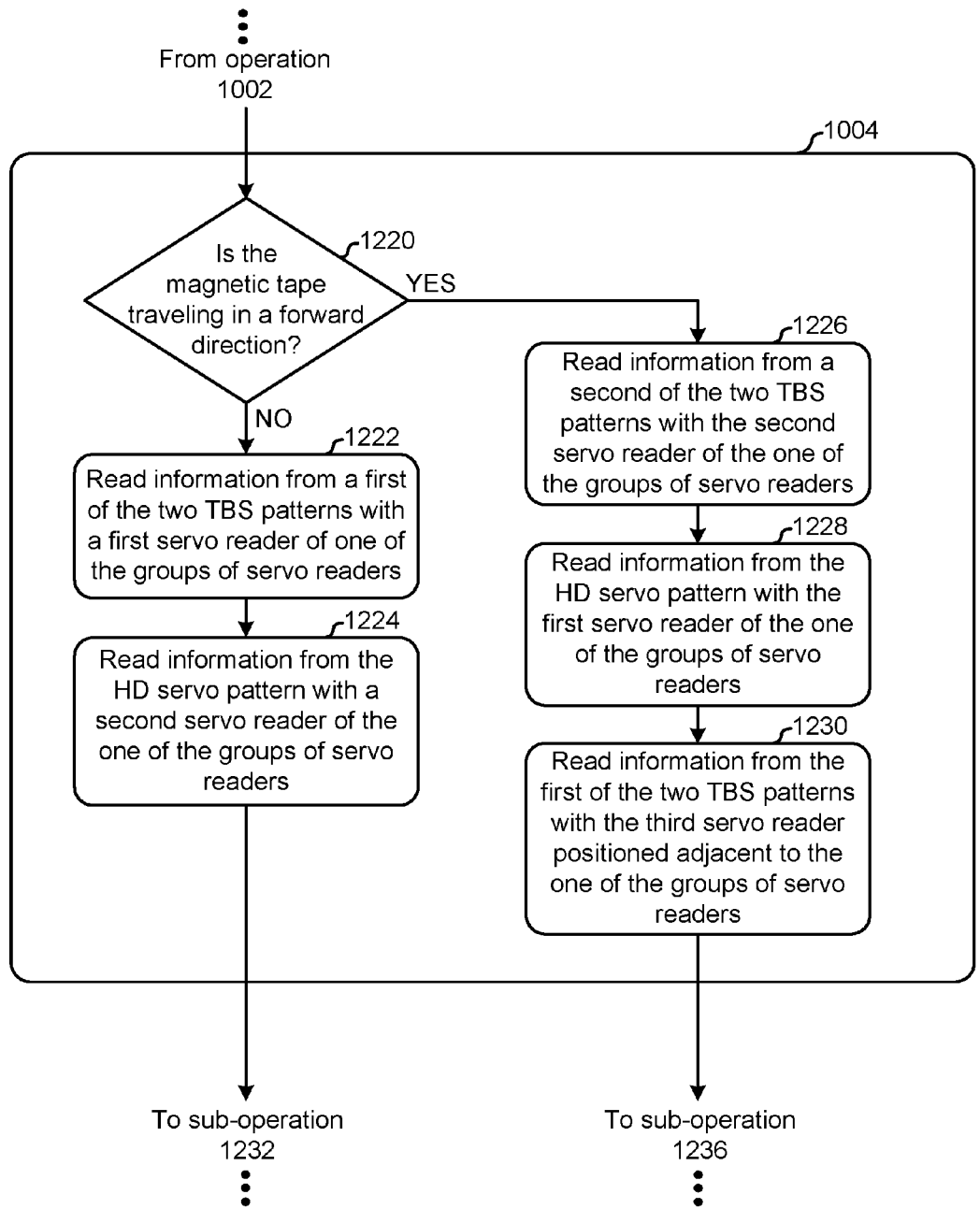
FIG. 12B is a flowchart of sub-processes of the method of FIG. 10, according to one approach.
Figure 12B:
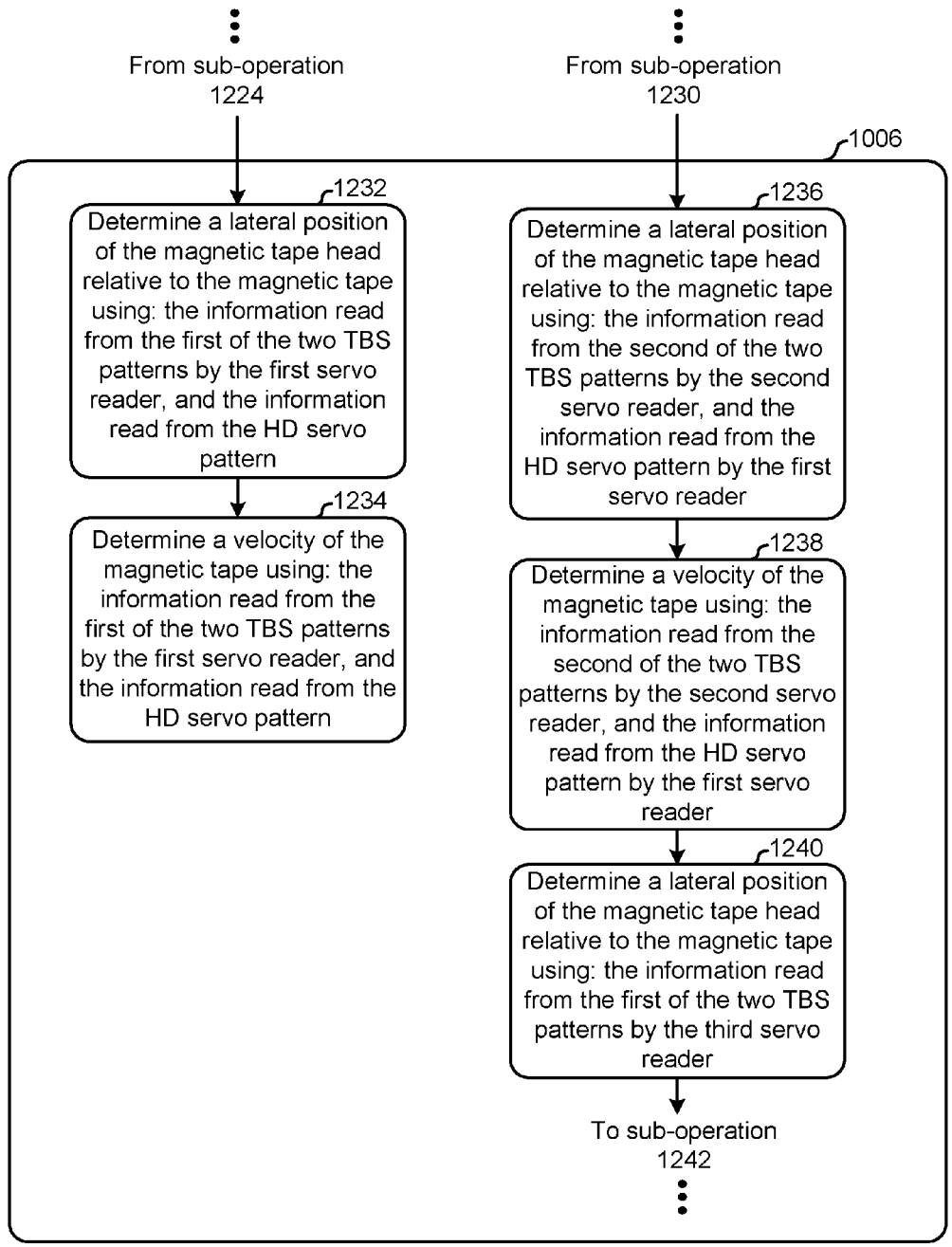
Figure 12B:
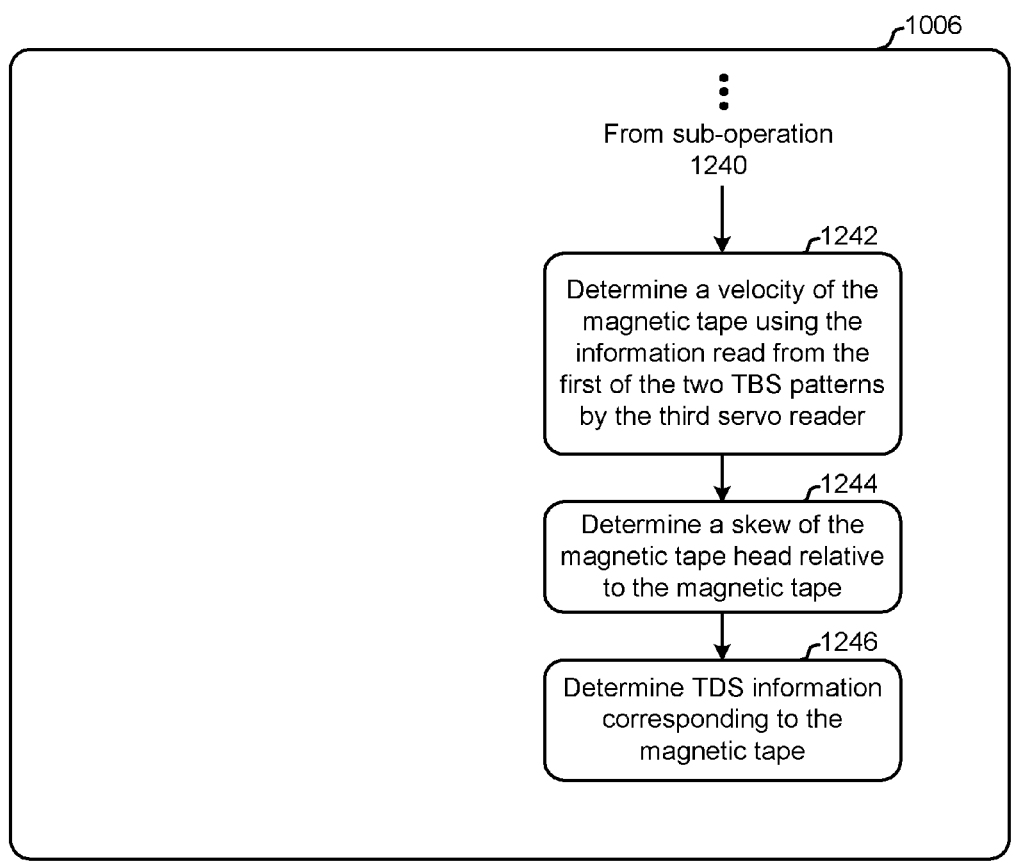
Figure 12C:
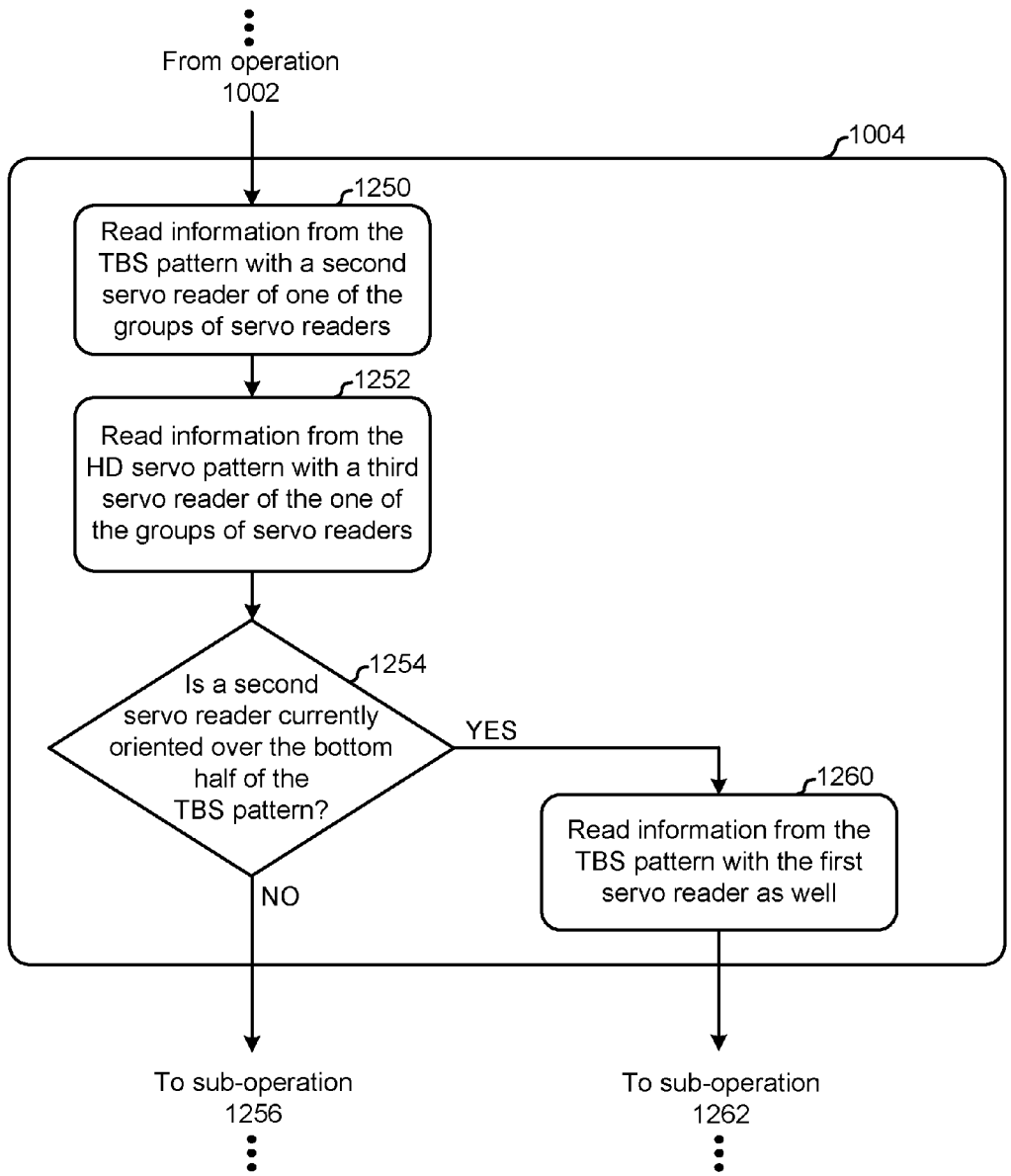
FIG. 12C is a flowchart of sub-processes of the method of FIG. 10, according to one approach.
Figure 12C:
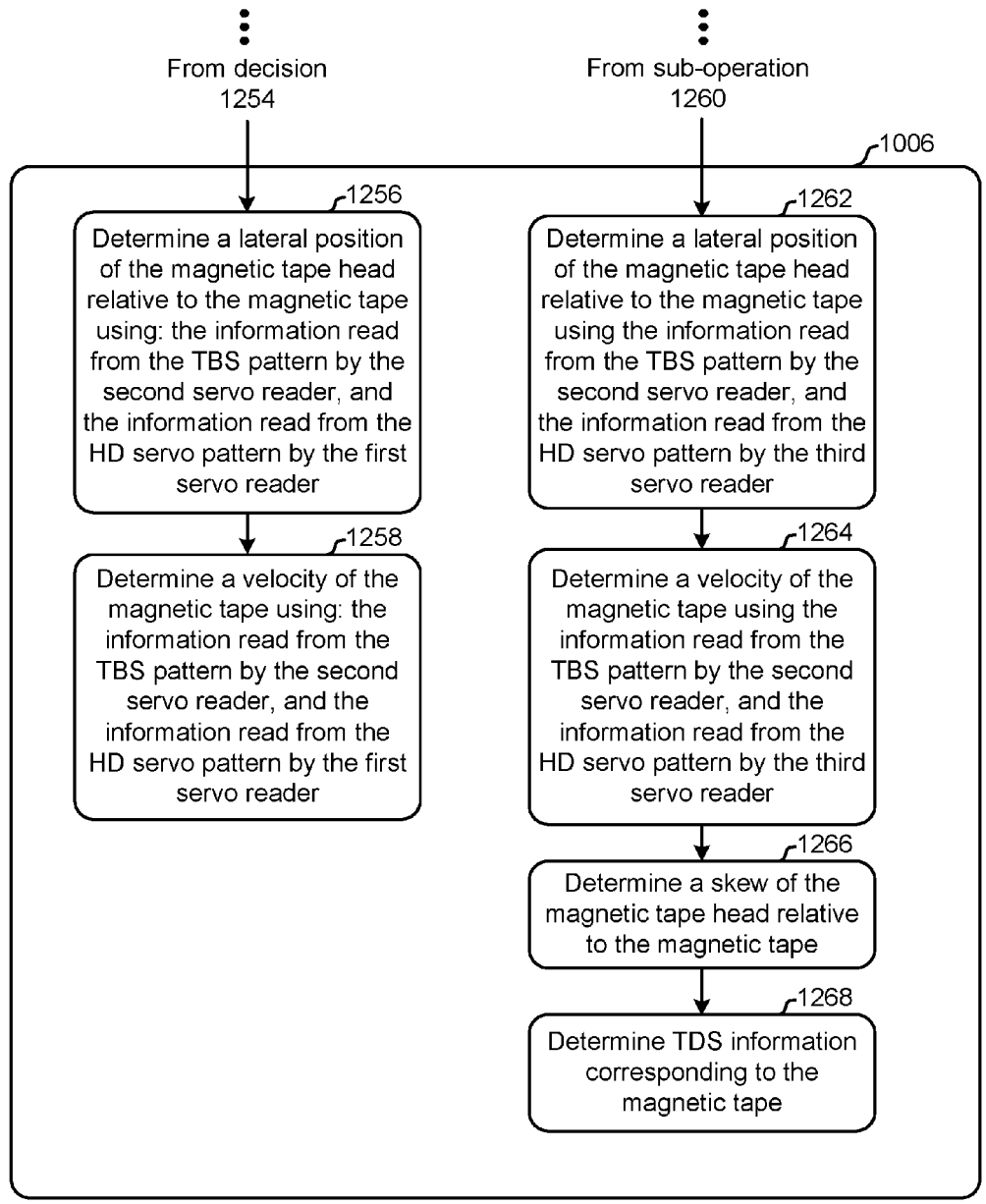

Looking now to FIGS. 12A-12C, exemplary sub-processes of reading servo information and using the servo information to position the magnetic tape head are illustrated in accordance with one approach in which the magnetic tape head includes two groups of servo readers, each group including three individual servo readers (e.g., see FIG. 9H). Any one or more of sub-processes may be used to perform operations 1004 and/or 1006 of FIG. 10. However, it should be noted that the sub-processes of FIGS. 12A-12C are illustrated in accordance with one approach which is in no way intended to limit the invention.

Referring specifically to FIG. 12A, the sub-processes illustrated in FIG. 12A may be performed in response to determining in operation 1002 that each of the servo bands on a magnetic tape has a configuration similar to that of the servo band configuration 950 depicted in FIG. 9F above. In other words, the sub-processes illustrated in FIG. 12A may be performed in response to determining in operation 1002 that each of the servo bands on a magnetic tape has a configuration of a fifth type. Although in no way intended to limit the invention, a "configuration of a fifth type" is intended to correspond to a servo band configuration which includes a HD servo pattern and a TBS pattern, the HD servo pattern and the TBS pattern each having a width that is one sixth of the prespecified width of the given servo band.

With continued reference to FIG. 12A, sub-operation 1202 includes reading information from the TBS pattern with a first servo reader of one of the groups of servo readers, while sub-operation 1204 includes reading information from the HD servo pattern with a second servo reader of the one of the groups of servo readers. Again, the magnetic tape head in the present approach includes two groups of servo readers, each group including three individual servo readers. Thus information may be read from the TBS and HD patterns with the servo readers in either (or both) of the groups of servo readers simultaneously. Moreover, depending on the orientation of the HD servo pattern with respect to the TBS pattern, the "first servo reader" may be the servo reader in a group that is closer to a specified first end of the magnetic tape head along its longitudinal axis, while the "second servo reader" may be the servo reader in a group that is farther from the specified first end of the magnetic tape head, or vice versa. Furthermore, the "first servo reader" may be the middle servo reader in the group, while the "second servo reader" may be one of the outer servo readers in that group, e.g., depending on the approach.

Moreover, it should again be noted that each of the servo readers in a group of servo readers on a given magnetic tape head according to any of the approaches described herein may be able to read HD servo patterns as well as TBS servo patterns in the sense that each of the servo readers may be able to generate a readback signal which corresponds to the respective servo pattern when passed thereover while operational (e.g., powered on). However, depending on which type of servo pattern a particular readback signal corresponds to (e.g., TBS or HD), circuitry electrically coupled to the magnetic tape head and the servo readers corresponding thereto may route the readback signal to a combination of components (e.g., a circuit) which is able to decode the readback signal and produce readback information based on the type of servo pattern the readback signal originated from, e.g., refer back to FIGS. 6 and 7 above.

Moreover, the servo information derived from the servo patterns of a servo band may be further used by the magnetic tape head and/or various other components. For instance, sub-operation 1206 includes determining (e.g., decoding, calculating, etc.) a lateral position of the magnetic tape head relative to the magnetic tape using the information read from the TBS pattern, as well as the information read from the HD servo pattern. Moreover, sub-operation 1208 includes determining (e.g., decoding, calculating, etc.) a velocity of the magnetic tape using the information read from the TBS pattern, as well as the information read from the HD servo pattern. The lateral position of the magnetic tape head and/or the velocity of the magnetic tape may be determined using any process which would be apparent to one skilled in the art after reading the present description. The lateral position and/or velocity of tape may be used according to any desired approach.

Implementing the various processes described in FIG. 12A desirably results in the ability to determine track following information while also enabling backward compatibility which is highly desirable for removable storage media such as magnetic tape as described herein. In sharp contrast, conventional products have relied on different tape drives for reading and/or writing to magnetic tapes having different forms which results in decreased data processing efficiency, decreased system resource utilization efficiency, etc.

Now looking to FIG. 12B, the sub-processes illustrated in FIG. 12B may be performed in response to determining in operation 1002 that each of the servo bands on a magnetic tape have a configuration similar to that of the servo band configuration 940 depicted in FIG. 9E above. In other words, the sub-processes illustrated in FIG. 12B may be performed in response to determining in operation 1002 that each of the servo bands on a magnetic tape has a configuration of a fourth type. Although in no way intended to limit the invention, a "configuration of a fourth type" is intended to correspond to a servo band configuration which includes two TBS patterns and a HD servo pattern sandwiched between the two TBS patterns. Moreover, each of the TBS patterns and the HD servo pattern each have a width that is one sixth of the prespecified width of the given servo band.

With continued reference to FIG. 12B, decision 1220 includes determining whether the magnetic tape is traveling in a forward direction. As described above, "in a forward direction" is intended to represent the instance where the magnetic tape is being transitioned from supply reel (e.g., in a tape cartridge) to take-up reel (e.g., in a tape drive). For instance, referring momentarily back to FIG. 2, it may be determined that the magnetic tape 122 is traveling in a forward direction while being transitioned from supply cartridge 120 to take-up reel 121. In other words, a tape may be traveling in a forward direction when the magnetic tape is being passed over a magnetic head from the beginning of tape and traveling towards the end of tape. Similarly, it may be determined that the magnetic tape 122 is not traveling in a forward direction (but rather a backward direction) while being transitioned from take-up reel 121 to supply cartridge 120. However, it should be noted that in other embodiments, "in a forward direction" may represent instance where the magnetic tape is being transitioned from take-up reel to supply reel.

Referring back to FIG. 12B, the flowchart is shown as proceeding to sub-operation 1222 in response to determining that the magnetic tape is traveling in the backward direction. There, sub-operation 1222 includes reading information from a first of the two TBS patterns with a first servo reader of one of the groups of servo readers. Moreover, sub-operation 1224 includes reading information from the HD servo pattern with a second servo reader of the one of the groups of servo readers.

The flowchart also proceeds to sub-operation 1226 in response to determining that the magnetic tape is traveling in the forward direction. There, sub-operation 1226 includes reading information from a second of the two TBS patterns with the second servo reader of the one of the groups of servo readers (e.g., see 998 of FIG. 9H). Furthermore, sub-operation 1228 includes reading information from the HD servo pattern with the first servo reader of the one of the groups of servo readers (e.g., see 996 of FIG. 9H), while sub-operation 1230 includes reading information from the first of the two TBS patterns with the third servo reader positioned adjacent to the one of the groups of servo readers (e.g., see 994 of FIG. 9H).

It follows that servo information may preferably be read from a certain servo pattern with a certain servo reader depending on the direction in which the magnetic tape is traveling. For instance, referring momentarily back to FIGS. 9E and 9H, according to an in-use example, which is in no way intended to limit the invention, while the magnetic tape is traveling in a forward direction, a first (e.g., middle) one of the servo readers 996 in the first (e.g., lower) group of servo readers 974 may be used to read the HD pattern 942 while the second (e.g., lowest) one of the servo readers 998 in the first (e.g., lower) group of servo readers 974 is used to read the second (e.g., lowest) TBS servo pattern 944 and the third (e.g., uppermost) servo reader 994 in the first (e.g., lower) group of servo readers 974 may be used to read the first (e.g., upper) TBS pattern 946. However, when the magnetic tape is traveling in a direction opposite the forward direction, the second (e.g., lowest) one of the servo readers 998 in the first (e.g., lower) group of servo readers 974 is used to read the HD servo pattern 942 while the first (e.g., middle) servo reader 996 in the first (e.g., lower) group of servo readers 974 is used to read the first (e.g., upper) TBS servo pattern 946. Again, this in-use example is presented for exemplary purposes only, and is in no way intended to limit the invention. Moreover, the terms "uppermost", "middle" and "lowest" are relative terms which are in used to merely represent a relative positioning of the servo patterns and/or servo readers relative to each other according to the in-use example. Thus, depending on the orientation of the magnetic tape head, the magnetic tape, the servo readers, servo patterns, etc., the servo readers and/or servo patterns may correspond differently.

Referring again to FIG. 12B, from sub-operation 1224 the flowchart proceeds to sub-operation 1232 which includes determining (e.g., decoding) a lateral position of the magnetic tape head relative to the magnetic tape using the information read from the first of the two TBS patterns by the first servo reader, as well as the information read from the HD servo pattern. Moreover, sub-operation 1234 includes determining (e.g., decoding) a velocity of the magnetic tape using the information read from the first of the two TBS patterns by the first servo reader, as well as the information read from the HD servo pattern.

The flowchart is also shown as proceeding from sub-operation 1230 to sub-operation 1236 which includes determining (e.g., decoding) a lateral position of the magnetic tape head relative to the magnetic tape using the information read from the second of the two TBS patterns by the second servo reader, and the information read from the HD servo pattern by the first servo reader. Moreover, sub-operation 1238 includes determining (e.g., decoding) a velocity of the magnetic tape using the information read from the second of the two TBS patterns by the second servo reader, and the information read from the HD servo pattern by the first servo reader.

Additionally, a lateral position of the magnetic tape head relative to the magnetic tape as well as a tape velocity are determined from the servo information read from the information read from the first of the two TBS patterns. Accordingly, sub-operation 1240 includes determining (e.g., decoding) a lateral position of the magnetic tape head relative to the magnetic tape using the information read from the first of the two TBS patterns by the third servo reader. Moreover, sub-operation 1242 includes determining (e.g., decoding) a velocity of the magnetic tape using the information read from the first of the two TBS patterns by the third servo reader.

Further still, sub-operation 1244 includes determining (e.g., compute) a skew of the magnetic tape head relative to the magnetic tape, and sub-operation 1246 includes determining (e.g., compute) TDS information corresponding to the magnetic tape. Again, according to an exemplary approach, the skew of the magnetic tape head may be determined using the servo information read by the servo readers in a same group. Accordingly, when two or more servo readers are able to read two respective TBS patterns at one end of the magnetic tape head, the skew between the relative orientation of the magnetic tape head and magnetic tape may be determined. This resulting ability is highly desirable, as single servo band detection with multiple servo readers on a single magnetic tape head allows skew and/or TDS measurements to be determined even while other servo band information is invalid or unobtainable. Moreover, this improvement is further exemplified when contrasted to conventional products which must check the timing to detect identifier from two different servo patterns on two different servo bands to assure skew information is decoded from same servo frame. As a result, implementing a magnetic tape head which is able to perform one or more of the various processes described in FIGS. 10-12B desirably improves tape drive performance, reduces readback error, etc.

According to some approaches, the skew of the magnetic tape head may be determined using any of the processes described below with reference to FIGS. 14A-14D. For example, Equation 3 and/or Equation 4 may be used to determine the skew of the magnetic tape head. However, referring again to FIG. 12B, the skew of the magnetic tape head and/or the TDS information corresponding to the magnetic tape may be determined in sub-operations 1244, 1246 using any process which would be apparent to one skilled in the art after reading the present description.

Again, the skew of the magnetic tape head relative to the magnetic tape may be used to reposition (e.g., rotate) the magnetic tape head such that the data transducers on the magnetic tape head are desirably positioned relative to the data tracks of the corresponding data band. Moreover, the TDS information corresponding to the magnetic tape may be used to reposition (e.g., laterally shift) the magnetic tape head relative to the magnetic tape in some approaches. Accordingly, the skew of the magnetic tape head relative to the magnetic tape and the TDS information corresponding to the magnetic tape may be used to desirably position the magnetic tape head relative to the magnetic tape.

Implementing the various processes described in FIG. 12B desirably results in the ability to determine the relative skew of the magnetic tape and TDS while at least two servo readers are located above (able to read) a TBS pattern. This significantly reduces the frequency of read errors, reduces magnetic tape head degradation, improves track following, etc., particularly in comparison to conventional products. Furthermore, this improved functionality is achieved while also enabling backward compatibility which is highly desirable for removable storage media such as magnetic tape as described herein. In sharp contrast, conventional products have determined tape skew and TDS measurements from information gathered from servo bands on both sides of a head module, or information from servo readers on multiple head modules. In other words, to compute skew and/or TDS, conventional products have needed to obtain valid servo information from more than one servo band and/or more than one head module. This makes such conventional head modules particularly susceptible to degraded performance and/or being rendered completely useless by servo defects, scratches caused by asperities on the surface of the magnetic tape, etc.

Moving to FIG. 12C, the sub-processes illustrated in FIG. 12C may be performed in response to determining in operation 1002 that each of the servo bands on a magnetic tape has a configuration similar to that of the servo band configuration 930 depicted in FIG. 9D above. In other words, the sub-processes illustrated in FIG. 11A may be performed in response to determining in operation 1002 that each of the servo bands on a magnetic tape has a configuration of a third type. Although in no way intended to limit the invention, a "configuration of a third type" is intended to correspond to a servo band configuration which includes a HD servo pattern and a TBS pattern, the HD servo pattern and the TBS pattern each having a width that is one third of the prespecified width of the given servo band. For example, referring back to FIG. 9D momentarily, the servo band configuration 930 illustrated therein is of a third type.

With continued reference to FIG. 12C, sub-operation 1250 includes reading information from the TBS pattern with a second servo reader of one of the groups of servo readers, while sub-operation 1252 includes reading information from the HD servo pattern with a third servo reader of the one of the groups of servo readers. Furthermore, decision 1254 includes determining whether the second servo reader positioned adjacent to the one of the groups of servo readers is also currently oriented over the bottom half of the TBS pattern. As mentioned above, the magnetic tape head in the present approach includes two groups of servo readers, each group including three individual servo readers (e.g., see FIG. 9H). Accordingly, in some instances all three of the servo readers may be positioned over servo patterns in a given servo band.

In response to determining that the second servo reader positioned adjacent to the one of the groups of servo readers is not also currently oriented over the bottom half of the TBS pattern, the flowchart proceeds to sub-operation 1256. There, sub-operation 1256 includes determining (e.g., decoding) a lateral position of the magnetic tape head relative to the magnetic tape using the information read from the TBS pattern by the second servo reader, and the information read from the HD servo pattern by the first servo reader. Furthermore, sub-operation 1258 includes determining (e.g., decoding) a velocity of the magnetic tape using the information read from the TBS pattern by the second servo reader, and the information read from the HD servo pattern by the first servo reader.

However, returning to decision 1254, the flowchart proceeds to sub-operation 1260 in response to determining that the first servo reader positioned adjacent to the one of the groups of servo readers is also currently oriented over the TBS pattern. There, sub-operation 1260 includes reading information from the TBS pattern with the first servo reader as well.

Sub-operation 1262 further includes determining (e.g., decoding) a lateral position of the magnetic tape head relative to the magnetic tape using the information read from the TBS pattern by the second servo reader, and the information read from the HD servo pattern by the third servo reader, while sub-operation 1264 includes determining (e.g., decoding) a velocity of the magnetic tape using the information read from the TBS pattern by the second servo reader and the information read from the HD servo pattern by the third servo reader. Furthermore, sub-operation 1266 includes determining (e.g., computing) a skew of the magnetic tape head relative to the magnetic tape, and sub-operation 1268 includes determining (e.g., computing) TDS information corresponding to the magnetic tape.

According to an exemplary approach, the skew of the magnetic tape head may be determined using any of the processes described below with reference to FIGS. 14A-14D. For example, Equation 3 and/or Equation 4 may be used to determine the skew of the magnetic tape head. However, referring again to FIG. 12B, the skew of the magnetic tape head and/or the TDS information corresponding to the magnetic tape may be determined in sub-operations 1266, 1268 using any process which would be apparent to one skilled in the art after reading the present description.

Implementing the various processes described in FIG. 12C desirably results in the ability to determine the relative skew of the magnetic tape and TDS while at least two servo readers are located above (able to read) a TBS pattern. This significantly reduces the frequency of read errors, reduces magnetic tape head degradation, improves track following, etc., particularly in comparison to conventional products. Furthermore, this improved functionality is achieved while also enabling backward compatibility which is highly desirable for removable storage media such as magnetic tape as described herein. In sharp contrast, conventional products have determined tape skew and TDS measurements from information gathered from servo bands on both sides of a head module, or information from servo readers on multiple head modules. In other words, to compute skew and/or TDS, conventional products have needed to obtain valid servo information from more than one servo band and/or more than one head module. This makes such conventional head modules particularly susceptible to degraded performance and/or being rendered completely useless by servo defects, scratches caused by asperities on the surface of the magnetic tape, etc.

Looking now to FIGS. 13A-14D, exemplary processes for determining the skew of a magnetic head relative to a magnetic tape being passed thereacross are illustrated in accordance with different embodiments. As an option, any of the present processes for determining the skew of a magnetic head relative to a magnetic tape being passed thereacross may be implemented in conjunction with features from any other embodiment listed herein, such as those described with reference to the other FIGS., such as FIGS. 11C and 12C, e.g., as mentioned above.

Figures 13C, 13D:
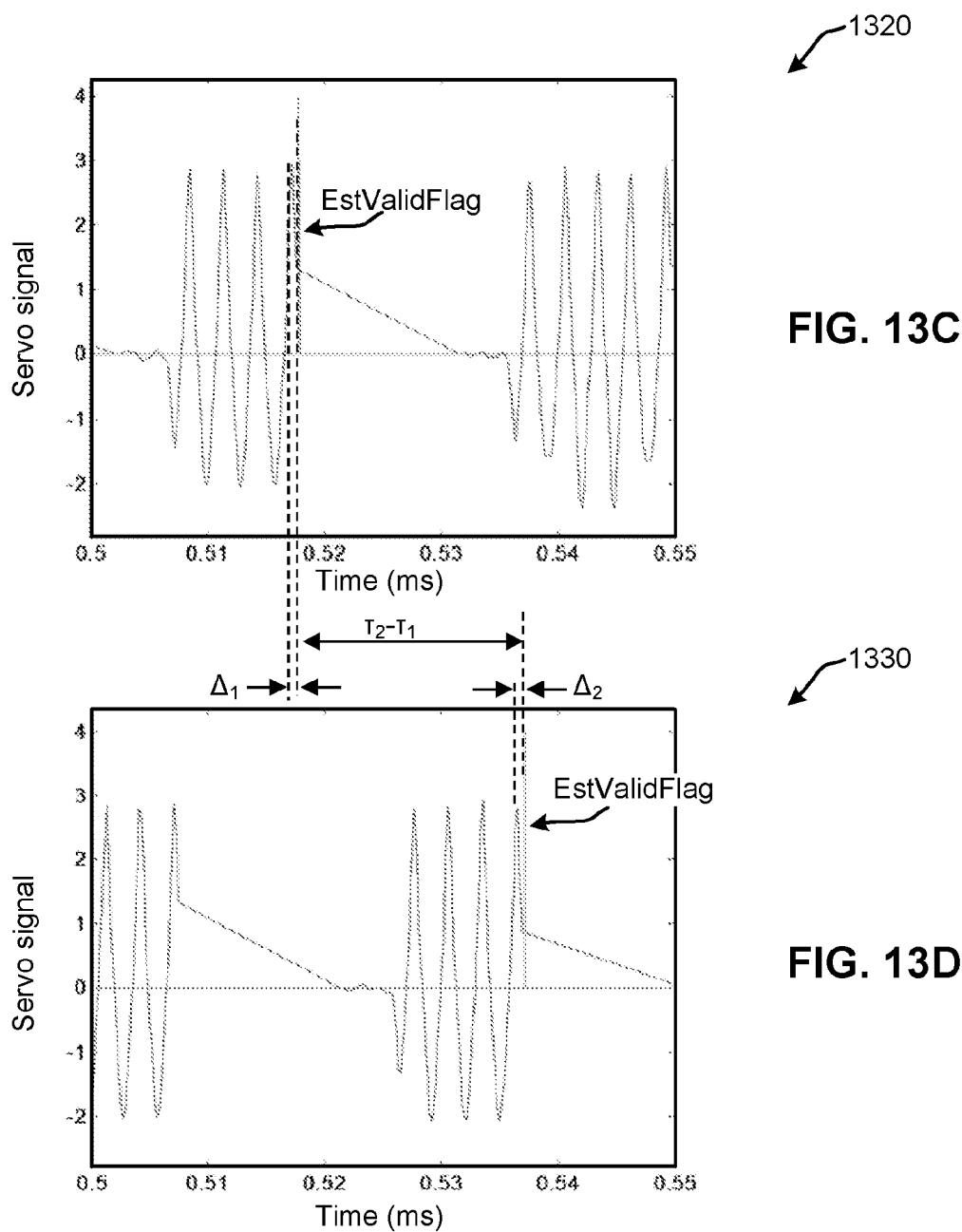
FIG. 13C is a graph plotting servo signal vs. time, according to one embodiment.
FIG. 13D is a graph plotting servo signal vs. time, according to one embodiment.

Referring specifically to FIGS. 13A-13D, as shown in FIG. 13A and the detailed view in FIG. 13B, the corresponding processes relate to an instance in which two immediately adjacent servo readers 1300, 1301 are positioned over (e.g., able to read) a same TBS pattern 1302. The magnetic tape 1304 is preferably oriented such that the direction of tape travel is perpendicular to the longitudinal axis of the magnetic tape head 1306. Therefore, looking to the relative angular orientation of the magnetic tape 1304 and magnetic tape head 1306, the magnetic tape 1304 is skewed from an ideal orientation relative to the magnetic tape head 1306 by an amount which is represented by angle θ. Moreover, the immediately adjacent servo readers 1300, 1301 are separated by a distance $D_3$ which is measured in a direction along (parallel) the longitudinal axis of the magnetic tape head 1306. The third servo reader 1308 is also positioned over the HD servo pattern 1310 and preferably reading servo information therefrom.

The graphs 1320, 1330 of FIGS. 13C-13D illustrate a servo correlator output which corresponds to the readback signal received from the middle servo reader 1300 and the lower servo reader 1301, respectively. The timing offset $\tau_2$-$\tau_1$ represented in the plots of the graphs 1320, 1330 results in part from the skew angle θ between the relative angular orientations of the magnetic tape head 1306 relative to the magnetic tape 1304. Moreover, offsets $\Delta_1$ and $\Delta_2$ represent the amount of timing error between the calculated (e.g., estimated) peak arrival time value EstvalidFlag with the actual peak arrival time value seen in the plot on the graph for each of the respective servo readers 1300, 1301. calculated (e.g., estimated) peak arrival time values EstvalidFlag may be determined using known information about the synchronous servo channel in the tape drive being used to read the magnetic tape in addition to the known (or knowable) velocity of tape, e.g., as would be appreciated by one skilled in the art after reading the present description.

The following equations Equation 1 and Equation 2 represent the interrelations of the relative orientations of the magnetic tape head 1306 and the magnetic tape 1304. Accordingly, Equation 1 and/or Equation 2 may be used to determine (e.g., calculate) skew related information depending on the desired approach as follows:

$$\varphi = v(\tau_2 - \tau_1 + \Delta_1 - \Delta_2) \quad \text{Equation 1}$$

where v is the velocity of the magnetic tape (e.g., tape speed).

$$\tan\theta = \frac{\varphi - D_3 \times \tan\alpha}{D_3} \quad \text{Equation 2}$$

where α is the azimuth angle of the servo bursts in the servo pattern depending on the type of magnetic tape (e.g., see Table 1 in relation to FIG. 4B above).

Figures 14C, 14D:
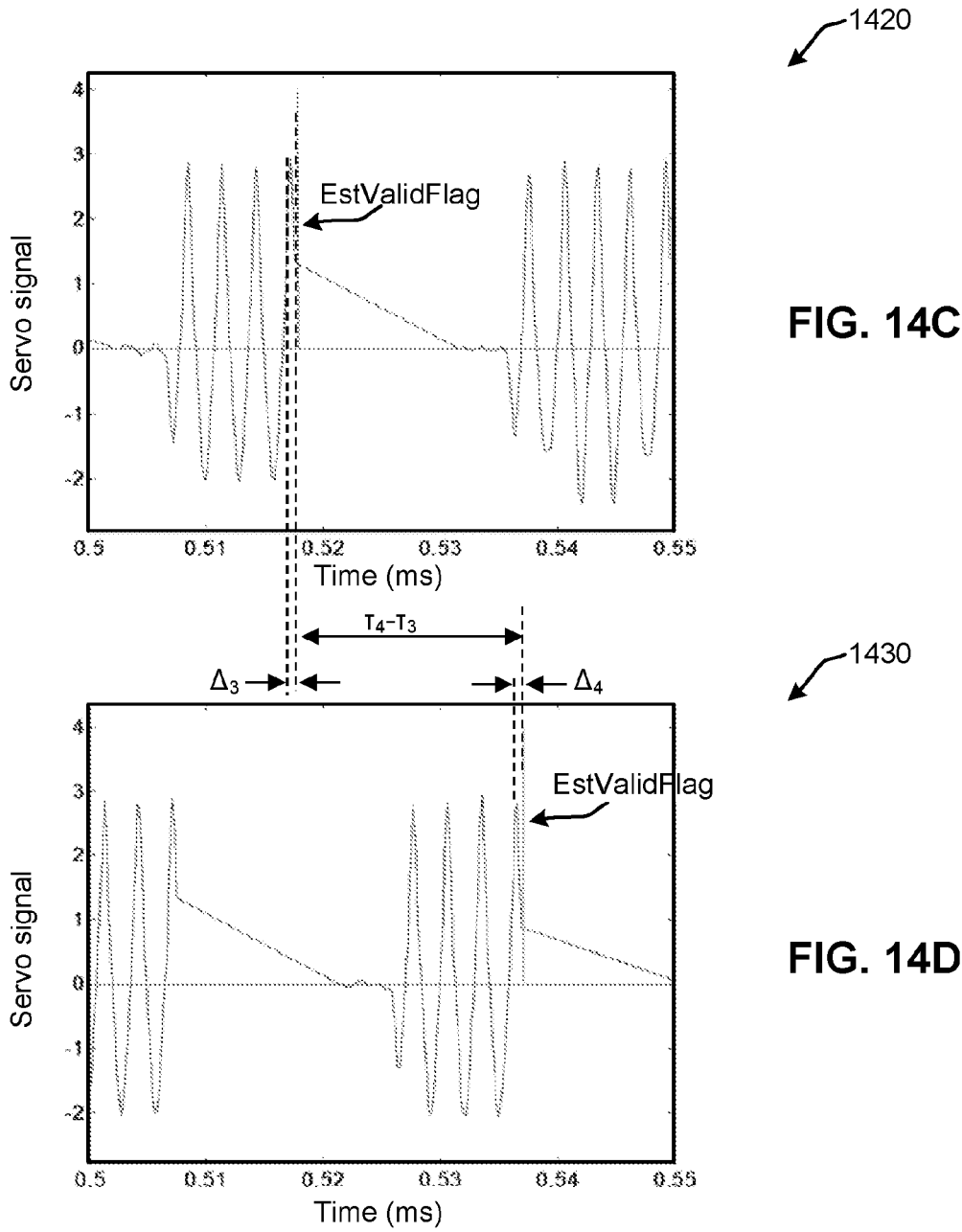
FIG. 14C is a graph plotting servo signal vs. time, according to one embodiment.
FIG. 14D is a graph plotting servo signal vs. time, according to one embodiment.

Similarly, looking now to FIGS. 14A-14D, as shown in FIG. 14A and the detailed view in FIG. 14B, the corresponding processes relate to an instance in which two immediately adjacent servo readers 1400, 1401 are positioned over (e.g., able to read) two different TBS patterns 1402, 1403. The magnetic tape 1404 is preferably oriented such that the direction of tape travel is perpendicular to the longitudinal axis of the magnetic tape head 1406. Therefore, looking to the relative angular orientation of the magnetic tape 1404 and magnetic tape head 1406, the magnetic tape 1404 is skewed from an ideal orientation relative to the magnetic tape head 1406 by an amount which is represented by angle $\theta_2$. Moreover, the immediately adjacent servo readers 1400, 1401 are separated by a center-to-center distance $D_4$ which is measured in a direction along (parallel) the longitudinal axis of the magnetic tape head 1406. The third servo reader 1408 is also positioned over the HD servo pattern 1410 and preferably reading servo information therefrom.

The graphs 1420, 1430 of FIGS. 14C-14D illustrate a servo correlator output which corresponds to the readback signal received from the top servo reader 1400 and the lower servo reader 1401, respectively. The timing offset $\tau_4$-$\tau_3$ represented in the plots of the graphs 1420, 1430 results in part from the skew angle $\theta_2$ between the relative angular orientations of the magnetic tape head 1406 relative to the magnetic tape 1404. Moreover, $\Delta_3$ and $\Delta_4$ represent the amount of timing error between the calculated (e.g., estimated) peak arrival time value EstvalidFlag with the actual peak arrival time value seen in the plot on the graph for each of the respective servo readers 1400, 1401. calculated (e.g., estimated) peak arrival time values EstvalidFlag may be determined using known information about the synchronous servo channel in the tape drive being used to read the magnetic tape in addition to the known (or knowable) velocity of tape, e.g., as would be appreciated by one skilled in the art after reading the present description.

The following equations Equation 3 and Equation 4 represent the interrelations of the relative orientations of the magnetic tape head 1406 and the magnetic tape 1404. Accordingly, Equation 3 and/or Equation 4 may be used to determine (e.g., calculate) skew related information depending on the desired approach as follows:

$$\varphi = v_2(\tau_4 - \tau_3 + \Delta_3 - \Delta_4) \quad \text{Equation 3}$$

where $v_2$ is the velocity of the magnetic tape.

$$\tan\theta = \frac{\varphi}{D_4} \quad \text{Equation 4}$$

Again, any of the processes for determining the skew of a magnetic head relative to a magnetic tape being passed thereacross described in relation to FIGS. 13A-14D may be implemented in conjunction with features from any other embodiment listed herein, such as those described with reference to the other FIGS., such as FIGS. 11C and 12C. For instance, Equation 1 and/or Equation 2 may be used, at least in part, to determine the skew of the magnetic tape head in sub-operation 1154 of FIG. 11C. Moreover, Equation 3 and/or Equation 4 may be used, at least in part, to determine the skew of the magnetic tape head in sub-operation 1266 of FIG. 12C. Implementing one or more of the processes described in relation to FIGS. 13A-14D while determining the skew of the magnetic tape head, e.g., as seen in sub-operations 1154 and 1266, is advantageous, as the accuracy of the resulting skew measurement is not decreased by timing offsets. As a result, adjustments made to the lateral and/or angular position of the magnetic tape head relative to the magnetic tape may result in increased data read and/or write efficiency.

As previously mentioned, the magnetic tape 902 illustrated in FIGS. 9A-9F may be stored in a data storage cartridge. Looking now to FIG. 15, a data storage cartridge 1500 is illustrated in accordance with one embodiment. As an option, the present data storage cartridge 1500 may be implemented in conjunction with features from any other embodiment listed herein, such as those described with reference to the other FIGS. However, such data storage cartridge 1500 and others presented herein may be used in various applications and/or in permutations which may or may not be specifically described in the illustrative embodiments listed herein. Further, the data storage cartridge 1500 presented herein may be used in any desired environment. Thus FIG. 15 (and the other FIGS.) may be deemed to include any possible permutation.

The data storage cartridge 1500 is shown as having an outer housing 1502, which may include plastic(s), metal(s), rubber(s), etc., and/or combinations thereof. The outer housing 1502 preferably defines an inner region (which is obstructed from view) which is large enough to store a magnetic medium. Accordingly, the inner region of the data storage cartridge 1500 may include a magnetic tape. While the magnetic tape may be stored in the data storage cartridge 1500 in any desired manner, it is preferred that the magnetic tape is wound on a flanged or flangeless spool which is in turn stored in the inner region of the data storage cartridge 1500.

The data storage cartridge 1500 also includes a cartridge memory 1504 which is stored in the inner region of the data storage cartridge 1500 and shown in a cutaway portion of the Figure, which is in no way intended to limit the invention. It follows that certain information corresponding to the magnetic medium stored in the data storage cartridge 1500 may be saved in the cartridge memory 1504. For example, a format in which a magnetic tape in the cartridge 1500 was produced may be stored in the cartridge memory 1504. Thus, a prespecified width of each of the servo bands included in the magnetic tape may be determined from the information stored in the cartridge memory 1504.

However, any configuration of data storage cartridge may be used whether or not it includes the cartridge memory 1504. According to some approaches, in place of or in addition to the cartridge memory 1504, the data storage cartridge 1500 may include a barcode coupled to an outer surface of the outer housing 1502, a radio-frequency identification (RFID) tag coupled to the outer housing 1502, etc., and used to store additional information corresponding to a magnetic medium in the data storage cartridge 1500.

Accordingly, various approaches described and/or suggested herein are able to successfully improve tape drive performance. As described above, it is preferred that magnetic tapes have a hybrid servo band configuration which include servo patterns which each have a width which is less than or equal to one third of a prespecified width of the given servo band. Moreover, a magnetic tape head preferably includes two groups of servo readers, each group having at least two individual servo readers. Each of the immediately adjacent servo readers in a group are separated by a distance which is less than or equal to one third of a prespecified width of the given servo band, thereby allowing the magnetic tape head to be positionable relative to a magnetic tape such that two or more of the servo readers in a single group are able to read servo information from one or more servo patterns in the given servo band simultaneously. It follows that the number and relative spacing between the servo patterns in the various approaches described herein, as well as the number and relative spacing between servo readers in the various approaches described herein allow for a corresponding magnetic tape head and tape drive to achieve improved performance while also enabling backward compatibility for various styles (e.g., generations) of magnetic tape. As a result, by implementing the foregoing technical features, the shortcomings experienced in conventional products are overcome.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable CD-ROM, a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. By integrated with, what is meant is that the processor has logic embedded therewith as hardware logic, such as an application specific integrated circuit (ASIC), a field programmable gate array (FPGA), etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer.

The inventive concepts disclosed herein have been presented by way of example to illustrate the myriad features thereof in a plurality of illustrative scenarios, embodiments, and/or implementations. It should be appreciated that the concepts generally disclosed are to be considered as modular, and may be implemented in any combination, permutation, or synthesis thereof. In addition, any modification, alteration, or equivalent of the presently disclosed features, functions, and concepts that would be appreciated by a person having ordinary skill in the art upon reading the instant descriptions should also be considered within the scope of this disclosure.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. A tape drive-implemented method, comprising:
   determining a servo band configuration of servo bands on a magnetic tape;
   using servo readers on a magnetic tape head to read one or more of the servo bands based on the determined servo band configuration; and
   using information read from the one or more of the servo bands to position the magnetic tape head relative to the magnetic tape, wherein an array of data transducers is positioned along the magnetic tape head, the array extending perpendicular to a direction of travel of the magnetic tape, wherein a group of the servo readers is positioned at each end of the array of data transducers, wherein a distance between each of the immediately adjacent servo readers in each of the groups of servo readers is less than or equal to one third of a prespecified width of each of the servo bands, wherein the distance between each of the servo readers in each of the groups and the prespecified width are both measured in a direction perpendicular to the direction of travel of the magnetic tape.

2. The tape drive-implemented method as recited in claim 1, wherein in response to determining that each of the servo bands is of a third configuration having a high density servo pattern and a timing based servo pattern, the high density servo pattern and the timing based servo pattern each having a width measured in the direction perpendicular to the direction of travel of the magnetic tape, each of the widths being one third of the prespecified width:

using the servo readers to read the one or more of the servo bands includes:
reading information from the timing based servo pattern with a first servo reader of one of the groups of servo readers; and
reading information from the high density servo pattern with a second servo reader of the one of the groups of servo readers, and using the information read from the one or more of the servo bands to position the magnetic tape head relative to the magnetic tape includes:
determining a lateral position of the magnetic tape head relative to the magnetic tape using: the information read from the timing based servo pattern, and the information read from the high density servo pattern; and
determining a velocity of the magnetic tape using: the information read from the timing based servo pattern, and the information read from the high density servo pattern.

3. The tape drive-implemented method as recited in claim 1, wherein in response to determining that each of the servo bands is of a second configuration having two timing based servo patterns and a high density servo pattern sandwiched between the two timing based servo patterns, each of the timing based servo patterns and the high density servo pattern each having a width measured in the direction perpendicular to the direction of travel of the magnetic tape, each of the widths being one third of the prespecified width:

using the servo readers to read the one or more of the servo bands includes:
determining whether the magnetic tape is traveling in a forward direction;
reading information from a first of the two timing based servo patterns with a first servo reader of one of the groups of servo readers in response to determining that the magnetic tape is traveling in a forward direction;
reading information from the high density servo pattern with a second servo reader of the one of the groups of servo readers in response to determining that the magnetic tape is traveling in a forward direction;
reading information from a second of the two timing based servo patterns with the second servo reader of the one of the groups of servo readers in response to determining that the magnetic tape is not traveling in a forward direction; and
reading information from the high density servo pattern with the first servo reader of the one of the groups of servo readers in response to determining that the magnetic tape is not traveling in a forward direction, and using the information read from the one or more of the servo bands to position the magnetic tape head relative to the magnetic tape includes:
determining a lateral position of the magnetic tape head relative to the magnetic tape using: the information read from the first or second of the two timing based servo patterns, and the information read from the high density servo pattern; and
determining a velocity of the magnetic tape using: the information read from the first or second of the two timing based servo patterns, and the information read from the high density servo pattern.

4. The tape drive-implemented method as recited in claim 1, wherein in response to determining that each of the servo bands are of a first configuration having a timing based servo pattern with a width measured in the direction perpendicular to the direction of travel of the magnetic tape, the width being two thirds of the prespecified width:

using the servo readers to read the one or more of the servo bands includes:
reading information from the timing based servo pattern with a first servo reader of one of the groups of servo readers, and using the information read from the one or more of the servo bands to position the magnetic tape head relative to the magnetic tape includes:
determining a lateral position of the magnetic tape head relative to the magnetic tape using: the information read from the timing based servo pattern; and
determining a velocity of the magnetic tape using: the information read from the timing based servo pattern.

5. The tape drive-implemented method as recited in claim 4, comprising:

determining whether a second servo reader of the one of the groups of servo readers is oriented over the timing based servo pattern; and in response to determining that the second servo reader of the one of the groups of servo readers is oriented over the timing based servo pattern:
using the servo readers to read the one or more of the servo bands includes:
reading information from the timing based servo pattern with the second servo reader of the one of the groups of servo readers, and
using the information read from the one or more of the servo bands to position the magnetic tape head relative to the magnetic tape includes:
determining a lateral position of the magnetic tape head relative to the magnetic tape using: the information read from the timing based servo pattern by the second servo reader of the one of the groups of servo readers;
determining a velocity of the magnetic tape using: the information read from the timing based servo pattern by the second servo reader of the one of the groups of servo readers;
determining a skew of the magnetic tape head relative to the magnetic tape; and determining tape dimensional stability information corresponding to the magnetic tape.

6. The tape drive-implemented method as recited in claim 1, wherein 32 data transducers are positioned along the magnetic tape head in the array.

7. The tape drive-implemented method as recited in claim 1, wherein 64 data transducers are positioned along the magnetic tape head in the array.

8. The tape drive-implemented method as recited in claim 1, wherein 128 data transducers are positioned along the magnetic tape head in the array.

9. The tape drive-implemented method as recited in claim 1, wherein each group of servo readers includes a third servo reader, wherein a distance between each of the servo readers and an immediately adjacent one of the servo readers in the respective group of servo readers is less than or equal to one sixth of a prespecified width of each of the servo bands.

10. The tape drive-implemented method as recited in claim 9, wherein in response to determining that each of the servo bands are of a fifth configuration having a high density servo pattern and a timing based servo pattern, the high density servo pattern and the timing based servo pattern each having a width measured in the direction perpendicular to the direction of travel of the magnetic tape, each of the widths being one sixth of the prespecified width:
  using the servo readers to read the one or more of the servo bands includes:
    reading information from the timing based servo pattern with a first servo reader of one of the groups of servo readers; and
    reading information from the high density servo pattern with a second servo reader of the one of the groups of servo readers, and
  using the information read from the one or more of the servo bands to position the magnetic tape head relative to the magnetic tape includes:
    determining a lateral position of the magnetic tape head relative to the magnetic tape using: the information read from the timing based servo pattern, and the information read from the high density servo pattern; and
    determining a velocity of the magnetic tape using: the information read from the timing based servo pattern and the information read from the high density servo pattern.

11. The tape drive-implemented method as recited in claim 9, wherein in response to determining that each of the servo bands are of a fourth configuration having two timing based servo patterns and a high density servo pattern sandwiched between the two timing based servo patterns, each of the timing based servo patterns and the high density servo pattern each having a width measured in the direction perpendicular to the direction of travel of the magnetic tape, each of the widths being one sixth of the prespecified width:
  determining whether the magnetic tape is traveling in a forward direction;
  in response to determining that the magnetic tape is traveling in a forward direction:
    using the servo readers to read the one or more of the servo bands includes:
      reading information from a first of the two timing based servo patterns with a first servo reader of one of the groups of servo readers; and
      reading information from the high density servo pattern with a second servo reader of the one of the groups of servo readers, and
    using the information read from the one or more of the servo bands to position the magnetic tape head relative to the magnetic tape includes:
      determining a lateral position of the magnetic tape head relative to the magnetic tape using: the information read from the first of the two timing based servo patterns, and the information read from the high density servo pattern; and
      determining a velocity of the magnetic tape using: the information read from the first of the two timing based servo patterns, and the information read from the high density servo pattern,
  in response to determining that the magnetic tape is not traveling in a forward direction:
    using the servo readers to read the one or more of the servo bands includes:
      reading information from a second of the two timing based servo patterns with the second servo reader of the one of the groups of servo readers;
      reading information from the high density servo pattern with the first servo reader of the one of the groups of servo readers; and
      reading information from the first of the two timing based servo patterns with the third servo reader positioned adjacent to the one of the groups of servo readers, and
    using the information read from the one or more of the servo bands to position the magnetic tape head relative to the magnetic tape includes:
      determining a lateral position of the magnetic tape head relative to the magnetic tape using: the information read from the second of the two timing based servo patterns, and the information read from the high density servo pattern;
      determining a velocity of the magnetic tape using: the information read from the second of the two timing based servo patterns, and the information read from the high density servo pattern;
      determining a lateral position of the magnetic tape head relative to the magnetic tape using: the information read from the first of the two timing based servo patterns;
      determining a velocity of the magnetic tape using: the information read from the first of the two timing based servo patterns;
      determining a skew of the magnetic tape head relative to the magnetic tape; and
      determining tape dimensional stability information corresponding to the magnetic tape.

12. The tape drive-implemented method as recited in claim 9, wherein in response to determining that each of the servo bands are of a third configuration having a high density servo pattern and a timing based servo pattern, the high density servo pattern and the timing based servo pattern each having a width measured in the direction perpendicular to the direction of travel of the magnetic tape, each of the widths being one third of the prespecified width:
  using the servo readers to read the one or more of the servo bands includes:
    reading information from the timing based servo pattern with a first servo reader of one of the groups of servo readers; and
    reading information from the high density servo pattern with a second servo reader of the one of the groups of servo readers, and using the information read from the one or more of the servo bands to position the magnetic tape head relative to the magnetic tape includes:
determining a lateral position of the magnetic tape head relative to the magnetic tape using: the information read from the timing based servo pattern, and the information read from the high density servo pattern; and
determining a velocity of the magnetic tape using: the information read from the timing based servo pattern, and the information read from the high density servo pattern.

13. The tape drive-implemented method as recited in claim 12, comprising:
determining whether the third servo reader positioned adjacent to the one of the groups of servo readers is oriented over the timing based servo pattern;
in response to determining that the third servo reader is oriented over the timing based servo pattern:
using the servo readers to read the one or more of the servo bands includes:
reading information from the timing based servo pattern with the third servo reader in response to determining that the third servo reader is oriented over the timing based servo pattern, and
using the information read from the one or more of the servo bands to position the magnetic tape head relative to the magnetic tape includes:
determining a lateral position of the magnetic tape head relative to the magnetic tape using: the information read from the timing based servo pattern by the third servo reader;
determining a velocity of the magnetic tape using: the information read from the timing based servo pattern by the third servo reader;
determining a skew of the magnetic tape head relative to the magnetic tape; and
determining tape dimensional stability information corresponding to the magnetic tape.

14. The tape drive-implemented method as recited in claim 9, wherein 64 data transducers are positioned along the magnetic tape head in the array.

15. The tape drive-implemented method as recited in claim 9, wherein 128 data transducers are positioned along the magnetic tape head in the array.

16. An apparatus, comprising:
a tape drive, comprising:
a magnetic tape head;
a controller; and
logic integrated with the controller, executable by the controller, or integrated with and executable by the controller, the logic being configured to:
perform the tape drive-implemented method of claim 1.

17. A product, comprising:
a magnetic tape having a plurality of servo bands,
wherein each of the servo bands includes a high density servo pattern and at least one timing based servo pattern,
wherein a combined width of the high density servo pattern and the at least one timing based servo pattern in a given servo band is less than or equal to two thirds of a prespecified width of each of the servo bands,
wherein the combined width and the prespecified width are each measured in a direction perpendicular to a longitudinal axis of the magnetic tape.

18. The product as recited in claim 17, wherein a width of the high density servo pattern is less than or equal to one third of the prespecified width, wherein the width of the high density servo pattern is measured in the direction perpendicular to the longitudinal axis of the magnetic tape.

19. The product as recited in claim 17, wherein a width of each of the at least one timing based servo pattern is less than or equal to one third of the prespecified width, wherein the width of each of the at least one timing based servo pattern is measured in the direction perpendicular to the longitudinal axis of the magnetic tape.

20. The product as recited in claim 17, wherein a width of the high density servo pattern is less than or equal to one sixth of the prespecified width, wherein the width of the high density servo pattern is measured in the direction perpendicular to the longitudinal axis of the magnetic tape.

21. The product as recited in claim 17, wherein a width of each of the at least one timing based servo pattern is less than or equal to one sixth of the prespecified width, wherein the width of each of the at least one timing based servo pattern is measured in the direction perpendicular to the longitudinal axis of the magnetic tape.

22. The product as recited in claim 17, comprising:
a cartridge having an outer housing which defines an inner region; and
memory coupled to the cartridge,
wherein the magnetic tape is located in the inner region of the cartridge,
wherein the prespecified width is stored in the memory.

23. A product, comprising:
a magnetic tape having a plurality of servo bands,
wherein each of the servo bands includes a high density servo pattern and two timing based servo patterns,
wherein a longitudinal axis of each of the two timing based servo patterns is parallel to a longitudinal axis of the high density servo pattern,
wherein the two timing based servo patterns are positioned on opposite sides of the high density servo pattern along the direction perpendicular to the longitudinal axis of the magnetic tape,
wherein a combined width of the high density servo pattern and one of the two timing based servo patterns in a given servo band is less than or equal to two thirds of a prespecified width of each of the servo bands,
wherein the combined width and the prespecified width are each measured in a direction perpendicular to a longitudinal axis of the magnetic tape.

24. The product as recited in claim 23, wherein a width of each of the two timing based servo patterns and a width of the high density servo pattern are each less than or equal to one third of the prespecified width, wherein the width of each of the two timing based servo patterns and the width of the high density servo pattern are measured in the direction perpendicular to the longitudinal axis of the magnetic tape.

25. The product as recited in claim 23, wherein a width of each of the two timing based servo patterns and a width of the high density servo pattern are each less than or equal to one sixth of the prespecified width, wherein the width of each of the two timing based servo patterns and the width of the high density servo pattern are measured in the direction perpendicular to the longitudinal axis of the magnetic tape.

* * * * *